US012415765B2

(12) United States Patent
Vilinska et al.

(10) Patent No.: US 12,415,765 B2
(45) Date of Patent: Sep. 16, 2025

(54) BOARD WITH FIBER-REINFORCED DENSE LAYER

(71) Applicant: Knauf Gips KG, Iphofen (DE)

(72) Inventors: Annamaria Vilinska, Chicago, IL (US); Mark K. Hemphill, Hawthorn Woods, IL (US); Yijun Sang, Oak Park, IL (US); Nicholas S. Jones, Valparaiso, IN (US); Kevern O. Fraser, Bowie, MD (US); Jon Cross, Westfield, IN (US); Te Hua Lau, Glenview, IL (US)

(73) Assignee: Knauf Gips KG, Iphofen (DE)

( * ) Notice: Subject to any disclaimer, the term of this patent is extended or adjusted under 35 U.S.C. 154(b) by 162 days.

(21) Appl. No.: 17/855,732

(22) Filed: Jun. 30, 2022

(65) Prior Publication Data

US 2023/0021340 A1   Jan. 26, 2023

Related U.S. Application Data

(60) Provisional application No. 63/295,016, filed on Dec. 30, 2021, provisional application No. 63/220,245, filed on Jul. 9, 2021.

(51) Int. Cl.
*C04B 40/00* (2006.01)
*B01F 25/314* (2022.01)
(Continued)

(52) U.S. Cl.
CPC ........ *C04B 40/0046* (2013.01); *B01F 25/314* (2022.01); *B28B 19/0092* (2013.01);
(Continued)

(58) Field of Classification Search
CPC ........... C04B 18/241; C04B 2111/0062; B28C 5/026; B28C 5/40; B01F 25/314
See application file for complete search history.

(56) References Cited

U.S. PATENT DOCUMENTS 2,985,219 A   5/1961   Summerfield
3,359,146 A   12/1967  Lane et al.
(Continued)

FOREIGN PATENT DOCUMENTS

AU   2016284331 B2   9/2021
CN   112321265 A   *  2/2021   ............. B32B 13/02
(Continued)

OTHER PUBLICATIONS

English translation of CN112321265 (Year: 2021).*
(Continued)

*Primary Examiner* — Scott W Dodds
(74) *Attorney, Agent, or Firm* — Leydig, Voit & Mayer, Ltd.; Philip T. Petti; Pradip K. Sahu

(57) ABSTRACT

Disclosed is a composite gypsum board comprising a set gypsum core disposed between face (e.g., Manila) and back (e.g., Newsline) cover sheets. The set gypsum core is formed from a core slurry comprising stucco, water, and optional additives, such as foaming agent, migrating starch, accelerator, retarder, dispersant, etc. A dense layer formed from a dense layer slurry comprising stucco, water, fiber (e.g., paper fiber), and optionally, strength-enhancing starch, is disposed between the core and the face paper. The dense layer slurry contains a greater concentration of fiber, and optionally, strength-enhancing starch, than the core slurry, but the concentration of one or more other additives (e.g., accelerator, retarder, dispersant, or combinations thereof) is lower or the same in the dense slurry as compared with the core slurry. Also disclosed is a method of making board using one board mixer. In embodiments, paper fiber is added to water to form a suspension. The suspension is introduced, while in a non-laminar state, into the dense slurry. Further disclosed is apparatus, such as an extractor and an additive
(Continued)

injection system, which can be a part of a cementitious slurry mixing and dispensing assembly.

20 Claims, 19 Drawing Sheets

(51) Int. Cl.
    *B28B 19/00*     (2006.01)
    *B28C 5/02*     (2006.01)
    *B28C 5/06*     (2006.01)
    *B28C 5/40*     (2006.01)
    *C04B 28/14*     (2006.01)
    *B05C 5/00*     (2006.01)
    *B05C 5/02*     (2006.01)
    *C04B 111/00*     (2006.01)

(52) U.S. Cl.
    CPC ............... *B28C 5/026* (2013.01); *B28C 5/06* (2013.01); *B28C 5/402* (2013.01); *C04B 28/141* (2013.01); *C04B 40/0032* (2013.01); *B05C 5/004* (2013.01); *B05C 5/0245* (2013.01); *C04B 2111/0062* (2013.01)

(56) References Cited

U.S. PATENT DOCUMENTS

| | | |
|---|---|---|
| 3,573,947 A | 4/1971 | Kinkade et al. |
| 4,279,673 A | 7/1981 | White et al. |
| 4,372,814 A | 2/1983 | Johnstone et al. |
| 5,085,929 A | 2/1992 | Bruce et al. |
| 5,320,677 A | 6/1994 | Baig |
| 5,632,848 A * | 5/1997 | Richards ................. B28B 1/525 425/371 |
| 5,643,510 A | 7/1997 | Sucech |
| 5,683,635 A | 11/1997 | Sucech et al. |
| 5,685,903 A | 11/1997 | Stav et al. |
| 5,714,001 A | 2/1998 | Savoly et al. |
| 6,342,284 B1 | 1/2002 | Yu et al. |
| 6,409,824 B1 | 6/2002 | Veeramasuneni et al. |
| 6,409,825 B1 | 6/2002 | Yu et al. |
| 6,494,609 B1 | 12/2002 | Wittbold |
| 6,632,550 B1 | 10/2003 | Yu et al. |
| 6,743,830 B2 | 6/2004 | Soane et al. |
| 6,774,146 B2 | 8/2004 | Savoly et al. |
| 6,800,131 B2 | 10/2004 | Yu et al. |
| 6,874,930 B2 | 4/2005 | Wittbold et al. |
| 7,007,914 B2 | 3/2006 | Petersen et al. |
| 7,244,304 B2 | 7/2007 | Yu et al. |
| 7,296,919 B2 | 11/2007 | Petersen et al. |
| 7,364,015 B2 | 4/2008 | Englert et al. |
| 7,364,676 B2 | 4/2008 | Sucech et al. |
| 7,803,226 B2 | 9/2010 | Wang et al. |
| 7,892,472 B2 | 2/2011 | Veeramasuneni et al. |
| 8,323,785 B2 | 12/2012 | Yu et al. |
| 9,540,810 B2 | 1/2017 | Sang et al. |
| 9,802,866 B2 | 10/2017 | Yu et al. |
| 9,828,441 B2 | 11/2017 | Sang et al. |
| 9,840,066 B2 | 12/2017 | Yu et al. |
| 9,869,089 B2 | 1/2018 | Thomas et al. |
| 9,945,119 B2 | 4/2018 | Aldabaibeh et al. |
| 10,207,475 B2 | 2/2019 | Shake et al. |
| 10,399,899 B2 | 9/2019 | Sang et al. |
| 10,421,250 B2 | 9/2019 | Li et al. |
| 10,604,929 B2 | 3/2020 | Li et al. |
| 10,919,808 B2 | 2/2021 | Sang et al. |
| 2002/0045074 A1 | 4/2002 | Yu et al. |
| 2004/0231916 A1 | 11/2004 | Englert et al. |
| 2005/0019618 A1 | 1/2005 | Yu et al. |
| 2006/0035112 A1 | 2/2006 | Veeramasuneni et al. |
| 2007/0022913 A1 | 2/2007 | Wang et al. |
| 2007/0048490 A1 | 3/2007 | Yu et al. |
| 2007/0059513 A1 | 3/2007 | Yu et al. |
| 2007/0102237 A1 | 5/2007 | Baig |
| 2008/0090068 A1 | 4/2008 | Yu |
| 2008/0286474 A1 * | 11/2008 | Chevalier ............... C04B 28/14 524/415 |
| 2010/0062153 A1 * | 3/2010 | Curzon ................... C04B 41/65 427/180 |
| 2010/0143682 A1 | 6/2010 | Shake et al. |
| 2010/0247937 A1 | 9/2010 | Liu et al. |
| 2012/0168527 A1 | 7/2012 | Li et al. |
| 2012/0170403 A1 | 7/2012 | Li et al. |
| 2012/0207989 A1 | 8/2012 | Xu et al. |
| 2013/0098268 A1 | 4/2013 | Li et al. |
| 2013/0099027 A1 | 4/2013 | Li et al. |
| 2013/0099418 A1 | 4/2013 | Li et al. |
| 2013/0100759 A1 | 4/2013 | Wittbold et al. |
| 2013/0216717 A1 | 8/2013 | Rago et al. |
| 2013/0233880 A1 | 9/2013 | Rago et al. |
| 2013/0308411 A1 | 11/2013 | Wittbold et al. |
| 2014/0113124 A1 | 4/2014 | Sang et al. |
| 2015/0175482 A1 | 6/2015 | Stav et al. |
| 2016/0375656 A1 * | 12/2016 | Li ............................. B32B 7/02 |
| 2017/0362124 A1 | 12/2017 | Sang et al. |
| 2018/0065336 A1 | 3/2018 | Shubert et al. |
| 2018/0080226 A1 | 3/2018 | Lu et al. |
| 2018/0117541 A1 * | 5/2018 | Lindström .............. B01F 23/23 |
| 2019/0062215 A1 | 2/2019 | Lu et al. |
| 2019/0092689 A1 | 3/2019 | Sang et al. |
| 2019/0322584 A1 | 10/2019 | Sang et al. |
| 2019/0352232 A1 | 11/2019 | Li et al. |
| 2019/0352233 A1 | 11/2019 | Vilinska et al. |
| 2020/0055278 A1 | 2/2020 | Li et al. |
| 2020/0392050 A1 | 12/2020 | Li et al. |
| 2021/0054619 A1 | 2/2021 | Kenny et al. |
| 2022/0195306 A1 * | 6/2022 | Romaniuk ............. C10G 1/045 |
| 2022/0212996 A1 | 7/2022 | Yuan et al. |
| 2023/0146619 A1 | 5/2023 | Jones et al. |

FOREIGN PATENT DOCUMENTS

| | | | |
|---|---|---|---|
| EP | 1114005 B1 | 11/2005 | |
| EP | 0957212 B1 | 1/2010 | |
| EP | 3221529 B1 | 11/2015 | |
| RU | 2674428 C2 * | 12/2018 | ............. D21H 17/59 |
| WO | WO 2000/006849 A1 | 2/2000 | |
| WO | 2014/096152 A1 | 6/2014 | |
| WO | 2015/057601 A1 | 4/2015 | |
| WO | WO 2015/185143 A1 | 12/2015 | |
| WO | WO 2016/209942 A1 | 12/2016 | |
| WO | 2020/125917 A1 | 6/2020 | |
| WO | 2020/125918 A1 | 6/2020 | |
| WO | 2020/225746 A1 | 11/2020 | |
| WO | 2021/160435 A1 | 8/2021 | |
| WO | 2022/105981 A1 | 5/2022 | |

OTHER PUBLICATIONS

English translation of RU2674428 (Year: 2018).*
European Patent Office, International Search Report and Written Opinion of the International Searching Authority in International Patent Application No. PCT/IB2022/056336 (Jan. 23, 2023).
U.S. Appl. No. 13/400,010, filed Feb. 17, 2012, Yu et al.
Peterson, Kurt, "Engineered Gypsum Panels, the Development and Application of Densified Zones at the Paper/Core Interface of Gypsum Panels," 6th International Conference on Natural and Synthetic Gypsum, May 2000, pp. 1-16.
Burrows, Brian W. "A Decade's Experience of Gypsum Board Weight Reduction in the U.S.," 14th International Building Conference, Sep. 2000, pp. 197-207.
CSR Building Products, Ltd., Published Product Brochure, "Optimised Core: The secret to a stronger, lighter board," Jul. 2014.
Ventura, Carla et al., "Flow dynamics of pulp fiber suspensions," TAPPI Journal, 2008, vol. 7, No. 8, pp. 20-26.
Ventura, Carla et al., "Modeling pulp fiber suspension rheology," TAPPI Journal, vol. 6, No. 7, 2007, pp. 17-23.
Statement of Grounds and Particulars in Support of Opposition in the Matter of Patent Application No. 2016284331 in the name of United States Gypsum Company and Opposition thereto by CSR

(56) References Cited

OTHER PUBLICATIONS

Building Products Limited filed by Griffith Hack on Mar. 21, 2022 with IP Australia for Australian Patent Application No. 2016284331 (13 Pages).
Al-Ridha et al., "Improving the Compressive Strength of Local Gypsum Plaster by the Addition of (S.F.) and (P.V.A.)," International Journal of Advance Research in Science and Engineering, 8(7): 349-358 (2019).
Khalil et al., "Effect of Difference Forms of Silica on the Physical and Mechanical Properties of Gypsum Plaster Composites," Materiales de Construcción, 63(312): 529-537 (2013).
Global Gypsum, "Global Gypsum Megatrends—Does the Past Predict the Future?" (2011) [accessed at url—https://www.globalgypsum.com/magazine/articles/325-global-gypsum-megatrends-does-the-past-predict-the-future].

* cited by examiner

BOARD WITH FIBER-REINFORCED DENSE LAYER

CROSS-REFERENCE TO RELATED APPLICATIONS

This patent application claims the benefit of U.S. Provisional Patent Applications 63/220,245, filed Jul. 9, 2021, and 63/295,016, filed Dec. 30, 2021, which are incorporated by reference.

BACKGROUND

Set gypsum is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

Gypsum (calcium sulfate dihydrate) is naturally occurring and can be mined in rock form. It can also be in synthetic form (referred to as "syngyp" in the art) as a by-product of industrial processes such as flue gas desulfurization. From either source (natural or synthetic), gypsum can be calcined at high temperature to form stucco (i.e., calcined gypsum primarily in the form of calcium sulfate hemihydrate) and then rehydrated to form set gypsum in a desired shape (e.g., as a board). During manufacture of the board, the stucco, water, and other ingredients as appropriate are mixed, typically in a wallboard slurry mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. The calcined gypsum reacts with the water in the wallboard preform and sets as a conveyor moves the wallboard preform down a manufacturing line. The wallboard preform is cut into segments at a point along the line where the preform has set sufficiently. Heat is typically used (e.g., in a kiln) to drive off the remaining free (i.e., unreacted) water to yield a dry product.

Reducing the density of the board is of significant interest as long as sufficient strength is maintained. To reduce weight, mass can be removed from the volume of the board and replaced with, e.g., voids, such as air voids created from foam as well as water voids caused by evaporation of water in excess of the amount needed for the rehydration of stucco to gypsum. Perlite and other lightweight filler can also be used as an alternative or supplement to the air and water voids. lesser weight board is easier to handle, transport, and install, allowing for desired efficiencies in the installation of the board. While lighter weight board is desired, it should not be at the expense of achieving board strength desired by consumers. As mass is removed from the board, it is a challenge to maintain sufficient strength and integrity in the board.

Prior devices and methods for addressing some of the operational problems associated with the production of gypsum wallboard are disclosed in commonly-assigned U.S. Pat. Nos. 5,683,635; 5,643,510; 6,494,609; 6,874,930; 7,007,914; and 7,296,919, which are incorporated by reference. There is a continued need in the art to provide additional solutions to enhance the production of cementitious boards.

It will be appreciated that this background description has been created to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

BRIEF SUMMARY

The disclosure provides a gypsum board, a method of preparing the gypsum board, and various apparatus, as described herein. The gypsum board can be in the form of wallboard. As used herein, the term wallboard is not limited to the use of the board on walls, but can also include boards used for ceilings, partitions, etc. The board includes a set gypsum core disposed between first and second cover sheets (commonly face and back sheets, respectively). The face side of the board normally is facing out and is visible when hanging in use, while the back side faces inward, toward support structures such as studs. A fiber-reinforced dense layer is disposed between the core and the face cover sheet.

The dense layer slurry is formulated differently from the core layer slurry. The dense layer slurry contains a greater concentration of fiber and, optionally, strength-enhancing starch (e.g., pregelatinized or uncooked non-migrating starch) than the core layer, but the dense layer slurry has the same or a lesser concentration of other additives (e.g., one or more of accelerator, retarder, polyphosphate, dispersant, foaming agent, migrating starch, etc.) as compared with the core slurry. In some embodiments, the core slurry has substantially less, or is absent, the fibers and, optionally, the strength-enhancing starch.

In embodiments, the board can be prepared using one board mixer equipped with an agitator as understood in the art. Stucco, water, and optional additives can be inserted into a body of the board mixer to form a base slurry. The board mixer includes a primary discharge conduit from which the slurry for the board core is formed, as well as a secondary discharge conduit from which the slurry for the dense layer is formed. The fiber, and optionally, the strength-enhancing starch are inserted into the secondary discharge conduit and mixed with the base slurry that exits the body of the mixer to form the dense layer slurry. By including the fiber in this manner, it has been found that it is unnecessary to include the fiber in the base or core slurries. In some embodiments, polyphosphate can be optionally inserted into the secondary discharge conduit and into the dense layer slurry.

The foaming agent can be inserted into the core slurry in any suitable manner. For example, in embodiments, the foaming agent is preferentially included in the primary discharge conduit so that the core is formed to have lesser density than the dense layer since such foam would then be minimized in the dense layer. Other ingredients can be included in the base and/or core slurries, respectively, by inserting those ingredients into the board mixer body and/or into the primary discharge conduit. Those ingredients include, for example, accelerator, retarder, polyphosphate, dispersant, migrating starch, etc. As such, a particular ingredient will be introduced in the core slurry in the same amount as the dense layer slurry, where the ingredient is inserted only into the board mixer body. A particular ingredient will be introduced in a greater amount in the core slurry as compared with the dense layer slurry where the ingredient is introduced in the primary discharge conduit (but not in the secondary discharge conduit).

Paper fiber is included in the dense layer slurry in some embodiments. Paper fiber can be delivered in water as a pulp suspension. In embodiments, when the paper fiber is delivered to the slurry for forming the dense layer, the flow of the paper fiber suspension is in a non-laminar (e.g., turbulent) state sufficient to form a fiber-reinforced dense slurry and to avoid agglomeration and the formation of flocs in appreciable amounts. In this regard, it is desired to have 10% or less of the fibers in the form of such flocs so that the fiber suspension can be properly mixed into the dense layer slurry to allow for enhanced strength enhancement.

The board containing the fiber-reinforced dense layer has particular utility in maintaining strength (e.g., a nail pull resistance of at least 72 lb., (e.g., at least 77 lb.)) according to ASTM 473-10, method B at ultra-light board densities (e.g., 35 pcf or less, such as 31 pcf or less).

Thus, in one aspect, the disclosure provides a gypsum board comprising a set gypsum core disposed between first and second cover sheets. The gypsum core is formed from a core slurry comprising stucco, water, foaming agent, and one or more additives such as dispersant, migrating starch, accelerator, retarder, and/or other ingredients. A dense layer is disposed between the core and the first cover sheet. The dense layer is formed from a dense layer slurry comprising stucco, water, fibers in any suitable amount (such as an amount of at least 0.8% by weight of the stucco) and optionally, strength-enhancing starch. The dense layer slurry preferentially contains a greater concentration of fibers (and, optionally, strength-enhancing starch) than the core slurry, and the core slurry preferentially contains the same or a greater concentration of at least one of the accelerator, retarder, dispersant, and migrating starch, as compared with the dense layer slurry. In some embodiments, the dense layer has a dry density of at least 40 pcf and a dry thickness of 0.05 inches or less. The board can have any desired density, e.g., a density of 35 pcf or less, and a nail pull resistance of at least 72 lb., according to ASTM 473-10, method B. In some embodiments, the dense layer slurry consists of stucco, water, fiber, and optionally, strength-enhancing starch and polyphosphate.

In another aspect, the disclosure provides a method of making gypsum board. The method comprises obtaining first and second cover sheets. A dense layer is applied in bonding relation to the first cover sheet. The dense layer is formed from a slurry comprising stucco, water, fibers in any suitable amount (e.g., at least 0.8% by weight of the stucco) and, optionally, strength-enhancing starch. In some embodiments, the dense layer has a dry density of at least 40 pcf. A core layer is applied in bonding relation to the dense layer. The core layer has a density of 35 pcf or less and has first and second surfaces. The dense layer slurry preferentially contains a greater concentration of fibers (and, optionally, strength-enhancing starch) than the core slurry, and the core slurry preferentially contains the same or a greater concentration of the at least one of the accelerator, retarder, dispersant, and migrating starch, as compared with the dense layer slurry. The second cover sheet is disposed in bonding relation to the second core surface. The board has a nail pull resistance of at least 72 lb., according to ASTM 473-10, method B.

In another aspect, a method of preparing board is provided. The method comprises providing a board mixer comprising a main body, and primary and secondary discharge conduits, respectively. Stucco and water are inserted in the main body of the mixer to form a base slurry. A majority portion of the base slurry is discharged from the main body into the primary discharge conduit to form a core slurry. A minority portion of the base slurry is discharged from the main body into the secondary discharge conduit to form a dense layer slurry. A suspension comprising water and paper fiber is prepared. The suspension is inserted into the dense layer slurry in the secondary discharge conduit while the suspension is in a non-laminar state that is sufficient to avoid having 10% or more of the fiber by weight in the form of flocs. First and second cover sheets are provided. The dense layer slurry is deposited over the first cover sheet, generally while it is moving along a conveyor. The core slurry is deposited over the dense layer slurry. The second cover sheet is applied over the core slurry.

In another aspect, the present disclosure is directed to embodiments of an additive injection system for use in preparing a cementitious product. In embodiments, an additive injection system can be a part of a cementitious slurry mixing and dispensing assembly and used to inject an additive into a secondary slurry discharge conduit carrying a secondary flow of cementitious slurry produced in the assembly such that the secondary slurry stream is different from a main slurry stream discharged from a main slurry discharge conduit.

In another aspect, the present disclosure is directed to embodiments of a mixer extractor. In one embodiment, a mixer extractor includes an additive injection assembly having a body and a port member. The body defines a slurry passageway and a port passageway. The port passageway has a port opening in fluid communication with the slurry passageway. The port member defines an additive passageway. The port member is adapted to removably mount to the body such that the additive passageway is in fluid communication with the slurry passageway via the port opening of the port passageway.

In another aspect of the present disclosure, embodiments of a slurry mixing and dispensing assembly are described. In one embodiment, a slurry mixing and dispensing assembly includes a mixer, a main discharge conduit, and a secondary discharge conduit. The mixer includes a housing and an agitator disposed within the housing. The housing has a first outlet and a second outlet. The agitator is configured to agitate water and a cementitious material to form an aqueous cementitious slurry. The main discharge conduit is in fluid communication with the first outlet, and the secondary discharge conduit is in fluid communication with the second outlet. The secondary discharge conduit includes an additive injection system having a body and a port member configured to introduce at least one additive into a secondary slurry stream discharged from the mixer via the secondary slurry discharge conduit.

In another aspect of the present disclosure, embodiments of a method of making a cementitious product are described. In one embodiment of a method of making a cementitious product, water and a cementitious material are agitated in a mixer to form an aqueous cementitious slurry. A main stream of the aqueous cementitious slurry is discharged from the mixer from a first outlet into a main discharge conduit. A secondary stream of the aqueous cementitious slurry is discharged from the mixer from a second outlet into a secondary discharge conduit. At least one additive is introduced into the secondary stream via an additive injection system associated with the secondary discharge conduit.

In another aspect of the present disclosure, embodiments of a system for manufacturing a gypsum board are described. The system comprises a mixer, which includes a housing and an agitator disposed within the housing. The housing has a first outlet and a second outlet. The agitator is configured to agitate water and a cementitious material to form an aqueous cementitious slurry. The system further comprises a main discharge conduit, a secondary discharge conduit, and an additive injection system. The main discharge conduit is in fluid communication with the first outlet. The secondary discharge conduit is in fluid communication with the second outlet. The additive injection system has an injection body and a port member. The injection body defines a slurry passageway and a port passageway. The slurry passageway comprises a portion of the secondary discharge conduit such that the slurry passageway is in fluid communication with the second outlet of the mixer. The port passageway is in fluid communication with the slurry passageway. The port member defines an additive passageway. The port member is removably connected to the injection body such that the additive passageway is in fluid communication with the port passageway.

Further and alternative aspects and features of the disclosed principles will be appreciated from the following detailed description and the accompanying drawings. As will be appreciated, the additive injection systems, extractors, slurry mixing and dispensing assemblies, and techniques for making a cementitious product disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

Figure 1:
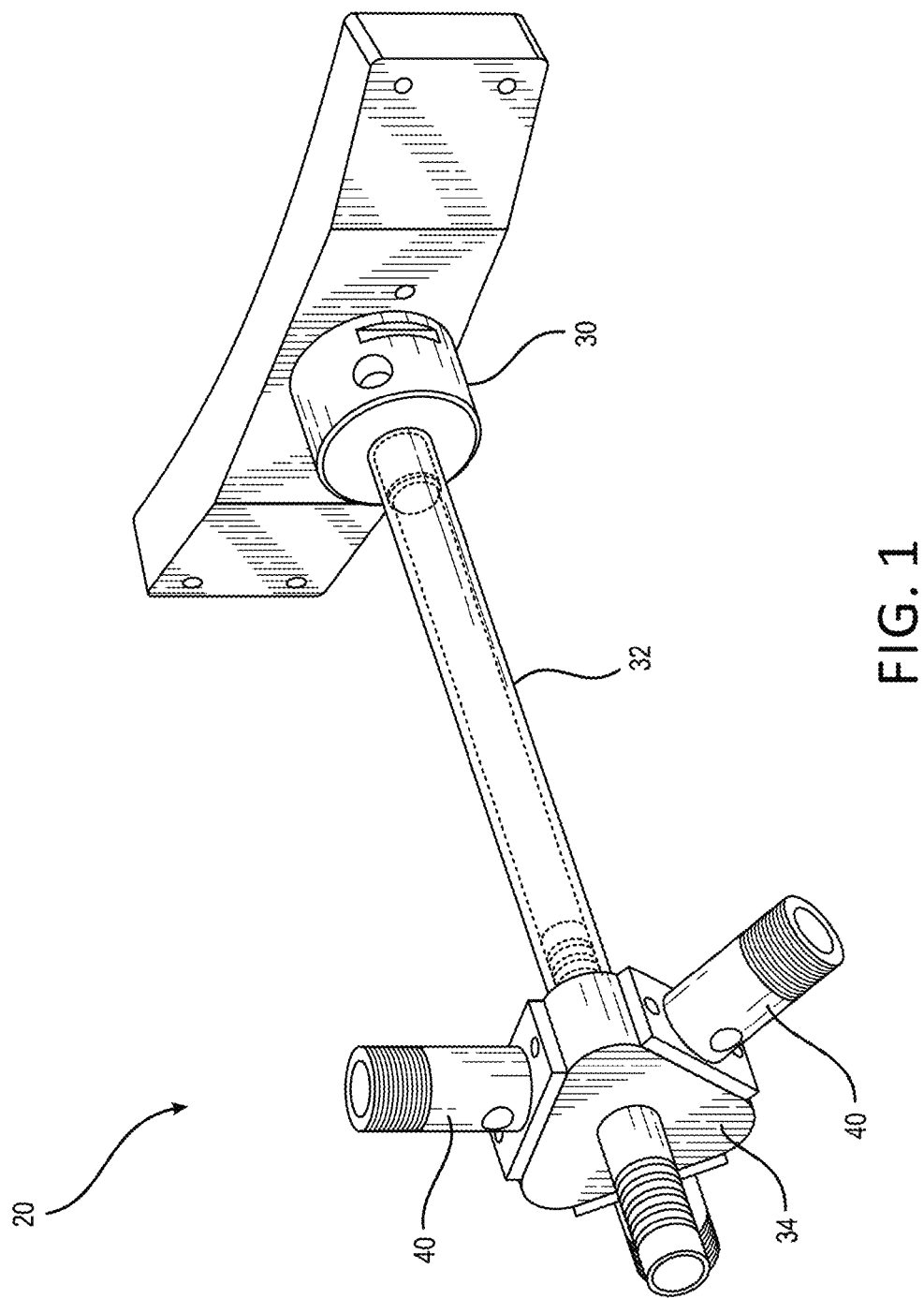
FIG. 1 is a perspective view of an embodiment of a mixer extractor assembly constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

Introduction

Embodiments of the disclosure provide gypsum board, methods of preparing gypsum board, and apparatus such as a mixer extractor and a slurry mixing and dispensing assembly. The gypsum board includes a board core comprising set gypsum sandwiched between face and back cover sheets. The set gypsum core is formed from a core slurry comprising stucco, water, and optional ingredients as desired, including, for example, foaming agent, accelerator (e.g., heat resistant accelerator), retarder, dispersant, migrating starch, polyphosphate, etc. A dense layer is disposed between the board core and the face cover sheet. In accordance with embodiments of the disclosure, the dense layer is formed from a dense layer slurry comprising water, stucco, and a strength-enhancing amount of fiber. The dense layer generally has a significantly greater density and significantly lesser thickness than that of the board core.

Surprisingly and unexpectedly, it has been found that the inclusion of fiber as a reinforcing agent in the thin dense layer provides significant strength benefits and allows for a gypsum board that is lightweight (e.g., having a density of 35 pcf or less) with good mechanical strength (e.g., a nail pull resistance of at least 72 lb., according to ASTM 473-10, Method B). For example, in some embodiments, the board has a nail pull resistance of at least 77 lb. according to ASTM 473-10, method B (e.g., from 77 lb. to 105 lb., from 77 lb. to 98 lb., etc.). It will be understood, however, that the features of the disclosure can be used in heavier board, having densities greater than 35 pcf, if so desired. Optionally, if desired, strength-enhancing starch and/or polyphosphate can be included along with the fiber in the slurry for forming the dense layer.

The inclusion of the fiber in the dense layer also surprisingly and unexpectedly allows for the use of a lesser quantity of strength-enhancing additives in the slurry for forming the board core. For example, the fiber and strength-enhancing starch (e.g., pregelatinized or uncooked non-migrating starch) can be included in a lesser relative amount in the core, as compared with a board having a dense layer made without the fiber. In some embodiments, the core can be substantially free of the fiber the strength-enhancing starch. Surprisingly and unexpectedly, these benefits can be achieved even though the dense layer contributes a much smaller portion of the total board weight and thickness as compared with the larger contribution of the core.

Optionally, in some embodiments, the board can be prepared to include a second dense layer disposed between the core and the back cover sheet. The second dense layer can be formed from the same or a different slurry as used to make the dense layer between the core and the face cover sheet. In this regard, it will be understood that the strength of the board can generally be distributed to enhance strength on the face side of the board.

In some embodiments, the dense layer slurry has a greater concentration of certain ingredients in comparison to the core slurry. Surprisingly and unexpectedly, embodiments of the board can be prepared where the dense layer slurry has a greater concentration of paper fiber and, optionally, strength-enhancing starch, as compared with the core slurry. Other additives, such as accelerator (e.g., heat resistant accelerator), retarder, foam, dispersant, and other ingredients are in a concentration in the core slurry that is less than or equal to the concentration of these additives in the dense slurry layer. As discussed herein, ingredients added to the base slurry are considered to be introduced in the same amount by weight in the dense and core slurries so long as additional amounts of those ingredients are not added to the primary and secondary discharge conduits, respectively, regardless of any fluctuations in concentration due to differences between the other ingredients. In this manner, in embodiments, the core slurry can contain the same or a greater concentration of additives other than paper fiber, and optionally, strength-enhancing starch and/or polyphosphate.

Surprisingly and unexpectedly, the board can be made using a single board mixer (e.g., a pin or pin-less mixer) as opposed to a dual board mixer system where the core slurry is mixed in one mixer while the dense layer slurry is mixed in a secondary mixer. In this regard, the mixer includes an agitator, a primary discharge conduit as known in the art for discharging the core slurry, and a secondary discharge conduit, which, in some embodiments, is generally upstream of the primary discharge conduit. In embodiments, the fiber, generally added to water to form a suspension, can be inserted (e.g., injected) using the secondary discharge conduit, but not the primary discharge conduit such that the fiber is excluded or is minimally present in the core slurry. Optionally, the strength-enhancing starch can also be introduced using the secondary discharge conduit if desired (e.g., by addition to the fiber suspension, or alternatively, separately through a different injection port). Predetermined ingredients, such as the foam, can be inserted (e.g., injected) into the primary discharge conduit to adjust the formulation of the core slurry as desired. In some embodiments, the fiber is paper fiber which is preferentially added to the secondary discharge conduit and hence the dense layer slurry, while the paper fiber is not added to the mixer body or primary discharge conduit (but fiber other than paper could be added to the mixer body or primary discharge conduit, if desired).

By inserting additives in the primary and secondary discharge conduits, respectively, the boards can be prepared with different concentrations as described herein. If desired, some wet or dry ingredients can be inserted directly into the main body of the board mixer such that those ingredients will be found in both the dense and core slurries. In embodiments, the secondary discharge conduit can be disposed upstream of the primary discharge conduit for convenience so that the dense layer slurry can be applied on the cover sheet moving on a conveyor. This cover sheet can generally be the face cover sheet since the board is typically formed upside down at the wet end of the manufacturing line. The primary discharge conduit can be disposed so that the core slurry is deposited over the dense slurry on the moving cover sheet coated with the dense slurry. In embodiments, the core slurry is deposited generally downstream of the mixer.

The secondary discharge conduit can be in any suitable form. In some embodiments, fiber (e.g., paper fiber) can be added to water to form a pulp suspension. The paper fiber suspension can be injected into the secondary discharge conduit using, e.g., a single port although multiple ports (such as via a ring) can be used, if desired. Surprisingly and unexpectedly, the present inventors have found that, in embodiments, the paper fiber suspension should be in a sufficiently non-laminar (e.g., turbulent) state when it is added to the slurry for forming the dense layer. In this manner, the suspension avoids agglomeration and appreciable amounts of flocs which would hinder proper mixing of the fiber in the dense layer slurry, which would cause the fiber to not be distributed in a homogenous manner in the dense layer slurry and thus lead to diminution in strength enhancement in the resultant board. Accordingly, use of a single board mixer embodiment for forming the dense and core slurries, respectively, as described herein, surprisingly and unexpectedly improves and enhances the use of paper fiber to enhance the strength of the dense layer, and hence, the board. The use of a single board mixer also improves efficiency by reducing energy use and downtime due to the use of additional mechanical apparatus.

The pulp suspension can be prepared and delivered in any suitable manner. For example, the pulp suspension can be held in a holding tank equipped with an agitator and then pumped through a hose to the secondary discharge conduit. In embodiments, the fiber suspension is inserted into the slurry for forming the dense layer while at a flow velocity above the onset velocity of turbulence for a pulp suspension containing a predetermined amount of fiber. Onset velocity of turbulence is the flow velocity that a pulp suspension has upon entering a turbulent flow state. In this regard, when the pulp suspension flows at a velocity greater than the onset velocity of turbulence, the pulp suspension is in a turbulent flow state. The onset velocity of turbulence of a pulp suspension is determined by a pipe head friction loss test or a shear rate ramp test of a rheometer, as described herein.

The present disclosure further provides various embodiments of an additive injection system that can be used in the manufacture of products, including cementitious products such as gypsum wallboard, for example. Embodiments of an additive injection system constructed in accordance with principles of the present disclosure can be used in a manufacturing process to effectively introduce one or more additives into a secondary cementitious slurry stream discharged from a mixer into a secondary conduit, for example.

The present disclosure further provides various embodiments of a cementitious slurry mixing and dispensing assembly that can be used in the manufacture of different types of cementitious product as will be appreciated by one skilled in the art. Embodiments of a cementitious slurry mixing and dispensing assembly constructed in accordance with principles of the present disclosure can include an additive injection system adapted to inject one or more additives into a secondary cementitious slurry stream discharged from a mixer into a secondary conduit, via at least one injection port member. In embodiments, a variety of different injection port members can be provided that each include a different passageways (e.g., with different port orifice sizes) to readily vary a flow condition of the flow of additive therethrough, such as, to vary the injection pressure to achieve a desired flow condition, for example. In embodiments, a cementitious slurry mixing and dispensing assembly constructed according to principles of the present disclosure can be used to make a cementitious board, such as, a gypsum wallboard, an acoustical panel, or a portland cement board, for example.

Embodiments of a cementitious slurry mixing and dispensing assembly constructed in accordance with principles of the present disclosure can be used to mix constituent materials to form a cementitious slurry (e.g., an aqueous calcined gypsum slurry) and to deposit the cementitious slurry onto an advancing web (e.g., paper or mat) moving on a conveyor during a continuous board (e.g., gypsum wallboard) manufacturing process. In one embodiment, a slurry mixing and dispensing assembly includes a mixer, a main discharge conduit, and a secondary discharge conduit having an additive injection system constructed according to principles of the present disclosure.

The mixer includes a housing and an agitator disposed within the housing. The housing has a first outlet and a second outlet. The agitator is configured to agitate water and a cementitious material to form an aqueous cementitious slurry. The main discharge conduit is in fluid communication with the first outlet, and the secondary discharge conduit is in fluid communication with the second outlet. The secondary discharge conduit includes an additive injection system having a body and a port member configured to introduce at least one additive into a secondary slurry stream discharged from the mixer via the secondary slurry discharge conduit.

In embodiments, the additive injection system can be used to produce the fiber-reinforced dense layer, which can be disposed between the core and the face cover sheet. In accordance with embodiments of the disclosure, the dense layer is formed from a secondary stream of slurry containing water, stucco, and fiber in an amount of at least 0.8% by weight of the stucco. In embodiments, the fiber is introduced into the slurry stream in the secondary discharge conduit via the additive injection system to produce the dense layer in situ in the secondary discharge conduit.

The Board

In accordance with embodiments of the disclosure, the gypsum board includes a board core comprising set gypsum sandwiched between face and back cover sheets with a dense layer disposed between the board core and the face cover sheet. The board core and dense layer slurries are formulated differently.

The core and dense layer slurries, respectively, contain water and stucco (or other cementitious material as mentioned herein). Stucco is sometimes referred to as calcined gypsum, and it can be in the form of calcium sulfate alpha hemihydrate, calcium sulfate beta hemihydrate, and/or calcium sulfate anhydrite. The calcined gypsum can be fibrous in some embodiments, nonfibrous in other embodiments, or a combination thereof in other embodiments. In embodiments, the calcined gypsum can include at least 50% beta calcium sulfate hemihydrate. In other embodiments, the calcined gypsum can include at least 86% beta calcium sulfate hemihydrate. While the use of stucco and calcium sulfate dihydrate ("gypsum," "set gypsum," or "hydrated gypsum") is illustrated herein, it will be understood that other cementitious materials may be used in addition or as an alternative, to stucco. Non-limiting examples of other cementitious materials include portland cement, sorrel cement, slag cement, fly ash cement, and calcium alumina cement.

The reinforcing fibers in the dense layer slurry can be of any suitable composition for enhancing strength in the board. The fibers can be hydrophobic or hydrophilic, finished or unfinished. The fibers can have any suitable length, e.g., a length of from 0.1 mm to 25 mm. The fibers can also have any suitable diameter, such as 1 micron to 30 microns. For example, the fibers can be in the form of cellulosic fibers (e.g., paper, wood, cotton, and/or rayon fibers, etc.), carbon fibers, mineral fibers, glass fibers, polymeric fibers, or any combination thereof.

In some embodiments, the fibers are paper fibers. Any suitable source of paper can be used for the paper fibers. For example, the paper fibers can be sourced from Manila, Newsline, or recycled waste paper, such as old corrugated carton (OCC). The paper fibers can have any suitable average length, e.g., a length from 0.1 mm to 3 mm, e.g., from 0.5 mm to 3 mm, or from 1 mm to 3 mm. The paper fibers can also have any suitable diameter, such as at least 1 micron, at least 10 microns, at least 20 microns, etc. (e.g., from 1 micron to 40 microns, from 10 microns to 40 microns, from 10 microns to 30 microns, from 15 microns to 40 microns, from 15 microns to 30 microns, from 20 microns to 40 microns, from 20 microns to 30 microns, etc.). In some embodiments, the paper fibers are dry shredded, having any suitable length, e.g., having an average length of from 0.5 mm to 4 mm, such as from 2 mm to 3 mm.

In some embodiments, the fibers are natural pulp fibers such as wood pulp fibers. For example, the wood pulp fibers can include softwood and hardwood pulp fibers, straw fibers, plant and grass pulp fibers such as hemp, jute, kenaf, and bamboo pulp fibers, cotton pulp fibers or any combination thereof (e.g., wood pulp fibers used in paper making). The wood fibers can also have any suitable diameter, such as at least 1 micron, at least 10 microns, at least 20 microns, etc. (e.g., from 1 micron to 40 microns, from 10 microns to 40 microns, from 10 microns to 30 microns, from 15 microns to 40 microns, from 15 microns to 30 microns, from 20 microns to 40 microns, from 20 microns to 30 microns, etc.).

The fibers can comprise glass fibers in some embodiments. For example, the fibers can include chopped and/or continuous glass fibers. The glass fibers can have any suitable dimensions, e.g., having an average diameter of from 1 microns to 30 microns and a length of from 1 mm to 25 mm. In the case of carbon fibers, they are known in the art and are generally polymeric (and are sometimes also known as graphite fibers). The carbon fibers can have any suitable dimensions, such as, for example, a diameter of from 1 microns to 30 microns and a length of from 100 microns to 25 mm. The carbon fibers are generally composed mostly of carbon atoms.

In some embodiments, the fibers comprise polymeric fibers of any suitable composition. For example, the polymeric fibers can include one or more of polyester, polyethylene, polypropylene, nylon, polyacetate, polyacrylic acid, polystyrene, polyvinyl acetate, rayon, and/or polyvinylchloride, as well as any copolymers thereof and combinations thereof (e.g., synthetic polymeric fibers comprising polyester, polyethylene, polypropylene, or any combination thereof). In some embodiments, the fibers comprise mineral fibers. The mineral fibers can be in any suitable form. For example, the mineral fibers can be spun or drawn mineral rock materials. The mineral fibers can have any suitable dimensions, such as, for example, a diameter of from 1 microns to 30 microns and a length of from 1 mm to 25 mm.

The fibers can be included in any suitable amount in the dense layer slurry. For example, the fibers can be included in an amount of at least 0.8% by weight of the stucco (e.g., from 0.8% to 8%, from 0.8% to 5%, from 0.8% to 4%, from 0.8% to 3%, from 0.8% to 2%, from 11% to 5%, from 1% to 4%, from 1% to 2%, from 1% to 2%, etc.).

The strength-enhancing starch refers to a starch that improves the strength of the board (e.g., with respect to nail pull strength) as compared with the same board excluding the starch in the dense layer. Starches for strength enhancement are discussed in, e.g., U.S. Pat. Nos. 9,540,810, 9,828, 441, 10,399,899, and 10,919,808. Any suitable strength-enhancing starch can be used, including hydroxyalkylated starches such as hydroxyethylated or hydroxypropylated starch, or a combination thereof; a pregelatinized starch; or an uncooked, non-migrating, starch.

Any suitable pregelatinized starch can be included in the dense layer slurry, as described in U.S. Pat. Nos. 10,399,899 and 9,828,441, including methods of preparation thereof and desired viscosity ranges described therein. If included, the pregelatinized starch can exhibit any suitable viscosity. In some embodiments, the pregelatinized starch is a mid-range viscosity starch as measured according to the VMA method as known in the art and as set forth in U.S. Pat. No. 10,399,899, which VMA method is hereby incorporated by reference. In other embodiments, the pregelatinized starch has a greater viscosity, such as greater than 700 centipoise (e.g., 773 centipoise) according to the VMA test.

In some embodiments, the starch includes an uncooked starch having (i) a hot water viscosity of from 20 BU to 300 BU according to the hot water viscosity assay (HWVA method), and/or (ii) a mid-range peak viscosity of from 120 BU to 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for 10 minutes, and the starch is cooled to 50° C. at a rate of −3° C./minute as described in U.S. Pat. No. 10,919,808.

As referred to herein, combinations of different strength-enhancing starches can also be used in the dense layer slurry if desired.

For example, in some embodiments, the strength-enhancing starch includes an uncooked medium hydrolyzed acid modified starch (e.g., an uncooked acid-modified corn starch having a hot water viscosity of 180 BU); and/or a medium viscosity and medium molecular weight pregelatinized starch (e.g., pregelatinized corn flour starch with a cold water viscosity of 90 centipoise).

Strength-enhancing starches differ from migrating starches such as LC-211, commercially available from Archer-Daniels-Midland, Chicago, Illinois Migrating starches normally have smaller chain lengths (e.g., due to acid- or enzyme-modification) and migrate to the core-cover sheet interface for further bond enhancement. For example, in some embodiments, the core or base slurry includes a migrating starch having a molecular weight of 6,000 Daltons or less.

If included, the optional strength-enhancing starch can be included in the dense layer slurry in any suitable amount. For example, in some embodiments, the dense layer slurry comprises a strength-enhancing starch in an amount of at least 0.5% by weight of the stucco (e.g., from 0.5% to 5% by weight of the stucco, such as from 0.5% to 3%, from 1% to 5%, from 1% to 3%, from 2% to 5%, from 2% to 4%, from 2% to 3%, by weight of the stucco, etc.). In some embodiments, the core slurry is substantially free of a strength-enhancing starch, e.g., having 2% or less by weight of stucco, such as 1% or less by weight of the stucco.

With respect to the base and/or core slurries, foaming agent and other additives can be included. The foaming agent can be added by addition in the primary discharge conduit. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632, 550. It has been found that suitable void distribution and wall thickness can be effective to enhance strength, especially in lesser density board (e.g., 35 pcf or less). See, e.g., U.S. Pat. Nos. 9,802,866 and 9,840,066. Evaporative water voids, generally having voids of 5 μm or less in diameter, also contribute to the total void distribution along with the aforementioned air (foam) voids.

Polyphosphate can optionally be included in the base slurry and/or core layer slurry, e.g., in order to enhance sag resistance in the board. Trimetaphosphate compounds can be used, including, for example, sodium trimetaphosphate, potassium trimetaphosphate, lithium trimetaphosphate, and ammonium trimetaphosphate. If included, the polyphosphate can be included in the core slurry in the same, or a greater, amount than in the dense layer slurry. Alternatively, if desired, the polyphosphate can be included in the dense layer slurry in a greater amount than the core slurry (e.g., via addition through the secondary discharge conduit).

With respect to the polyphosphate (e.g., sodium trimetaphosphate), the core slurry and/or base slurry can include it in any suitable amount, e.g., from 0.01% to 0.5% by weight of the stucco, from 0.01% to 0.4%, from 0.05% to 0.3%, from 0.1% to 0.5%, from 0.1% to 0.4%, from 0.1% to 0.3%, from 0.1% to 0.2%, from 0.15% to 0.5%, from 0.2% to 0.4%, from 0.3% to 0.5%, by weight of the stucco, etc.

In addition, the base and/or the core slurry can optionally include at least one dispersant to enhance fluidity in some embodiments. Like other ingredients, the dispersants may be included in a dry form with other dry ingredients and/or in a liquid form with other liquid ingredients in the core slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin.

The base and/or core slurry can include accelerator and/or retarder. Accelerator (e.g., wet gypsum accelerator, heat resistant accelerator, climate stabilized accelerator) and retarder are well known and can be included in the core slurry, if desired. See, e.g., U.S. Pat. Nos. 3,573,947 and 6,409,825. In some embodiments where accelerator and/or retarder are included, the accelerator and/or retarder each can be in the base and/or core slurry in an amount on a solid basis of, such as, from 0% to 10% by weight of the stucco (e.g., 0.1% to 10%), such as, for example, from 0% to 5% by weight of the stucco (e.g., 0.1% to 5%).

Other additives can be included (by addition in the base and/or core slurries) in a concentration in the core slurry that is the same or greater than the concentration in the dense layer slurry. Such additives include structural additives, including mineral wool, perlite, clay, calcium carbonate, and chemical additives, including fillers, sugar, enhancing agents (such as phosphonates, borates and the like), binders (such as latex), colorants, fungicides, biocides, hydrophobic agent (such as a silicone-based material, including a silane, siloxane, or silicone-resin matrix, e.g.), and the like. Examples of the use of some of these and other additives are described, for instance, in U.S. Pat. Nos. 7,244,304; 7,364,015; 7,803,226; 7,892,472; 6,342,284; 6,632,550; 6,800,131; 5,643,510; 5,714,001; and 6,774,146; and U.S. Patent Application Publication 2002/0045074. Other examples of such additives include fire-rated and/or water resistant product that can also optionally be included in the base and/or the core slurry, include e.g., siloxanes (water resistance); heat sink additives such as aluminum trihydrate (ATH), magnesium hydroxide or the like; and/or high expansion particles (e.g., expandable to 300% or more of original volume when heated for about one hour at 1560° F.). See, e.g., U.S. Pat. No. 8,323,785 for description of these and other ingredients. In some embodiments, high expansion vermiculite is included, although other fire resistant materials can be included.

The weight ratio of water to calcined gypsum can be any suitable ratio, although, as one of ordinary skill in the art will appreciate, lesser ratios can be more efficient because less excess water will remain after the hydration process of the stucco is completed during manufacture, thereby conserving energy. In some embodiments, the cementitious slurry can be prepared by combining water and calcined gypsum in a suitable water to stucco weight ratio for board production depending on products, such as in a range between 0.6 and 1.2, e.g., 0.8. In embodiments, for any given board, the dense layer slurry may have a greater water/stucco ratio than the core slurry. For example, the core slurry formulations can be made with any suitable water/stucco ratio, e.g., 0.6 to 1.2, 0.6 to 1.1, 0.6 to 1, 0.6 to 0.9, 0.6 to 0.85, 0.6 to 0.8, 0.6 to 7.5, 0.6 to 0.7. 0.6 to 0.65, etc. The dense layer slurry formulations can be made with any suitable water/stucco ratio, e.g., 0.8 to 1.5, 0.8 to 1.4, 0.8 to 1.3, 0.8 to 1.2, 0.8 to 1.1, 0.8 to 1.0, 0.8 to 0.95, 0.8 to 0.9, 0.8 to 0.85, etc.

Surprisingly and unexpectedly, the use of the fibers in the dense layer in accordance with embodiments of the disclosure allows for a reduction or elimination in the use of fiber in the board core, even though the contribution to board weight and thickness provided by the dense layer is far less than provided by the core as described herein. For example, in some embodiments, the core slurry is substantially free of glass fibers; cellulosic fibers such as paper fibers, cotton, rayon, or wood fibers; and/or polymeric fibers (e.g., having 0.5% or less, 0.3% or less, or 0.1% or less of glass fibers, cellulosic fibers, pulp fibers, and/or polymeric fibers, by weight of the stucco).

With respect to the cover sheets, they can be formed of any suitable material and basis weight. For example, some embodiments of the disclosure allow for good board strength even with the use of lower basis weight cover sheets such as, for example, less than 45 lbs/MSF (e.g., 33 lbs/MSF to 45 lbs/MSF) even for lower weight board (e.g., having a density of 35 pcf or below). However, if desired, in some embodiments, heavier basis weights can be used, e.g., to further enhance nail pull resistance or to enhance handling, e.g., to facilitate desirable "feel" characteristics for end-users. In some embodiments, to enhance strength (e.g., nail pull strength), especially for lower density board, one or both of the cover sheets can be formed from paper and have a basis weight of, for example, at least 45 lbs/MSF (e.g., from 45 lbs/MSF to 65 lbs/MSF, 45 lbs/MSF to 60 lbs/MSF, 45 lbs/MSF to 55 lbs/MSF, 50 lbs/MSF to 65 lbs/MSF, 50 lbs/MSF to 60 lbs/MSF, etc.). If desired, in some embodiments, one cover sheet (e.g., the "face" paper side when installed) can have aforementioned greater basis weight, e.g., to enhance nail pull resistance and handling, while the other cover sheet (e.g., the "back" sheet when the board is installed) can have somewhat lower weight basis if desired (e.g., weight basis of less than 45 lbs/MSF, e.g., from 33 lbs/MSF to 45 lbs/MSF (e.g., 33 lbs/MSF to 40 lbs/MSF).

Method of Making the Board

The board can be prepared in any suitable manner. In embodiments, a main mixer containing an agitator as understood in the art is used at a wet end of a manufacturing line as also understood in the art. The agitator can be in the form of pins, disk, impeller, propeller, rotor spinning inside a stationary housing, or the like. The main mixer can be used to prepare a base slurry for preparing a core and dense slurry, respectively. Stucco, water, and optionally, a base additive package are inserted into the main mixer. The mixer contains a primary discharge conduit and a secondary discharge conduit. Slurry is discharged from the primary discharge conduit where core additives such as foam (see, e.g., U.S. Pat. No. 5,683,635) are inserted to form a core slurry. Slurry is also discharged from the secondary discharge conduit where fiber (e.g., paper, glass, or polymeric fiber), and optionally, strength-enhancing starch and/or polyphosphate, is inserted into the base slurry to form a dense layer slurry.

The relative amounts of base slurry that are discharged through the primary and secondary discharge conduits, respectively, can be selected to form the core layer and dense layer of desired dimensions. In embodiments, a majority (i.e., greater than 50%) of the base slurry is discharged through the primary discharge conduit since the core layer generally has greater thickness than the dense layer. In some embodiments, at least 60% of the base slurry is discharged through the primary discharge conduit (e.g., at least 70%, at least 80%, at least 90%, at least 95%, such as from 50% to 99%, from 50% to 95%, from 50% to 90%, from 60% to 99%, from 60% to 95%, from 60% to 90%, from 60% to 85%, from 60% to 80%, from 70% to 99%, from 70% to 95%, from 70% to 90%, from 70% to 85%, from 70% to 80%, from 80% to 99%, from 80% to 95%, or from 80% to 90%, etc.).

In embodiments, the fiber inserted into the secondary discharge conduit is paper fiber. Prior to addition to the secondary discharge conduit, the paper fiber is put into a water suspension. The suspension can have any suitable amount of paper fiber, such as from 1% to 7% fiber, from 1% to 6% fiber, from 1% to 5% fiber, from 1% to 4% fiber, from 1% to 3% fiber, from 2% to 7% fiber, from 2% to 6% fiber, from 2% to 5% fiber, from 2% to 4% fiber, from 3% to 7% fiber, from 3% to 6% fiber, from 3% to 5% fiber, or from 3% to 4% fiber, etc.). The pulp suspension is subjected to non-laminar (e.g., turbulent) flow prior to insertion into the secondary discharge conduit.

In some embodiments, the paper fiber is generally delivered while in water. The fiber forms a suspension of pulp in the water. The paper fiber suspension is desirably in a non-laminar (e.g., turbulent) state when it is inserted into the slurry for forming the dense layer. In this regard, the pulp suspension is delivered in a sufficiently turbulent manner to avoid agglomeration of the paper fiber and the formation of flocs (e.g., having a length of at least 3 mm) in appreciable amounts. Flocs generally have fiber length of greater than 3 mm, such as from 3 mm to 8 mm, or from 3 mm to 5 mm. In this regard, it is desired to have 10% or less of the fibers in the form of such flocs so that the fiber suspension can be properly mixed into the dense layer slurry to allow for enhanced strength enhancement. In embodiments, 7% or less of the fibers form flocs, such as 5% or less, 3% or less, or 1% (e.g., from 1% to 10%, from 1% to 7%, from 1% to 5%, from 1% to 3%, from 3% to 10%, from 3% to 7%, from 3% to 5%, from 5% to 10%, from 5% to 8%, or from 7% to 10%, etc.) or less.

The paper fiber suspension can be prepared and inserted into the slurry for forming the dense layer in any suitable manner. To illustrate, in embodiments, paper fiber and water can be added and mixed in a tank containing an agitator to mix and maintain the contents therein as a suspension. The suspension is delivered to the secondary discharge conduit, e.g., via a passageway such as a pipe, tube, hose, duct, which terms may be used interchangeably, etc., with constricted inner diameter to promote forming the desired non-laminar (e.g., turbulent) state. The size of the inner diameter will vary depending on particular conditions including, fiber dimensions and the amount of fiber in the suspension. In some embodiments, the inner diameter of the hose is less than 0.625 inch (such as less than 0.5 inch or less than 0.375 inch, e.g., from 0.125 inch to 0.625 inch, from 0.125 inch to 0.5 inch, from 0.125 inch to 0.375 inch, from 0.125 inch to 0.225 inch, from 0.225 inch to 0.375 inch, from 0.25 inch to 0.625 inch, from 0.25 inch to 0.5 inch, from 0.25 inch to 0.375 inch, from 0.375 inch to 0.625 inch, or from 0.375 inch to 0.5 inch, etc.). The suspension desirably is maintained under the non-laminar, such as turbulent, condition upon entry into the secondary discharge conduit prior to being added to the slurry for forming the dense layer.

Paper fibers have a large aspect ratio (measured by length to the diameter), e.g., from 40:1 to 100:1, and results in significant contact among fibers in a pulp suspension. This contact can have a tendency to lead to undesirable formation of flocs. The present inventors have discovered that, surprisingly and unexpectedly, by avoiding formation of these flocs by the delivery of the fiber suspension in a non-laminar (e.g., turbulent) state, the fiber can be mixed properly and added effectively and homogenously to the slurry for forming the dense layer. In this manner, surprisingly and unexpectedly, the present inventors have discovered that plug flow can be avoided, by disrupting flocs by way of shear stress from non-laminar (e.g., turbulent) flow. In this regard, plug flow is undesirable and occurs when the pulp fibers interact with each other to form flocs and undesirably flow as a rigid body. This would otherwise result in a pulp suspension that is not homogeneous (i.e., a fiber concentrated floc phase and water phase).

Increased shear force from the turbulent flow is believed to disperse individual fibers in the water. Thus, in embodiments, the pulp suspension is in a turbulent flow so that the pulp fiber can be homogeneously transported and individual fibers can be dispersed in the dense layer gypsum slurry, instead of undesirably having flocs.

In some embodiments, the desired turbulent state is formed when the paper fiber suspension is subjected to a flow velocity greater than the onset velocity of turbulence of the paper fiber suspension. The onset velocity of turbulence can be determined according to a rheology test or a pulp head friction test. The rheology test is set forth in Ventura, C., "Modeling Pulp Fiber Suspension Rheology," TAPPI Journal, Vol. 6, No. 7, pages 17-23 (2007). The pulp head friction test is set forth in Ventura, C., "Flow Dynamics of Pulp Fiber Suspensions," TAPPI Journal, Vol. 7, No. 8, pages 20-26 (2008).

The fibers can be included in any suitable amount to water to form the suspension. By way of illustration, and not limitation, in one embodiment, paper fiber is added in water in an amount to form a pulp suspension containing 3% paper fiber. The pulp suspension is held in a holding tank equipped with an agitator and then pumped through a hose. In embodiments, the pulp suspension is added to the slurry for forming the dense layer at a flow velocity above the onset velocity of turbulence for that specific pulp suspension. The onset velocity of turbulence of the 3% pulp suspension according to the pipe head friction loss test as described herein was found to be 3 m/s. The diameter of the hose is selected to ensure that the pulp flows above 3 m/s and, thus, in a turbulent state. For this design, at a flow rate of 40.5 lbs/min, a hose having a 0.375 inch inner diameter produces a flow velocity of 3.2 m/s such that the pulp is in a turbulent state. Using this procedure, turbulence can be achieved at a given amount of fiber in a pulp suspension.

As an alternative test, Reynolds number ($R_e$) can be used to identify laminar and turbulent flows. The value of Reynolds number ($R_e$) can be expressed as $R_e = \rho VD/\mu$, wherein $\rho$ is the density of the fluid, V is the fluid velocity, D is the hydraulic diameter (of a passageway such as a pipe, tube, hose, duct, etc.), and $\mu$ is the fluid viscosity. The viscosity is measured using a rheometer with a shear rate ramp. Viscosity is defined at the velocity of the pulp in the hose. A flow is considered laminar if the Reynolds number is up to 2300. Thus, in some embodiments, the desired non-laminar flow can be expressed as having a Reynolds number greater than 2300. A flow is considered turbulent if the Reynolds number is greater than 3500 wherein a faster and irregular flow path maximizes the inertial force in the system. In some embodiments, the turbulent flow can be expressed as having a Reynolds number greater than 3500. In embodiments, the pipe head friction test is preferred as a technique to determine laminar versus turbulent flow. It is to be noted that it is not necessary that the type of flow be determined using the Reynolds number, nor is it necessary that laminar versus turbulent flow be determined by more than one of the alternate methods.

While both of the dense layer slurry and core slurry contain the ingredients included in the base slurry, separate additions into the primary discharge conduit and the secondary discharge conduit allow for individually tailoring of the formulations of the respective dense and core slurries. In this regard, the dense layer slurry contains the fiber (e.g., paper fiber) and, optionally, the strength-enhancing starch in greater quantities than the core slurry.

In embodiments, the core slurry contains additives (e.g., accelerator, retarder, polyphosphate, dispersant, migrating starch, etc.) in amounts greater than or about the same as the amounts by weight in the dense layer slurry. In this regard, some or all of these ingredients can optionally be inserted directly into the core slurry via the primary discharge conduit, in which case such additives would be present in a greater concentration in the core slurry than in the dense layer slurry. One or more of these additives could be inserted into the main mixer and hence would be present in the base slurry. Addition in this manner would lead to a similar concentration in the dense layer and the core layer. Surprisingly and unexpectedly, by selectively targeting particular ingredients into the dense and core slurries in this manner, board can be prepared at a low board weight and density, while maintaining good board strength (e.g., via nail pull resistance) in an efficient manner.

A first moving cover sheet (e.g., over a moving conveyor) is provided. The board is generally formed upside down at the wet end of the plant such that the first moving cover sheet is generally the face cover sheet, although this is not mandatory. The dense layer slurry is deposited over the moving cover sheet. The core slurry is deposited over the dense layer. A second moving cover sheet (e.g., the back paper) is applied over the core slurry layer to form a sandwich structure of a board precursor. In embodiments, the dense layer slurry is deposited onto the moving cover sheet upstream of the mixer, while the core slurry is deposited over the cover sheet bearing the dense layer, downstream of the mixer. In some embodiments, the secondary discharge conduit is disposed on the mixer upstream of the primary discharge conduit to conveniently accommodate this arrangement of depositing the layers relative to the positioning of the mixer.

If desired, it will be understood that the board can be prepared using two separate mixers equipped with agitators, with one mixer dedicated for preparing the core slurry and the other mixer dedicated for preparing the core slurry. As such, each of the dense layer and core slurries can be separately formulated (without the need for a base slurry) and discharged out of each mixer and then applied to form the board as described herein.

After the sandwich structure of the board precursor is formed at the wet end of the manufacturing line, the board precursor sets as it travels, e.g., by conveyor, to other stations, including a knife, where the board precursor is cut into segments. The board can then be flipped and dried in a kiln to form the final board product and processed at the dry end of the manufacturing line, e.g., to a final size, as understood by one of ordinary skill in the art.

Apparatus

Figure 2:
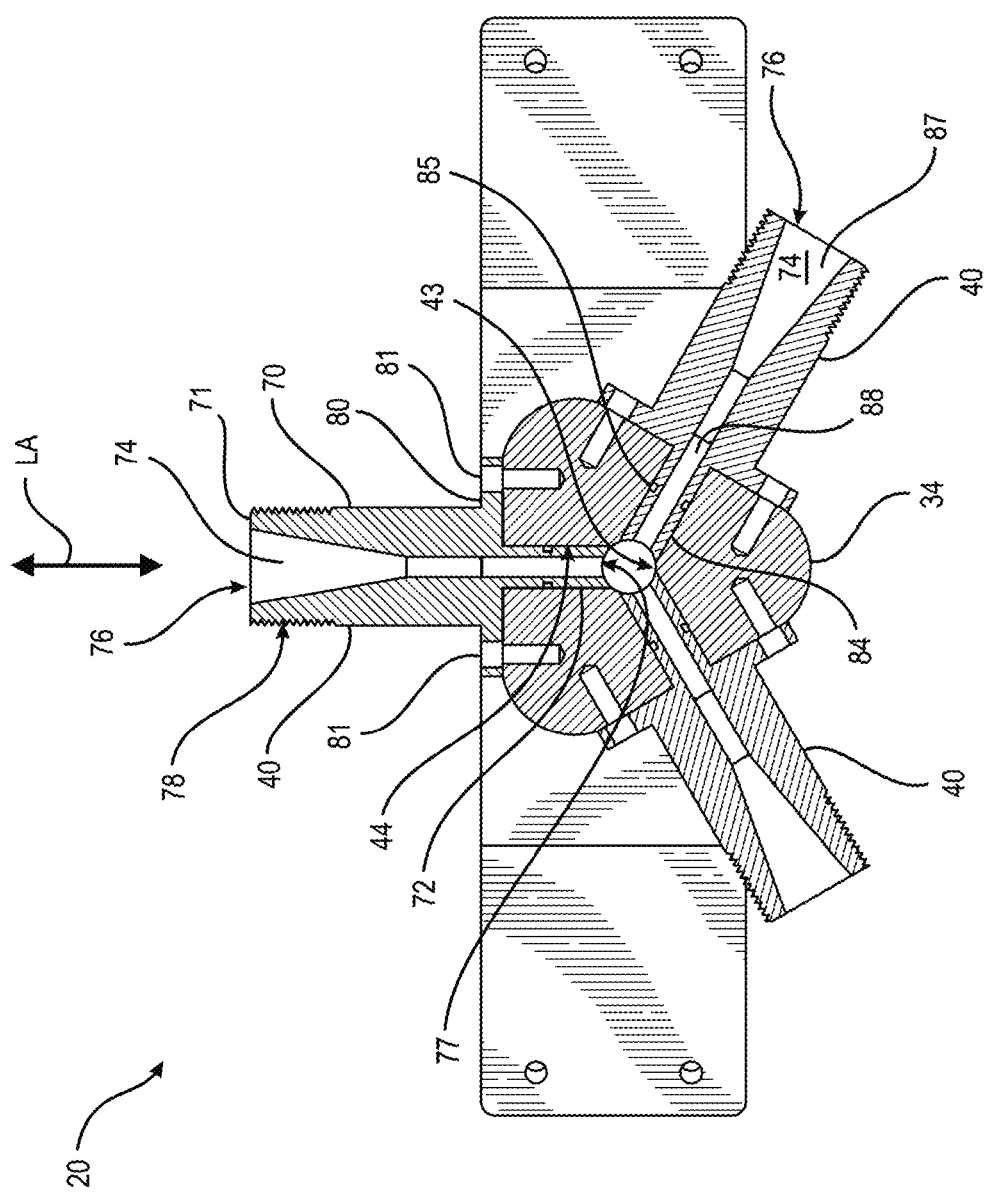
FIG. 2 is an end elevational view of the mixer extractor assembly of FIG. 1 with an additive injection system in section along a plane transverse to a longitudinal axis of the mixer extractor assembly.

Turning now to the Figures, an embodiment of an additive injection system 20 constructed according to principles of the present disclosure is shown in FIGS. 1 and 2. The additive injection system 20 is suitable for use in embodiments of a slurry mixing and dispensing assembly following principles of the present disclosure. In embodiments, the additive injection system 20 can be configured to introduce at least one additive into a secondary stream of cementitious slurry dispensed from a mixer into a secondary discharge conduit 21 such that the secondary stream of cementitious slurry is different from a core stream of cementitious slurry being dispensed from a main discharge conduit.

Referring to FIG. 1, in the illustrated embodiment, the additive injection system 20 comprises a mixer extractor configured for use in extracting and conveying a secondary slurry from the mixer. The additive injection system 20 includes an extractor 30, a secondary conduit section 32, an injection body 34, and a plurality of injection port members 40 attached to the injection body 34.

The extractor 30 can be any suitable extractor configured to facilitate the discharge of a secondary slurry stream from a mixer. In embodiments, the extractor 30 can be a commercially-available extractor which is compatible for use with the mixer with which it is intended to be used, as will be appreciated by one skilled in the art.

The conduit section 32 extends between the extractor 30 and the injection body 34. The conduit section 32 can comprise a portion of a secondary discharge conduit. In embodiments, a similar conduit section is installed downstream of the injection body 34 and is of sufficient length to deliver the secondary slurry to an appropriate discharge point along the manufacturing line.

In embodiments, the conduit 32 is made from any suitable resiliently flexible material, such as a suitable elastomeric material (Tygon® tubing or the like, e.g.), and is of sufficient strength and flexibility that, upon being subjected to radial compressive pressure, is capable of being reduced in size (e.g., to approximately one-half the original diameter). In embodiments, any conduit tubing exhibiting elastic properties can be used. Preferably, the conduit 32 has a cross-sectional diameter in a range between one inch and four inches and has a wall thickness of approximately ¼-inch. However, in other embodiments, other cross-sectional diameters and wall thicknesses can be used to suit the intended application. Exemplary factors which can influence the particular thickness and configuration of the conduit 32 employed include, among other things, the thickness of the wallboard being produced, the amount of slurry required, the distance between the mixer and the discharge point for the secondary slurry, and the particular characteristics of the slurry formulation, including the setting rate, the water/stucco ratio, fiber usage, and the percentage of any other additive desired.

In embodiments, the injection body 34 can comprise a portion of a secondary discharge conduit which is in fluid communication with a mixer adapted to produce a main core stream and at least one secondary stream of cementitious slurry. The injection body 34 can be made from any suitable material, such as a suitable metal or any other suitable material which can be used to convey cementitious slurry therethrough during the manufacture of a cementitious product, using any suitable technique. In embodiments, the injection body 34 can be made from a suitable metal, such as, aluminum, stainless steel, brass, etc. In embodiments, at least a portion of the injection body 34 can be plated with a suitable material (e.g., chrome) to increase its durability.

Referring to FIGS. 1 and 2, the injection port members 40 can be removably mounted to the injection body 34 via suitable threaded fasteners. The injection body 34 is compatible with different types of injection port members having a similar footprint and exterior mounting structure but with different interior passageways for the additive(s) to be conveyed therethrough. The injection port members 40 and the injection body 34 shown in FIG. 2 comprise an embodiment of an additive injection system 20 constructed in accordance with principles of the present disclosure. In embodiments, a suitable number of the injection port members 40 can be associated with the injection body 34. The different types of injection port members can be interchangeably used with the injection body 34 to inject one or more additives (such as, aqueous fiber, e.g.) into a flow of cementitious slurry passing through the injection body 34 under different flow conditions. In use, a set of injection port members including at least one different type of injection port member from the other injection port members in the set can be removably mounted to the injection body 34 at a given time.

Figure 3:
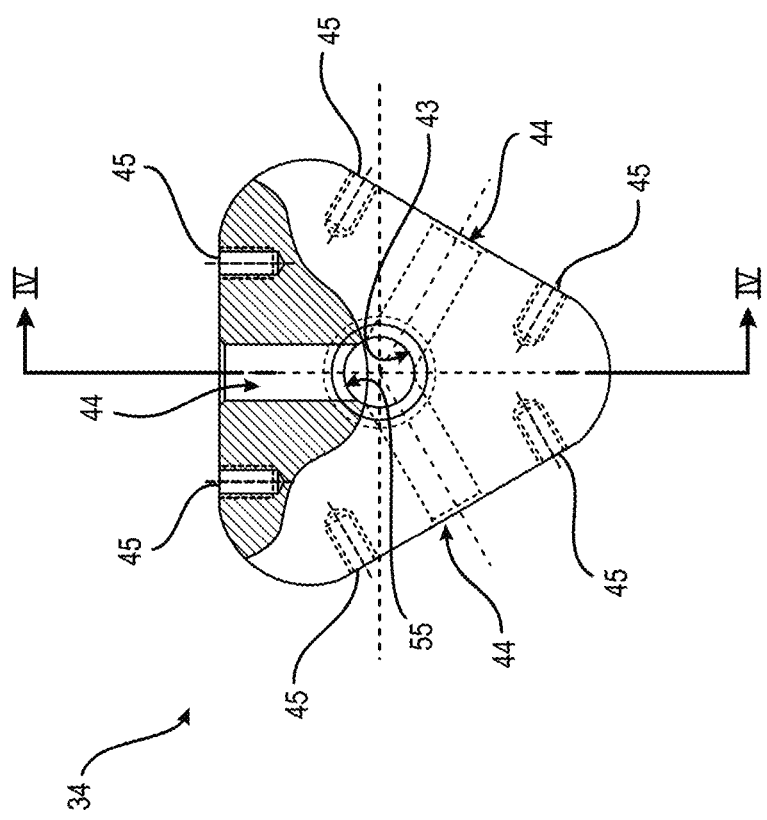
FIG. 3 is an end elevational view of an additive injection body of the additive injection system of FIG. 2, showing for illustrative purposes the additive injection body partially in section.
Figure 4:
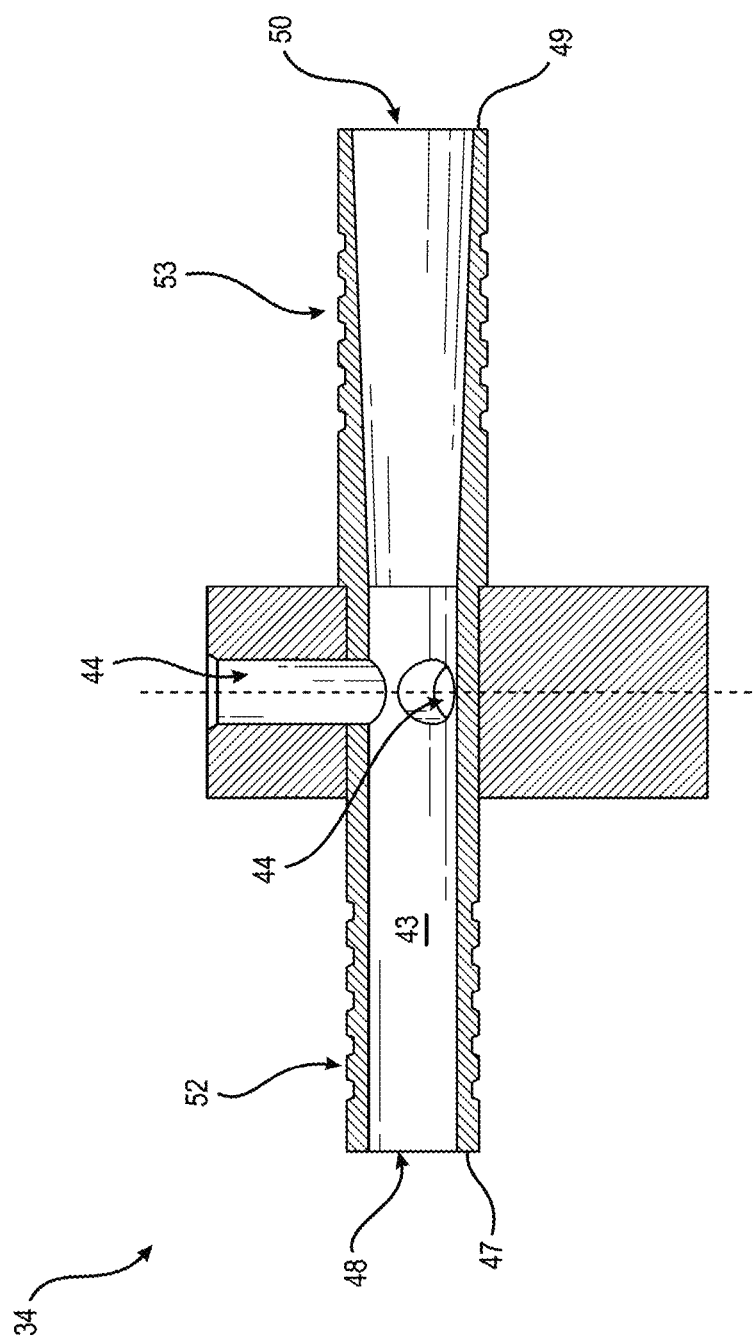
FIG. 4 is a cross-sectional view of the additive injection body of FIG. 3 taken along line IV-IV in FIG. 3.

Referring to FIGS. 3 and 4, in embodiments, the injection body 34 defines a slurry passageway 43 and at least one port passageway 44 in fluid communication with the slurry passageway 43. In embodiments, the injection body 34 defines at least two port passageways 44 in fluid communication with the slurry passageway 43.

Referring to FIG. 3, in the illustrated embodiment, the injection body 34 defines three port passageways 44 in fluid communication with the slurry passageway 43. In embodiments, the additive injection system 301 can include at least two sets of different types of injection port members, each corresponding to the number of port passageways 44 in the injection body 34. The injection body 34 defines a plurality of tapped fastener bores 45 configured to threadingly receive therein a fastener for mounting a suitable injection port member to the injection body 34 such that the injection port member is associated with one of the port passageways 44.

Referring to FIG. 4, in embodiments, the slurry passageway 43 of the injection body 34 is adapted to receive a flow of cementitious slurry and convey it to a downstream part of the manufacturing system. The illustrated injection body 34 comprises a part of a secondary discharge conduit and includes a slurry inlet end 47 defining a slurry inlet opening 48 and a slurry discharge end 49 defining a slurry discharge opening 50. The slurry passageway 43 is in fluid communication with the slurry inlet opening 48 and the slurry discharge opening 50. In embodiments, the slurry inlet end 47 and the slurry discharge end 49 can be adapted to be secured to an upstream portion and a downstream portion, respectively, of a cementitious mixing and dispensing assembly.

The illustrated slurry inlet end 47 and the slurry discharge end 49 of the injection body 34 each has an external barbed surface 52, 53 which is configured to promote a friction fit between the external barbed surface 52, 53 and an internal surface of a suitably-sized secondary discharge conduit. An adjustable hose clamp can be fitted to the exterior surface of the discharge conduit, placed in overlapping relationship with the portion of the injection body 34 disposed within the slurry conduit, and tightened to further promote the retentive engagement of the discharge conduit to the injection body 34.

In embodiments, the slurry inlet end 47 of the injection body 34 can be adapted to be placed in fluid communication with a slurry mixer and to receive a secondary flow of slurry therefrom. One or more additives, such as aqueous fiber, for example, can be injected into the secondary flow of slurry inside the slurry passage 43 via one or more injection port members which are removably mounted to the injection body 34 to form a dense slurry. The dense slurry can be discharged from the injection body 34 out the slurry discharge end 49. In embodiments, the slurry discharge end 49 of the injection body 34 can be arranged with a delivery conduit of the secondary discharge conduit which is adapted to convey the dense slurry to a discharge point for application to one of the cover sheets. In the illustrated embodiment, the slurry discharge opening 50 is larger than the slurry inlet opening 48 to account for the introduction of the additive(s) via the injection port member(s).

Referring to FIG. 3, each of the illustrated port passageways 44 has a similar construction. Accordingly, it should be understood that the description of one port passageway 44 is equally applicable to each of the other port passageways 44, as well. Each port passageway 44 has a port opening 55 in fluid communication with the slurry passageway 43. Each port passageway 44 is disposed in substantially perpendicular relationship to a direction of slurry flow through the slurry passage 43. In other embodiments, at least one port passageway 44 can have a different orientation with respect to the slurry passage 43 along at least one plane relative to the direction of slurry flow through the slurry passageway 43.

The illustrated port passageways 44 are substantially evenly spaced with respect to each other about the circumference of the slurry passageway 43 so that they are about one hundred twenty degrees apart from each other. In other embodiments, the injection body 34 can define different relative spacing between the port passageways 44.

Referring to FIG. 2, each of the illustrated injection port members 40 has a similar construction. Accordingly, it should be understood that the description of one injection port member 40 is equally applicable to each of the other injection port members 40, as well. In embodiments, the injection port members 40 are suitable for use in embodiments of an additive injection system 20 following principles of the present disclosure. The injection port members 40 can be adapted to receive a flow of at least one additive, such as aqueous fiber from a fiber supply conduit in fluid communication with a supply of aqueous fiber, such as from a tank of aqueous fiber, for example, and inject the additive(s) into a cementitious slurry passing through the slurry passageway 43 of the compatible injection body 34 of the additive injection system 20 to which the injection port members 40 are removably mounted.

Each injection port member 40 can be made from any suitable material, such as a suitable metal or any other suitable material which can be used to convey an additive therethrough at a pressure suitable for injecting the additive(s) into cementitious slurry during the manufacture of a cementitious product, using any suitable technique. In embodiments, the injection port member 40 can be made from a suitable metal, such as, aluminum, stainless steel, brass, etc. In embodiments, at least a portion of the injection port member 40 can be plated with a suitable material (e.g., chrome) to increase its durability.

Referring to FIG. 2, each injection port member 40 includes a port insert body 70 extending along a longitudinal axis LA between an additive supply end 71 and a mounting end 72. The port insert body 70 is generally in the form of a hollow cylinder such that the injection port member 40 defines an additive passageway 74 therethrough. The additive supply end 71 defines an additive inlet opening 76, and the mounting end 72 defines an additive outlet opening 77 (see FIG. 4 also). The additive passageway 74 extends between, and is in fluid communication with, the additive inlet opening 76 and the additive outlet opening 77.

The injection port member 40 is adapted to removably mount to a mating injection body 34 such that the additive passageway 74 is in fluid communication with the slurry passageway 43 of the injection body 34 through a port passageway 44 defined in the injection body 34 and in fluid communication with the slurry passageway 43. The injection port member 40 is adapted to receive a flow of additive(s) entering the additive inlet opening 76 and inject the flow of additive(s) into a flow of cementitious slurry passing through the slurry passage 43 of the injection body 34 to which the injection port member 40 is removably mounted by discharging the flow of additive(s) out of the additive outlet opening 77.

The supply end 71 is adapted for retentive engagement with a suitable additive(s) supply conduit. The illustrated supply end 71 includes an external threaded surface 78 which is adapted to sealingly engage a mating internal threaded surface of a suitable coupling of an additive(s) supply conduit.

In other embodiments, the supply end 71 can include another suitable mounting structure for retentive coupling with an additive(s) supply conduit. For example, in other embodiments, the supply end 71 can include an external barbed surface which can promote a friction fit between the external barbed surface and an internal surface of a suitably-sized supply conduit. An adjustable hose clamp can be fitted to the exterior surface of the additive(s) supply conduit, placed in overlapping relationship with the portion of the supply end 71 disposed within the additive(s) supply conduit, and tightened to further promote the retentive engagement of the additive(s) supply conduit to the supply end 71 of the injection port member 40.

In embodiments, the mounting end 72 of the injection port member 40 can include structure suitable for removably mounting the injection port member 40 to a mating injection body 34. In embodiments, at least a portion of the mounting end 72 of the injection port member 40 can be disposed in a port passageway 44 of the injection body 34 when the injection port member 40 is removably mounted thereto, as shown, e.g., in FIG. 2.

The illustrated injection port member 40 includes a mounting flange 80 extending radially outwardly from the port insert body 70. The mounting flange 80 defines a pair of mounting holes 81, which are each configured to receive a fastener therethrough. In embodiments, the mounting flange 80 can define only one mounting hole 81 or more than two mounting holes 81. Each mounting hole 81 of the mounting flange 80 can be adapted to align with a mating mounting hole 45 defined in the compatible injection body 34 so that one or more fasteners can be used to removably mount the injection port member 40 to the compatible injection body 34.

Referring to FIG. 2, each injection port member 40 is configured to removably mount to the injection body 34 such that the mounting end 72 of the injection port member 40 is disposed within a port passageway 44 defined in the injection body 34. The mounting end 72 of the illustrated injection port member 40 includes a distal portion 84 having a reduced exterior diameter. An elastomeric o-ring 85 can be fitted around the distal portion 84 for sealing engagement with the port passageway 44 of the injection body 34.

In embodiments, the injection port member can be secured using other techniques. For example, in embodiments, the mounting end 72 of the injection port member 40 can include a threaded surface adapted to retentively engage a mating threaded surface of the injection body 34, which can be associated with the port passageway 44. In embodiments, the mating threaded surface of the injection body 34 can be an internal threaded surface in each port passageway 44 of the injection body 34.

To facilitate the compatibility of different types of injection port members with the same additive(s) supply conduit and the same mating injection body 34, the additive passageway 74 can include a tapered entry portion 87 and a main portion 88. The tapered entry portion 87 can include the inlet opening 76. The entry portion 87 can provide a variable transition area in which the flow of additive(s) moves from the supply conduit with a particular cross-sectional area to the main portion 88 of the additive passageway 74, which includes an orifice with an orifice size that is different from the size of the supply conduit. In embodiments, the entry portion 87 can be configured to facilitate the transition of the flow of additive(s) from the supply conduit to the injection port member 40 to help promote the injection of the additive(s) into the secondary stream.

The illustrated entry portion 87 is generally frusto-conical in longitudinal cross-section. In other embodiments, the entry portion 87 can have a different shape adapted to transition the flow of additive(s) from the supply conduit with a supply outlet opening having a particular cross-sectional area to the main portion 88 of the additive passageway 74. The illustrated additive inlet opening 76 has a size that is larger than the orifice size of the outlet opening 77. The illustrated main portion 88 has a cross-sectional size corresponding to the orifice size of the outlet opening 77. The illustrated main portion 88 has a substantially uniform cross-sectional area along its length over the longitudinal axis LA.

In embodiments, the geometry of the slurry passage 43 within the injection body 34 is not compromised or disrupted when the different types of injection port members are mounted to the injection body 34. In embodiments, the injection port member does not project into the slurry passage 43 when it is fully mounted to the injection body 34 so that the flow of cementitious slurry through the slurry passage 43 is not disrupted by a structural feature of the injection port member.

In embodiments, the injection port member 40 can be adapted to include a flush-mounting feature wherein the mounting end 72 is substantially flush with the interior geometry of the slurry passageway 43 of a compatible injection body 34. In the illustrated embodiment, the mounting end 72 of the injection port member 40 has a distal end face with a concave portion with a radius of curvature that matches that of the slurry passageway 43 to define a substantially flush interface therebetween.

In embodiments, different types of injection port members can have differently-shaped additive passageways 74. In embodiments, the additive passageway 74 can have a configuration adapted to promote a fluid flow characteristic. In embodiments, each one of the different types of injection port members is adapted to be removably mounted to any one of the port passageways 44 of the injection body 34.

Each type of injection port members is adapted to removably mount to the injection body 34 such that the respective additive passageway 74 is in fluid communication with the slurry passageway 43 via the port passageway 44 with which the injection port member is associated. In the illustrated embodiment, each port passageway 44 is configured to receive the mounting end 72 of either of at least two types of injection port member therein.

In embodiments, each type of injection port member is adapted to removably mount to the injection body 34 in the same way as the first type of injection port member 40 such that its respective additive passageway is in fluid communication with the slurry passageway 43 via the port passageway 44 with which it is associated. In embodiments of an additive injection system according to principles of the present disclosure, first and second types of injection port members can be provided which are similar in construction, including mounting structure, but with different orifice sizes and/or additive passageway features. Each type of injection port member can be removably mounted to the same compatible injection body 34 so that the respective additive passageway is in fluid communication with the slurry passageway 43 of the injection body 34 via the port passageway 44. The particular injection port member 40 mounted to the injection body 34 can be removed and replaced with the other type of injection port member to modify the flow of additive(s) into the slurry passage 43 of the mating injection body 34, such as to vary the injection pressure into the flow of cementitious slurry passing through the slurry passageway 43 of the injection body 34.

In embodiments, an additive injection system according to principles of the present disclosure can include more than two types of injection port members each with an additive passageway having a different shape and/or size configured to produce at least one variable flow characteristic through the use of the different types of injection port members. In embodiments, an additive injection system according to principles of the present disclosure can include a set of different types of injection port members which have additive passageways with different orifice sizes of a variable inner diameter over a predetermined range, such as a set of different types of injection port members having a variable orifice size between an inner diameter of ¼ of an inch and one inch, for example. In embodiments, the set of different types of injection port members can be incrementally sized over the range of orifice sizes, such as a set of different types of injection port members which have orifice sizes with an inner diameter increasingly sized from ¼ of an inch to one inch by an increment of 1/16 of an inch (i.e., ¼ of an inch, 5/16 of an inch, 3/8 of an inch, 7/16 of an inch, ½ of an inch, 9/16 of an inch, 5/8 of an inch, 11/16 of an inch, ¾ of an inch, 13/16 of an inch, 7/8 of an inch, 15/16 of an inch, and 1 inch). In other embodiments, different increments and/or ranges of orifice sizes can be used (including metric sets).

Figure 5:
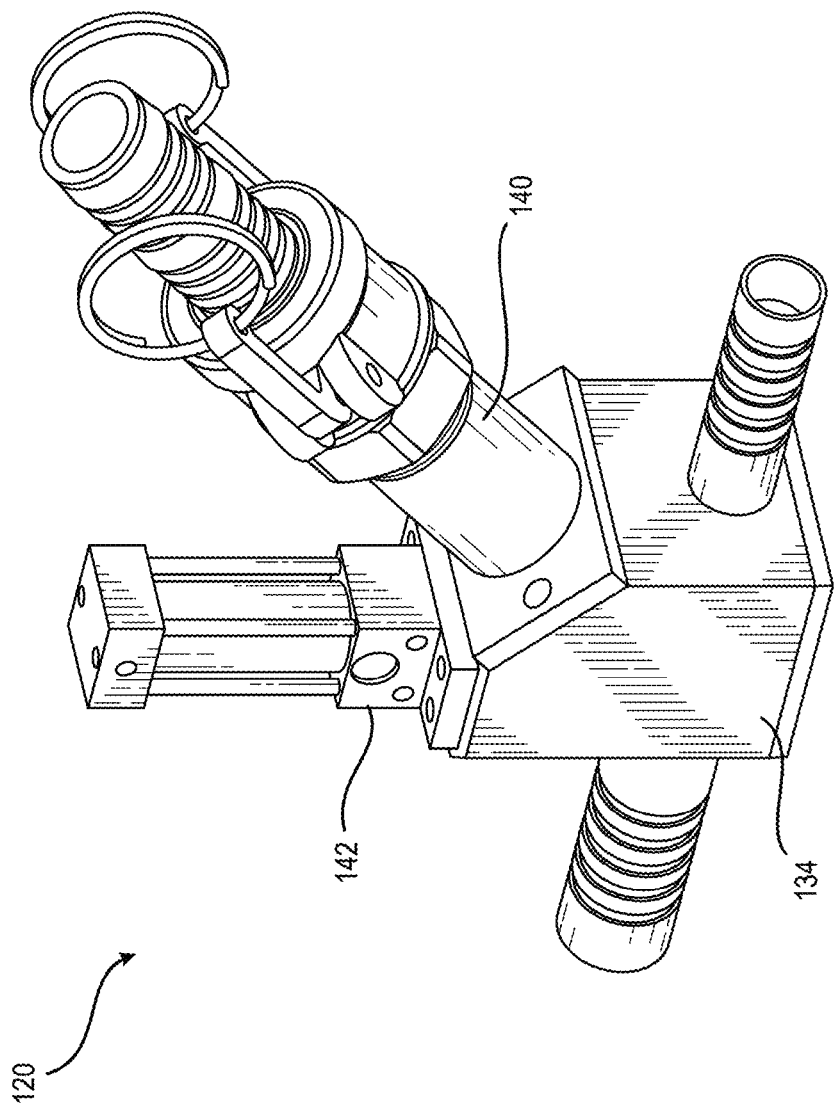
FIG. 5 is a perspective view, from a first end thereof, of another embodiment of an additive injection system constructed according to principles of the present disclosure.
Figure 6:
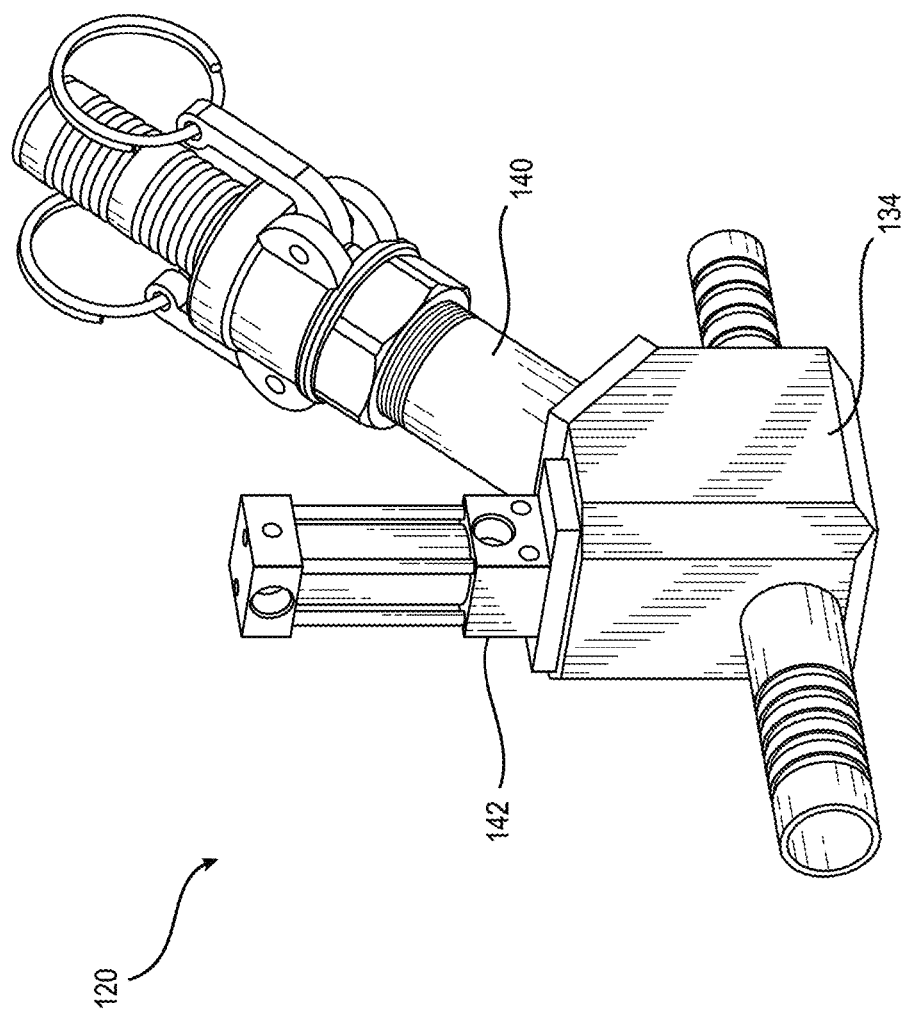
FIG. 6 is a perspective view, from a second end thereof, of the additive injection system of FIG. 5.
Figure 7:
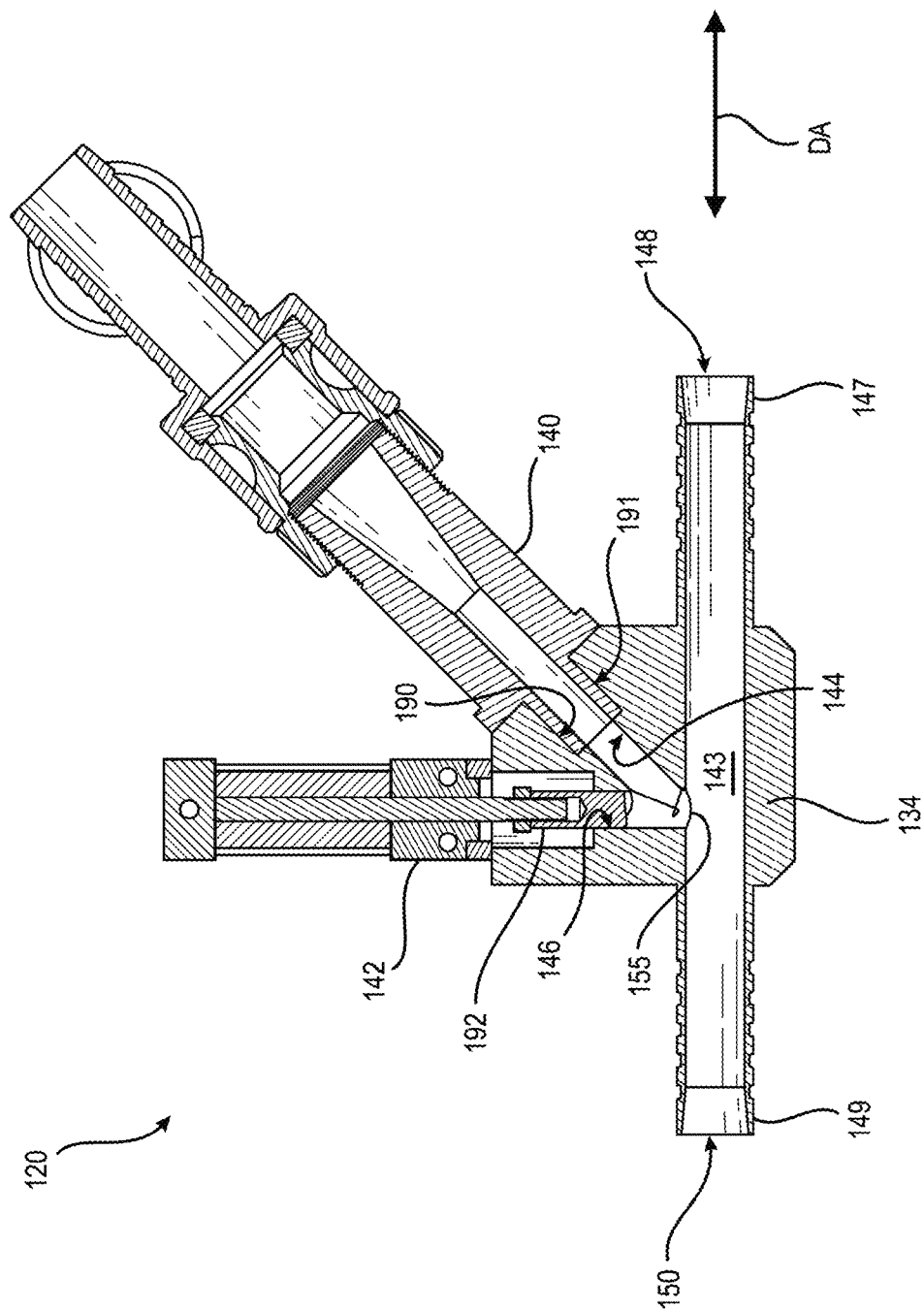
FIG. 7 is a longitudinal cross-sectional view of the additive injection system of FIG. 5.

Referring to FIGS. 5-7, another embodiment of an additive injection system 120 constructed according to principles of the present disclosure is shown. The additive injection system 120 is suitable for use in embodiments of a slurry mixing and dispensing assembly following principles of the present disclosure. In embodiments, the additive injection system 120 can be configured to introduce at least one additive into a secondary stream of cementitious slurry dispensed from a mixer into a secondary discharge conduit such that the secondary stream of cementitious slurry is different from a core stream of cementitious slurry being dispensed from a main discharge conduit of the mixer.

Referring to FIGS. 5 and 6, in the illustrated embodiment, the additive injection system 120 includes an injection body 134, an injection port member 140 removably attached to the injection body 134, and a valve 142 mounted to the body 134. Referring to FIG. 7, in embodiments, the injection body 134 can comprise a portion of a secondary discharge conduit which is in fluid communication with a mixer adapted to produce a main core stream and at least one secondary stream of cementitious slurry. The injection body 134 defines a slurry passageway 143, a port passageway 144 in fluid communication with the slurry passageway 143, and a valve passageway 146 in communication with the port passageway 144.

The slurry passageway 143 of the injection body 134 is adapted to receive a flow of cementitious slurry and convey it to a downstream part of the manufacturing system. The illustrated injection body 134 comprises a part of a secondary discharge conduit and includes a slurry inlet end 147 defining a slurry inlet opening 148 and a slurry discharge end 149 defining a slurry discharge opening 150. The slurry passageway 143 is in fluid communication with the slurry inlet opening 148 and the slurry discharge opening 150. In embodiments, the slurry inlet end 147 and the slurry discharge end 149 can be adapted to be secured to an upstream portion and a downstream portion, respectively, of a cementitious mixing and dispensing assembly.

The port passageway 144 is configured to be associated with one of a plurality of different types of injection port members 140 for receiving a flow of additive(s) in the slurry passageway 143 via the injection port member 140 mounted to the body 134. The port passageway 144 can include an internal threaded surface 190 for threadingly mating with an external threaded surface 191 of the injection port member 140. The port passageway 144 is disposed at a nominal forty-five degree port angle to a discharge axis DA defined by the slurry passageway 143. In embodiments, the port angle can be in a range between fifteen degrees and seventy-five degrees. The injection port member 140 is adapted to removably mount to the mating injection body 34 such that the additive passageway 174 is in fluid communication with the slurry passageway 143 of the injection body 134 through the port passageway 144 defined in the injection body 134 and in fluid communication with the slurry passageway 43.

The valve passageway 146 is configured to receive the valve 142 therein. In embodiments, the valve 142 is configured to selectively occlude the port opening 155 of the port passageway 144. In embodiments, the valve 142 can be controlled to occlude the port opening 155 of the port passageway 144 when no additive is being injected through the injection port member 140 mounted to the body 134.

In embodiments, any suitable valve 142 can be used to occlude the port opening 155. In the illustrated embodiment, the valve 142 comprises a pneumatic valve which can be arranged with a suitable air supply that is controlled to reciprocally move a piston 192 between an open position (as shown in FIG. 7) in which a flow of additive(s) can be injected into the slurry passage 143 via the injection port member 140 and a closed position in which the port opening is occluded by the piston 192. The additive injection system 120 can be similar in other respects to the additive injection system 20 of FIG. 1 as will be appreciated by one skilled in the art.

Referring to FIGS. 8-12, another embodiment of an injection body 434 is shown which is suitable for use in an additive injection system constructed according to principles of the present disclosure. The injection body 434 is suitable for use in embodiments of a slurry mixing and dispensing assembly following principles of the present disclosure. In embodiments, the injection body 434 can be configured to introduce at least one additive into a secondary stream of cementitious slurry dispensed from a mixer into a secondary discharge conduit such that the secondary stream of cementitious slurry is different from a core stream of cementitious slurry being dispensed from a main discharge conduit of the mixer.

Figure 8:
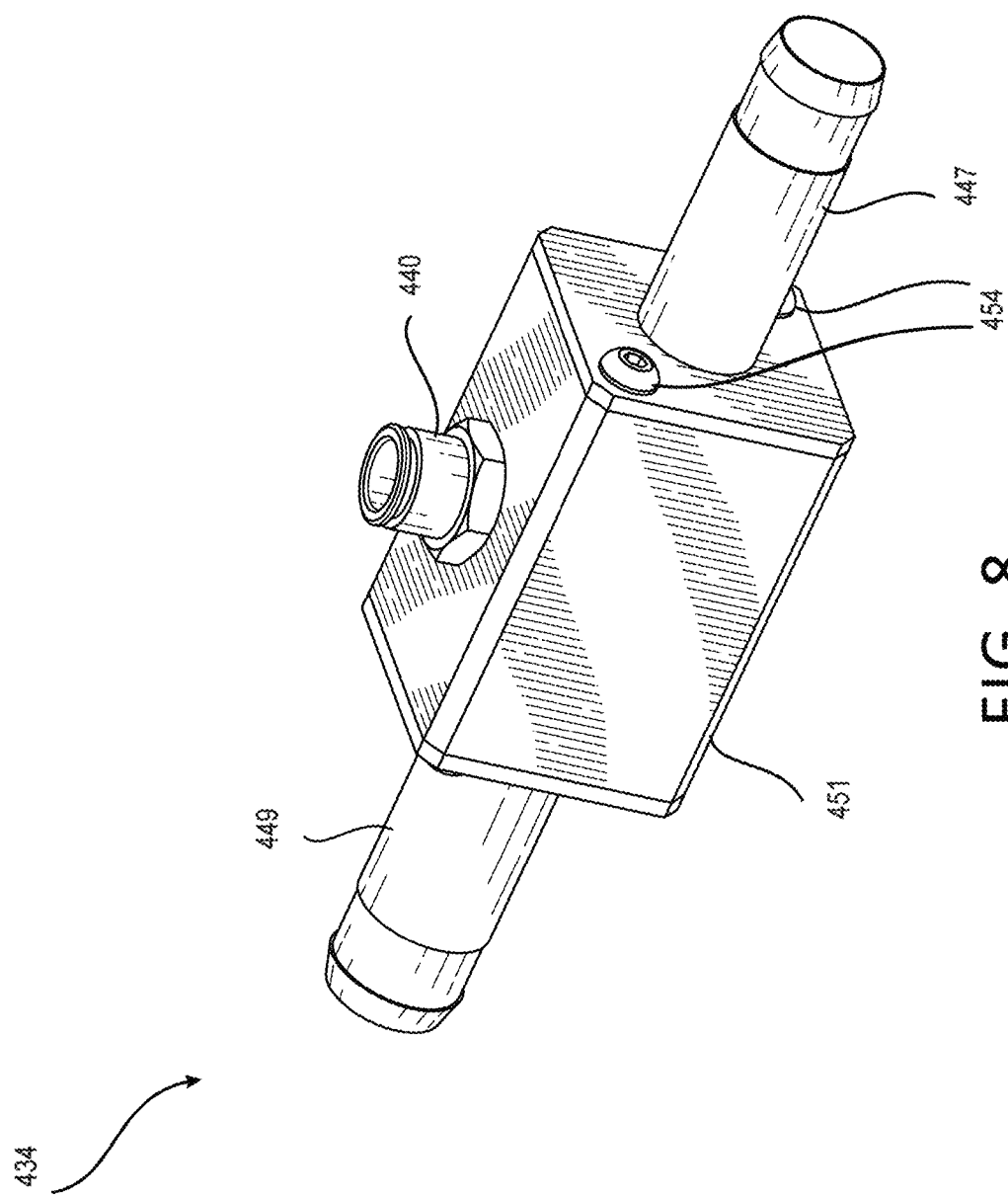
FIG. 8 is a perspective view of another embodiment of an additive injection body constructed according to principles of the present disclosure.
Figure 9:
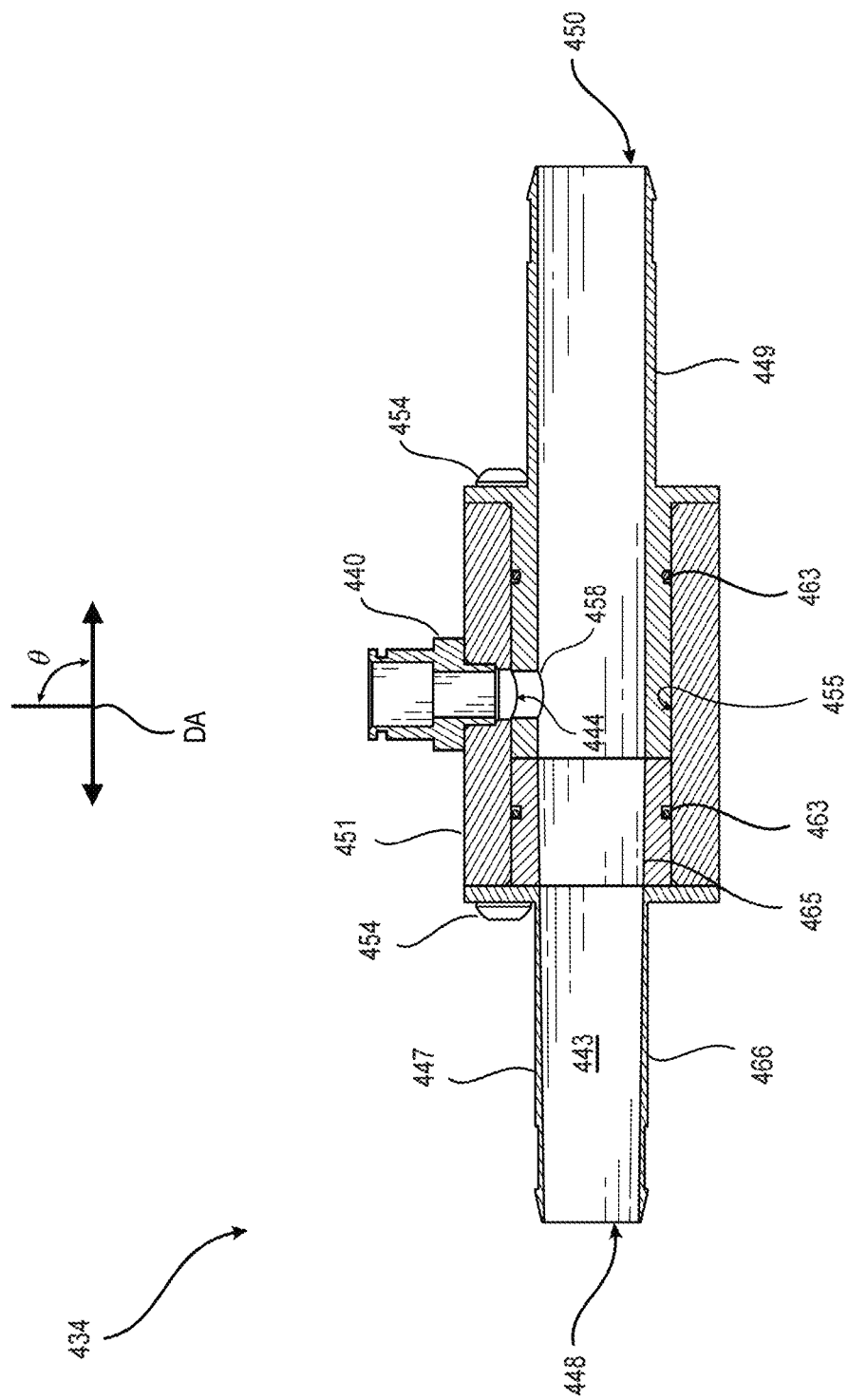
FIG. 9 is side elevational view, in section, of the additive injection body of FIG. 8.

Referring to FIGS. 8 and 9, in embodiments, the injection body 434 can comprise a portion of a secondary discharge conduit which is in fluid communication with a mixer adapted to produce a main core stream and at least one secondary stream of cementitious slurry. In the illustrated embodiment, the injection body 434 includes an injection port member 440, a slurry inlet member 447, a slurry discharge member 449, and an injection block 451. The injection port member 440 is removably attached to the injection block 451 via a threaded connection. The slurry inlet member 447 and the slurry discharge member 449 are removably connected to opposing ends of the injection block 451 via threaded fasteners 454.

Referring to FIG. 9, the components of the injection body 434 are hollow such that they define internal passageways which cooperate together to define a slurry passageway 443 and a port passageway 444. The slurry inlet member 447 and the slurry discharge member 449 are in abutting relationship to each other and define the slurry passageway 443 which extends through a longitudinal through bore 455 defined in the injection block 451 (see also, FIG. 10). The injection block 451 defines the port passageway 444 which is in fluid communication with the slurry passageway 443 via a crossbore opening 458 defined in the slurry discharge member 449 (see also, FIG. 12). In embodiments, the injection block 451 can define more than one port passageway 444, each of which being in fluid communication with the slurry passageway 443.

Referring to FIG. 9, in embodiments, the slurry passageway 443 of the injection body 434 is adapted to receive a flow of cementitious slurry and convey it to a downstream part of the manufacturing system. The illustrated injection body 434 comprises a part of a secondary discharge conduit and includes a slurry inlet member 447 defining a slurry inlet opening 448 and a slurry discharge member 449 defining a slurry discharge outlet opening 450. The slurry passageway 443 is in fluid communication with the slurry inlet opening 448 and the slurry discharge outlet opening 450. In embodiments, the slurry inlet member 447 and the slurry discharge member 449 can be adapted to be secured to an upstream portion and a downstream portion, respectively, of a cementitious mixing and dispensing assembly.

In embodiments, the slurry inlet member 447 of the injection body 434 can be adapted to be placed in fluid communication with a slurry mixer and to receive a secondary flow of slurry therefrom. One or more additives, such as aqueous fiber, for example, can be injected into the secondary flow of slurry inside the slurry passageway 443 to form a dense slurry via one of a selected set of injection port members 440 which is removably mounted to the injection block 451 such that it is in fluid communication with the port passageway 444. The dense slurry can be discharged from the injection body 434 out of the slurry discharge outlet opening 450 of the slurry discharge member 449. In embodiments, the slurry discharge member 449 of the injection body 434 can be arranged with a delivery conduit of the secondary discharge conduit which is adapted to convey the dense slurry to a discharge point for application to one of the cover sheets. In the illustrated embodiment, the cross-sectional area of the slurry discharge outlet opening 450 is larger than the cross-sectional area of the slurry inlet opening 448 to account for the introduction of the additive(s) via the injection port member(s).

The injection port member 440 is adapted to removably mount to the injection block 451 such that the additive passageway is in fluid communication with the slurry passageway 443 of the injection body 434 through the port passageway 444 defined in the injection block 451 and in fluid communication with the slurry passageway 443. In embodiments, the port passageway 444 is configured to be associated with one of a plurality of different types of injection port members 440 for receiving a flow of additive(s) in the slurry passageway 443 via the injection port member 440 mounted to the injection block 451. In embodiments, a set of at least two different types of injection port members can be provided. For example, in embodiments at least one injection port member can have a through passage with an inner diameter that is different from one other injection port member. In other embodiments, at least one injection port member can include a restriction in its through passage that is not found in at least one other of the set of injection port members. Each such injection port member can be serially, threadedly mounted to the injection block 451 via the mating threaded surfaces such that the through passage of each is in fluid communication with the port passageway 444.

The port passageway 444 is disposed at a nominal ninety degree port angle $\theta$ to a discharge axis DA defined by the slurry passageway 443. In embodiments, the port angle $\theta$ can be in a range between forty-five degrees and one hundred thirty-five degrees. In embodiments, the port angle $\theta$ can be in a range between sixty degrees and one hundred twenty degrees. In embodiments, the port angle $\theta$ can be in a range between seventy-five degrees and one hundred five degrees. In embodiments, the flow of additive(s) being conveyed to the injection block 451 is turbulent. Turbulent flow is maintained as the flow of additive(s) passes through the port passageway 444 into the slurry passageway 443 where it mixes with the base slurry coming from the mixer and travelling through the slurry passageway 443.

Figure 10:
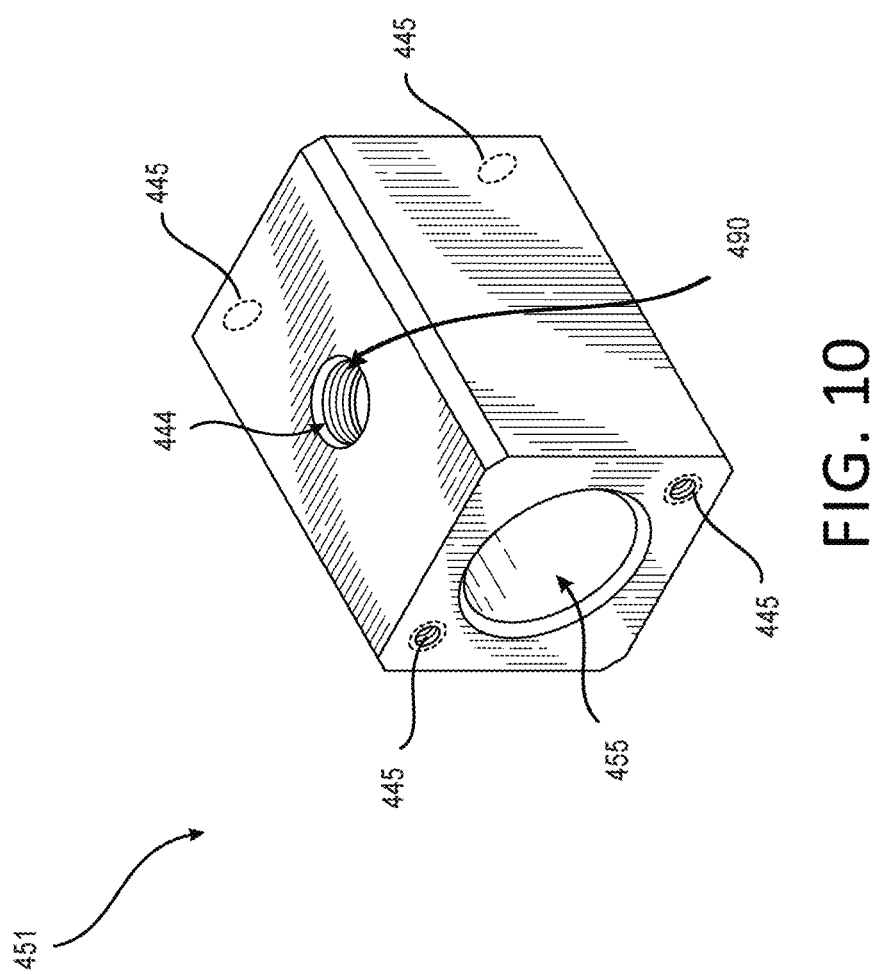
FIG. 10 is a perspective view of an additive injection block of the additive injection body of FIG. 8.

Referring to FIGS. 9 and 10, in the illustrated embodiment, the injection block 451 defines one port passageway 444 in fluid communication with the longitudinal through bore 455. Referring to FIG. 10, the injection block 451 defines a plurality of tapped fastener bores 445 configured to threadingly receive therein one of the fasteners 454 for mounting the slurry inlet member 447 and the slurry discharge member 449 to a respective one of the ends of the injection block 451. The port passageway 444 includes an internal threaded surface 490 configured to threadingly mate with an external surface of the injection port member such that the injection port member is fluidly associated with the port passageway to convey fluid passing therethrough to the slurry passageway.

Figure 11:
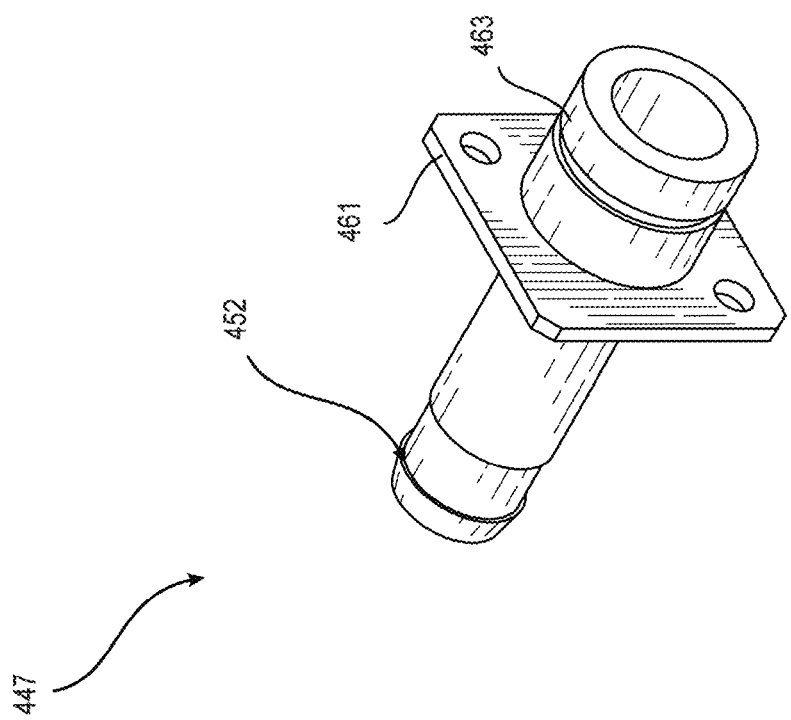
FIG. 11 is a perspective view of an inlet portion of the additive injection body of FIG. 8.
Figure 12:
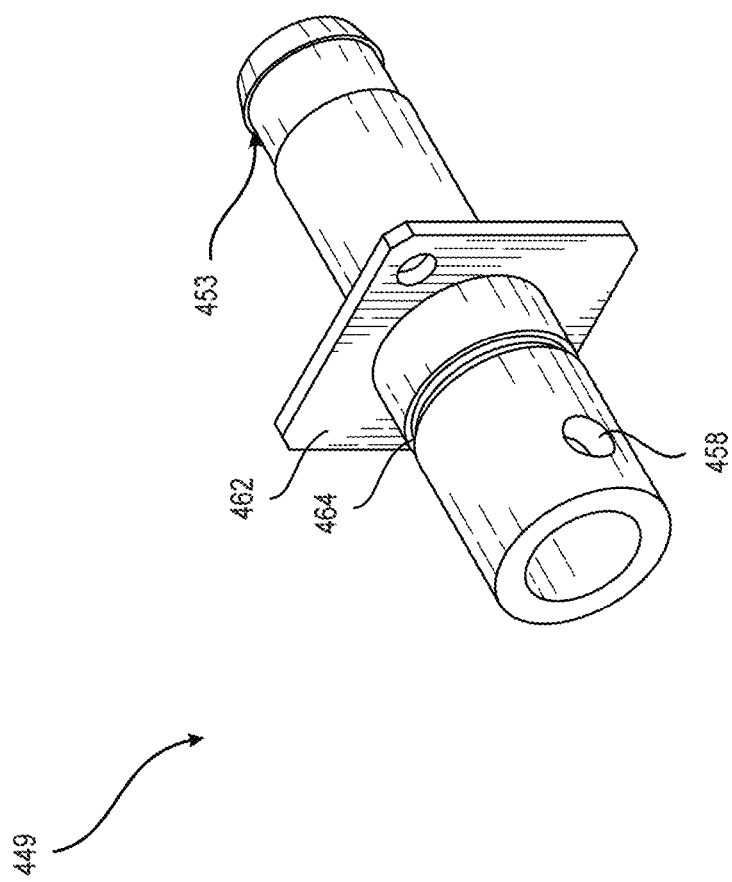
FIG. 12 is a perspective view of an outlet portion of the additive injection body of FIG. 8.

Referring to FIG. 11, a perspective view of the slurry inlet member 447 of the additive injection body 434 of FIG. 10 is shown. Referring to FIG. 12, a perspective view of the slurry discharge member 449 of the additive injection body 434 of FIG. 10 is shown. The illustrated slurry inlet member 447 and the slurry discharge member 449 of the injection body 434 each has an external barbed surface 452, 453 which is configured to promote a friction fit between the external barbed surface 452, 453 and an internal surface of a suitably-sized secondary discharge conduit. An adjustable hose clamp can be fitted to the exterior surface of the discharge conduit, placed in overlapping relationship with the portion of the respective member 447, 449 disposed within the slurry conduit, and tightened to further promote the retentive engagement of the discharge conduit to the injection body 434.

Referring to FIGS. 11 and 12, each of the slurry inlet member 447 and the slurry discharge member 449 includes a mounting flange 461, 462 for securing the respective member 447, 449 to the injection block 451 with the fasteners 454. An elastomeric o-ring 463, 464 can be fitted around an external surface of each of the slurry inlet member 447 and the slurry discharge member 449 for sealing engagement with the longitudinal through bore 455 of the injection block 451.

Referring to FIG. 9, the elastomeric o-rings 463, 464 are respectively disposed upstream and downstream of the port passageway 444 to effectively seal it to help prevent the flow of additive(s) from leaking from the injection block 451. The slurry inlet member 447 includes a terminal downstream portion 465 which includes an expanded internal cross-sectional area relative to its upstream portion 466. The slurry discharge member 449 has an internal cross-sectional area that is substantially the same as the expanded cross-sectional area of the terminal downstream portion 465 of the slurry inlet member 447.

In embodiments, the expansion zone created by the terminal downstream portion 465 of the slurry inlet member 447 and the slurry discharge member 449 can help to alleviate process problems that may occur as a result of introducing the flow of additive(s) via the port passageway 444 into the slurry passing through the slurry passageway 443.

In embodiments, the additive injection block 434 can be similar in other respects to the additive injection block 34 of FIG. 1 as will be appreciated by one skilled in the art. In embodiments, the additive injection block 434 can be similar in other respects to the additive injection block 134 of FIG. 5 as will be appreciated by one skilled in the art.

In embodiments, an additive injection system constructed according to principles of the present disclosure can be associated with a secondary discharge conduit of a conventional gypsum slurry mixer (e.g., a pin mixer) as is known in the art. An additive injection system constructed in accordance with principles of the present disclosure can advantageously be configured as a retrofit in an existing wallboard manufacturing system. The additive injection system can be used with components of a conventional discharge conduit.

In embodiments, a secondary slurry dispensing apparatus constructed in accordance with principles of the present disclosure can be placed in fluid communication with a slurry mixer to produce a cementitious slurry. In one embodiment, a slurry mixing and dispensing assembly includes a mixer, a main slurry dispensing apparatus, and a secondary slurry dispensing apparatus.

In embodiments, a mixing apparatus for mixing and dispensing a slurry includes a mixer having a mixer motor and a housing configured for receiving and mixing the slurry. The housing defines a chamber for holding the slurry, and can have a generally cylindrical shape. The housing can have an upper wall, a lower wall, and an annular peripheral wall. Calcined gypsum and water, as well as other materials or additives often employed in slurries to prepare gypsum products, can be mixed in the mixing apparatus. A first outlet, also referred to as a mixer outlet, a discharge gate or a slot, can be provided in the peripheral wall for the discharge of a major portion of the cementitious slurry into the main slurry dispensing apparatus. A second mixer outlet can be provided in the peripheral wall for the discharge of a minor portion of the cementitious slurry into the secondary slurry dispensing apparatus. The secondary dispensing apparatus can include a cylindrical flexible, resilient tube or conduit having an inlet in slurry receiving communication with the second mixer outlet and an additive injection system constructed according to principles of the present disclosure.

Figure 13:
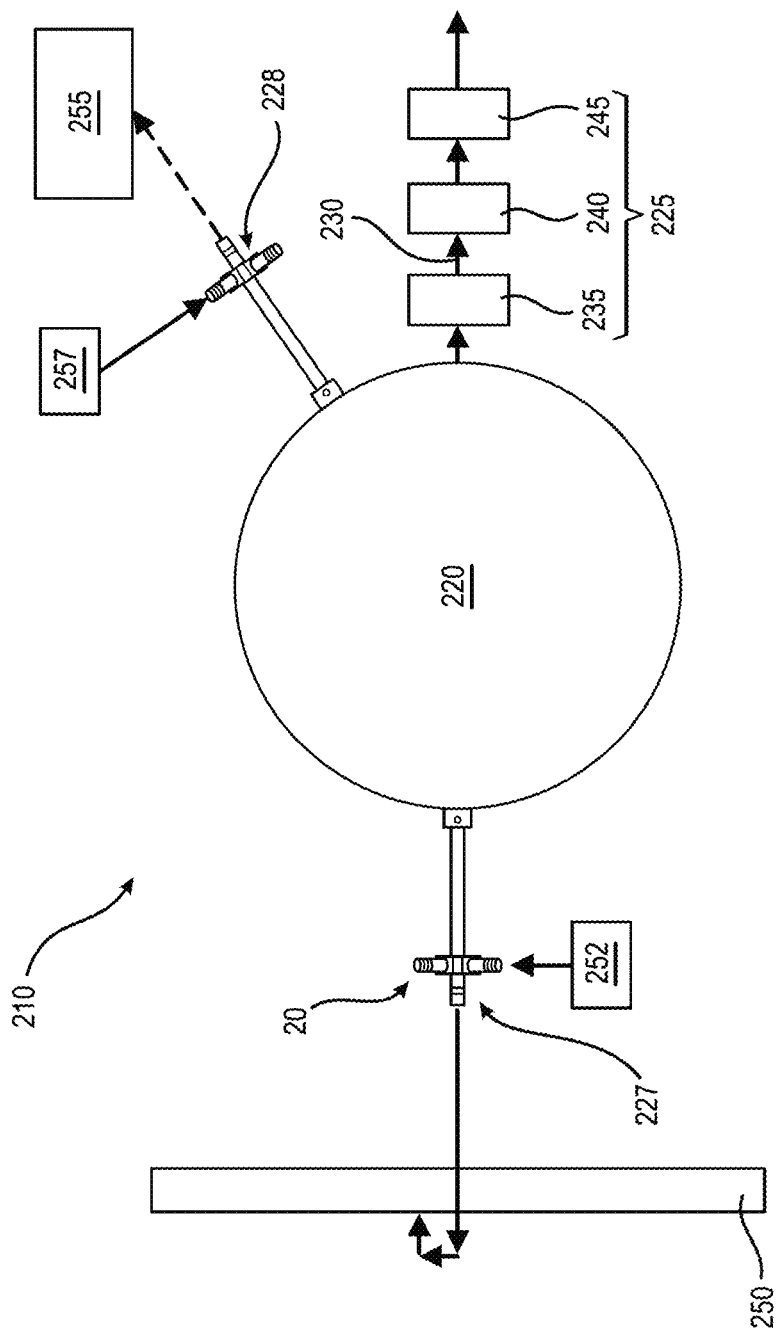
FIG. 13 is a schematic plan diagram of an embodiment of a cementitious slurry mixing and dispensing assembly, including an embodiment of a mixer extractor assembly constructed in accordance with principles of the present disclosure respectively incorporated into a pair of secondary discharge conduits.

Referring to FIG. 13, an embodiment of a cementitious slurry mixing and dispensing assembly 210 constructed in accordance with principles of the present disclosure is shown. The cementitious slurry mixing and dispensing assembly 210 includes a slurry mixer 220 in fluid communication with a main discharge conduit 225 and a pair of auxiliary discharge conduits 227, 228.

The slurry mixer 220 is adapted to agitate water and a cementitious material to form aqueous cementitious slurry. The slurry mixer 220 is in fluid communication with the main discharge conduit 225 and the pair of secondary discharge conduits 227, 228. Both the water and the cementitious material can be supplied to the mixer 220 via one or more inlets as is known in the art. In embodiments, any other suitable slurry additive can be supplied to the mixer 220 as is known in the art of manufacturing cementitious products. Any suitable mixer (e.g., a pin mixer) can be used as will be appreciated by one skilled in the art.

The mixer 220 includes a housing and an agitator disposed within the housing. The housing has a main outlet and a pair of secondary outlets. The agitator is configured to agitate water and a cementitious material to form an aqueous cementitious slurry.

The main discharge conduit 225 is configured to deliver a main flow of cementitious slurry from the mixer downstream to a further manufacturing station (e.g., upon a moving web of cover sheet material in embodiments used to produce gypsum wallboard). The main discharge conduit 225 is in fluid communication with the mixer 220. In embodiments, the main discharge conduit 225 can comprise any suitable discharge conduit component as will be appreciated by one skilled in the art. The illustrated main discharge conduit 225 includes a delivery conduit 230, a foam injection system 235, a flow-modifying element 240, and a slurry distributor 245.

The delivery conduit 230 defines a slurry passage. The conduit 230 is connected to the mixer 220 such that the slurry passage is in fluid communication with the main outlet. In embodiments, the delivery conduit 230 can be made from any suitable material and can have different shapes. In some embodiments, the delivery conduit 230 can comprise a flexible conduit.

In embodiments, the flow-modifying element 240 is a part of the main discharge conduit 225 and is adapted to modify a flow of cementitious slurry from the mixer 220 through the main discharge conduit 225. The flow-modifying element 240 is disposed downstream of the foam injection system 235 relative to a flow direction of the flow of cementitious slurry from the mixer 220 through the main discharge conduit 225. In embodiments, one or more flow-modifying elements 240 can be associated with the main discharge conduit 225 and adapted to control a main flow of slurry discharged from the slurry mixer 220. The flow-modifying element(s) 240 can be used to control an operating characteristic of the main flow of aqueous cementitious slurry. In the illustrated embodiment of FIGS. 13 and 14, the flow-modifying element(s) 240 is associated with the main discharge conduit 225. Examples of suitable flow-modifying elements include volume restrictors, pressure reducers, constrictor valves, canisters etc., including those described in U.S. Pat. Nos. 6,494,609; 6,874,930; 7,007,914; and 7,296,919, for example.

In embodiments, the slurry distributor 245 can be any suitable terminal portion of a conventional discharge conduit, such as a length of conduit in the form of a flexible hose or a component commonly referred to as a "boot." In embodiments, the boot can be in the form of a multi-leg discharge boot.

In other embodiments, the slurry distributor 245 can be similar to those shown and described in U.S. Patent Applications 2012/0168527; 2012/0170403; 2013/0098268; 2013/0099027; 2013/0099418; 2013/0100759; 2013/0216717; 2013/0233880; and 2013/0308411. In some of such embodiments, the main discharge conduit 225 can include suitable components for splitting a main flow of cementitious slurry into two flows which are re-combined in the slurry distributor 245.

In embodiments, the foam injection system 235 can be arranged with at least one of the mixer 220 and the delivery conduit 230. The foam injection system 235 can include a foam source (e.g., such as a foam generation system configured as known in the art) and a foam supply conduit.

In embodiments, any suitable foam source and foaming agent can be used. Preferably, the aqueous foam is produced in a continuous manner in which a stream of a mix of foaming agent and water is directed to a foam generator, and a stream of the resultant aqueous foam leaves the generator and is directed to and mixed with the cementitious slurry. Some examples of suitable foaming agents are described in U.S. Pat. Nos. 5,683,635 and 5,643,510, for example.

An aqueous foam supply conduit can be in fluid communication with at least one of the slurry mixer 220 and the discharge conduit 230. An aqueous foam from a source can be added to the constituent materials through the foam supply conduit at any suitable location downstream of the mixer and/or in the mixer itself to form a foamed cementitious slurry that is provided to the slurry distributor 240. In the illustrated embodiment, the foam supply conduit is disposed downstream of the slurry mixer and is associated with the discharge conduit 230. In the illustrated embodiment, the aqueous foam supply conduit has a manifold-type arrangement for supplying foam to a plurality of foam injection ports defined within an injection ring or block associated with the delivery conduit, as described in U.S. Pat. No. 6,874,930, for example.

In other embodiments, one or more foam supply conduits can be provided that is in fluid communication with the mixer 220. In yet other embodiments, the aqueous foam supply conduit(s) can be in fluid communication with the slurry mixer alone. As will be appreciated by those skilled in the art, the means for introducing aqueous foam into the cementitious slurry in the cementitious slurry mixing and dispensing assembly, including its relative location in the assembly, can be varied and/or optimized to provide a uniform suspension of aqueous foam in the cementitious slurry to produce board that is fit for its intended purpose.

As one of ordinary skill in the art will appreciate, one or both of the webs of cover sheet material can be pre-treated with a very thin relatively denser layer of gypsum slurry (relative to the gypsum slurry comprising the core), often referred to as a skim coat in the art, and/or hard edges, if desired. To that end, the first auxiliary discharge conduit 227 is adapted to deposit a stream of dense aqueous calcined gypsum slurry (i.e., a "face skim coat/hard edge stream") that is relatively denser than the main flow of aqueous calcined gypsum slurry discharged from the main discharge conduit 225. The first auxiliary discharge conduit 227 can deposit the face skim coat/hard edge stream upon a moving web of cover sheet material upstream of a skim coat roller 250 that is adapted to apply a skim coat layer to the moving web of cover sheet material and to define hard edges at the periphery of the moving web by virtue of the width of the roller being less than the width of the moving web as is known in the art. Hard edges can be formed from the same dense slurry that forms the thin dense layer by directing portions of the dense slurry around the ends of the roller used to apply the dense layer to the web.

The first auxiliary discharge conduit 227 can include an additive injection system 20 similar in construction and function as the one shown and described herein in connection with FIG. 1. An additive(s) supply 252 can be placed in fluid communication with the additive injection system 20 of the first auxiliary discharge conduit 227 to inject at least one additive into the face skim coat/hard edge stream. In embodiments, the additive(s) supply 252 comprises fiber.

The second auxiliary discharge conduit 228 is adapted to deposit a stream of dense aqueous calcined gypsum slurry (i.e., a "back skim coat stream") that is relatively denser than the main flow of aqueous calcined gypsum slurry discharged from the main discharge conduit 225. The second auxiliary discharge conduit 228 can deposit the back skim coat stream upon a second moving web of cover sheet material upstream (in the direction of movement of the second web) of a skim coat roller 255 that is adapted to apply a skim coat layer to the second moving web of cover sheet material as is known in the art (see FIG. 14 also).

The second auxiliary discharge conduit 228 can include an additive injection system 20 similar in construction and function as the one shown and described herein in connection with FIG. 1. An additive(s) supply 257 can be placed in fluid communication with the additive injection system 20 of the second auxiliary discharge conduit 228 to inject at least one additive into the back skim coat stream. In embodiments, the additive(s) supply 257 comprises fiber.

In other embodiments, one or both of the auxiliary discharge conduits can include another embodiment of an additive injection system constructed according to principles of the present disclosure. In other embodiments, separate auxiliary discharge conduits with an additive injection system constructed according to principles of the present disclosure can be connected to the mixer to deliver one or more separate edge streams to the moving web of cover sheet material. In other embodiments, the additive injection system can be omitted from one of the first and second auxiliary discharge conduits 227, 228. In other embodiments, the second auxiliary discharge conduit 228 (and its associated additive injection system) can be omitted.

Figure 14:
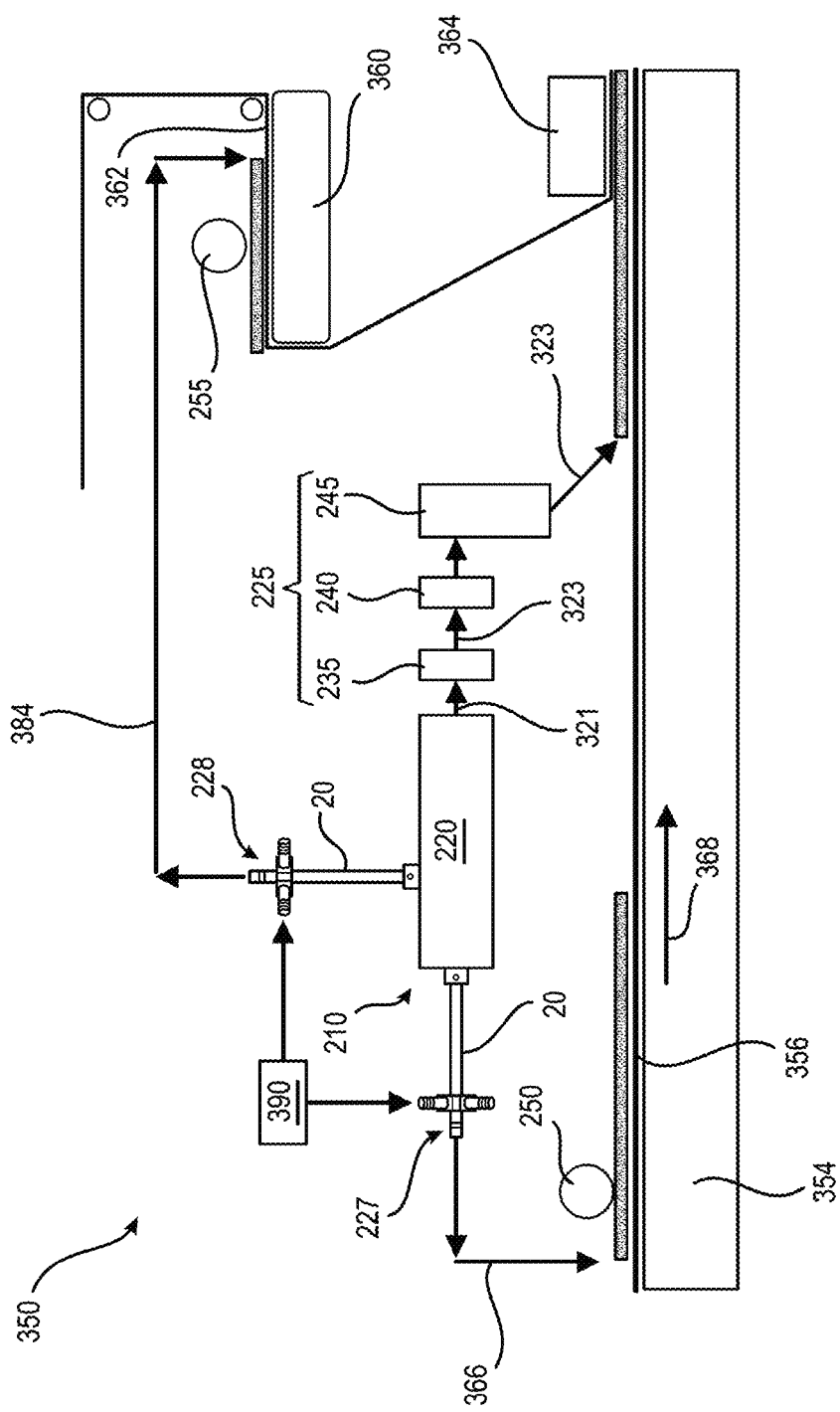
FIG. 14 is a schematic elevational diagram of an embodiment of a wet end of a gypsum wallboard manufacturing line including an embodiment of a mixer extractor assembly constructed in accordance with principles of the present disclosure respectively incorporated into a pair of secondary discharge conduits.
Figure 15B:
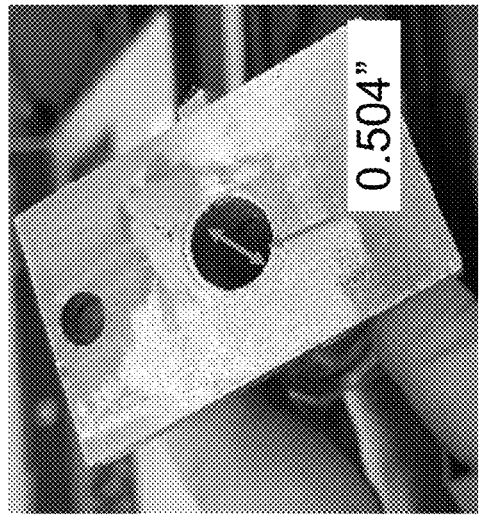
FIG. 15B illustrates an injection port with an inner diameter of 0.504" as described in Example 4.
Figure 15A:
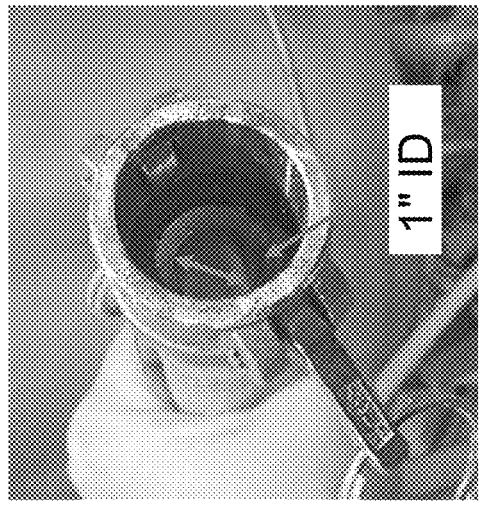
FIG. 15A illustrates an injection port with an inner diameter of 1" as described in Example 4.
Figure 15D:
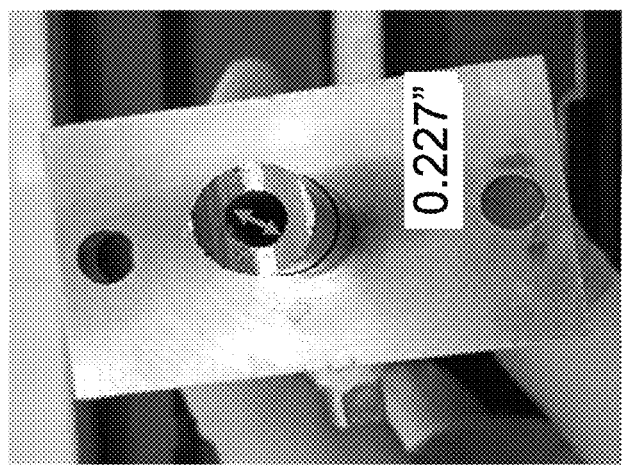
FIG. 15D illustrates an injection port with an inner diameter of 0.227" as described in Example 4.
Figure 15C:
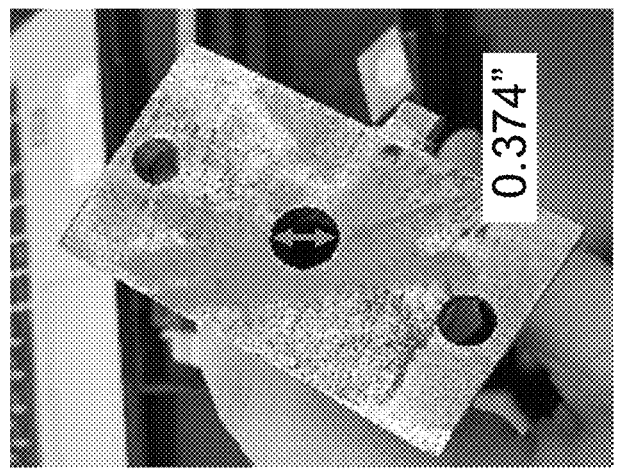
FIG. 15C illustrates an injection port with an inner diameter of 0.374" as described in Example 4.

Referring to FIG. 14, an exemplary embodiment of a wet end 350 of a gypsum wallboard manufacturing line is shown. The illustrated wet end 350 includes the cementitious slurry mixing and dispensing assembly 210, a hard edge/face skim coat roller 250 disposed upstream of the slurry distributor 245 of the main discharge conduit 225 and supported over a forming table 354 such that a first moving web 356 of cover sheet material is disposed therebetween, a back skim coat roller 255 disposed over a support element 360 such that a second moving web 362 of cover sheet material is disposed therebetween, and a forming station 364 adapted to shape the preform into a desired thickness. The skim coat rollers 250, 255, the forming table 354, the support element 360, and the forming station 364 can all comprise conventional equipment suitable for their intended purposes as is known in the art. The wet end 350 can be equipped with other conventional equipment as is known in the art.

Water and calcined gypsum can be mixed in the mixer 220 to form an aqueous calcined gypsum slurry. In some embodiments, the water and calcined gypsum can be continuously added to the mixer in a water-to-calcined gypsum ratio from 0.5 to 1.3, and in other embodiments of 0.75 or less.

Gypsum board products are typically formed "face down" such that the advancing web 356 serves as the "face" cover sheet of the finished board. A face skim coat/hard edge stream 366 (a layer of denser aqueous calcined gypsum slurry relative to the main or core flow of aqueous calcined gypsum slurry) can be applied to the first moving web 356 upstream of the hard edge/face skim coat roller 250, relative to the machine direction 368, to apply a skim coat layer to the first web 356 and to define hard edges of the board.

The foam injection system 235 can be used to inject aqueous foam into the calcined gypsum slurry produced by the mixer 220. A main flow 321 of aqueous calcined gypsum slurry is discharged from the mixer 220 into the main discharge conduit 225. Aqueous foam is injected into the main flow 321 of aqueous calcined gypsum slurry via the foam injection system 235 to form a flow 323 of foamed calcined gypsum slurry. The main flow 323 of foamed calcined gypsum slurry can be acted upon by one or more flow-modifying elements 240 and discharged from the slurry distributor 245 of the main discharge conduit 225 upon the first moving web 356.

The face skim coat/hard edge stream 366 can be deposited from the mixer 220 at a point upstream, relative to the direction of movement of the first moving web 356 in the machine direction 368, of where the flow 323 of foamed calcined gypsum slurry is discharged from the main discharge conduit 225 upon the first moving web 356. A back skim coat stream 384 (a layer of denser aqueous calcined gypsum slurry relative to the main flow of foamed calcined gypsum slurry) can be applied to the second moving web 362. The back skim coat stream 384 can be deposited from the mixer 220 at a point upstream, relative to the direction of movement of the second moving web 362, of the back skim coat roller 255. The second moving web 362 of cover sheet material can be placed upon the foamed slurry discharged from the main discharge conduit 225 upon the advancing first web 356 to form a sandwiched wallboard preform that is fed to the forming station 364 to shape the preform to a desired thickness. In embodiments, fiber, starch, aqueous foam, or other additives 390 can be added to the slurry comprising the face skim coat and/or back skim coat via the additive injection systems 20 respectively associated with the first and second auxiliary discharge conduits 227, 228.

The main flow 323 of cementitious slurry has a first volumetric flow rate, the face skim coat/hard edge stream has a second volumetric flow rate, and the back skim coat stream 384 has a third volumetric flow rate. In embodiments, the first volumetric flow rate is greater than the second volumetric flow rate, and the first volumetric flow rate is greater than the second volumetric flow rate. In embodiments, the second volumetric flow rate is greater than the third volumetric flow rate.

The wet end 350 can be incorporated with known equipment to be used as a manufacturing line. For example, board manufacturing techniques described in, for example, U.S. Pat. No. 7,364,676 and U.S. Patent Application Publication 2010/0247937 can be used with the wet ends 350.

Board Dimensions, Density, and Strength

Board can be made with different dimensions, depending on, e.g., product type and market. The board can have any suitable width (e.g., 48 inches to 54 inches), length (e.g., 96 inches to 192 inches), and thickness (e.g., ¼ inch, ⅜ inch, ½ inch, ⅝ inch, ¾ inch, 1 inch, etc.). Dimensions in different markets may vary slightly as well understood in the art.

The dense layer in accordance with embodiments can also have any suitable dimensions. Generally, the dense layer contributes a much smaller proportion of the total board weight and thickness because it can be relatively thin. Once the board is made, microscopy may be performed at various positions along the whole width of the board to determine the dense layer thickness. Any form of microscopy can be used, such as optical or scanning electron microscopy (SEM), to determine thickness of various layers in, e.g., a board sample.

With respect to an optical microscope, the dense layer of the board sample can be observed even at lower magnifications. If desired, any suitable dye, including food dyes, can be added to the board sample to assist with delineation between layers of the board. If desired, a fluorescent dye can optionally be used, but is not required. In the case of SEM, a dye is generally not needed as the density difference between layers is apparent under the resolution power of an SEM. To determine the thickness of the layer, an image analysis software (e.g., ImageJ) or other suitable method can be used to identify distances between two points. The layer thickness is the distance between the beginning of the layer/end of paper and the end of the layer/beginning of the core. It can be measured at multiple positions on the board. Thickness is measured when the board is dry using the microscopy test, unless otherwise indicated.

During the manufacturing process other tests can be used to determine the thickness, density, and hardness of the core and dense layer. During manufacture, the thickness of the dense layer is measured using a thickness gauge (e.g., a Wet Film Thickness Gauge Comb, commercially available from TCP Global, San Diego, California) which is used periodically at different positions along the dense layer. Thickness is measured by noting the amount of the gauge that was submerged into the dense layer slurry when inserted and removed at a 90° angle.

During the manufacturing process the densities of both the dense layer and core can be monitored by measuring the wet densities as follows. Slurry is poured into a cup with a known volume and the weight is recorded. Periodically, samples of both the dense and core layer slurries are poured into molds (cubes or discs) and both the wet and dry densities are estimated by measuring both the weights and dimensions before and after drying.

The board thickness can vary depending on the type of application for the product (e.g., regular board at ½ inch or fire-resistant board at ⅝ inch, i.e., 0.625 inch). For example, in some embodiments, for a nominal ½ inch thick board, the dense layer can have a dry thickness of from 0.02 inches to 0.05 inches (e.g., from 0.02 inches to 0.04 inches, or from 0.025 inches to 0.035 inches). For boards of other thickness, the dense layer can be adjusted to a thickness consistent with the exemplary thicknesses mentioned for 1 inch board, which adjustments can readily be calculated by one of ordinary skill in the art and contemplated herein.

In some embodiments, the dense layer contributes from 2% to 15% of the total thickness of the board, e.g., from 2% to 10%, from 2% to 8%, from 2% to 5%, from 5% to 15%, from 5% to 10%, from 5% to 8%, from 8% to 15%, from 10% to 15%, etc. If the second dense gypsum is included, it can be provided in, e.g., any of these dimensions if desired.

Board weight is a function of thickness. Since boards are commonly made at varying thickness, board density is used herein as a measure of board weight. The advantages of the use of the fiber reinforced dense layer in accordance with embodiments of the disclosure can be seen across various board densities, e.g., 40 pcf or less, such as from 10 pcf to 40 pcf, from 12 pcf to 40 pcf, from 16 pcf to 35 pcf, from 20 pcf to 40 pcf, from 24 pcf to 37 pcf, etc. However, preferred embodiments of the disclosure have particular utility at lesser densities where the enhanced strength provided by the fiber reinforced dense layer advantageously enable the production of lower weight board with good strength. For example, in some embodiments, board density can be, e.g. from 12 pcf to 35 pcf, from 12 pcf to 30 pcf, from 12 pcf to 27 pcf, from 16 pcf to 30 pcf, from 16 pcf to 27 pcf, from 16 pcf to 24 pcf, from 18 pcf to 30 pcf, from 18 pcf to 27 pcf, from 20 pcf to 30 pcf, from 20 pcf to 27 pcf, from 24 pcf to 35 pcf, from 27 pcf to 35 pcf, from 27 pcf to 34 pcf, from 27 pcf to 30 pcf, from 30 pcf to 34 pcf, etc.

The dense layer has a considerably greater density than the density of the board core. For example, the dense layer can have a density of from 40 pcf to 70 pcf (e.g., from 45 pcf to 65 pcf, or from 50 pcf to 60 pcf). The use of the dense layer with fiber as described herein allows for the use of a lesser board core, and hence a lighter weight and lesser density board overall.

The core can have any suitable density but lesser densities can be used, e.g., a core density of 35 pcf or less (e.g., 31 pcf or less, or 27 pcf or less). For example, the core can have a density of from 15 pcf to 35 pcf (e.g., from 20 pcf to 31 pcf, from 20 pcf to 24 pcf, or from 24 pcf to 27 pcf, etc.).

In some embodiments, the difference in density between the dense layer and the core is desirably substantial, e.g., at least 10 pcf, at least 15 pcf, at least 20 pcf, at least 25 pcf, or at least 30 pcf (such as from 10 pcf to 50 pcf, from about from 10 pcf to 40 pcf, from 10 pcf to 30 pcf, from 10 pcf to 20 pcf, from 15 pcf to 50 pcf, from 15 pcf to 40 pcf, from 15 pcf to 30 pcf, from 20 pcf to 50 pcf, from 20 pcf to 40 pcf, from 20 pcf to 30 pcf, from 25 pcf to 50 pcf, from 25 pcf to 40 pcf, from 20 pcf to 30 pcf, from 25 pcf to 35 pcf, etc.). The density ratio of the dense layer to the core can be any suitable ratio. For example, in some embodiments, the density ratio of the dense layer to the core can be from 1.25:1 to 5:1, such as, from 1.25:1 to 4:1, from 1.25:1 to 3:1, from 1.25:1 to 2:1, from 1.5:1 to 5:1, from 1.5:1 to 4:1, from 1.5:1 to 3:1, from 2:1 to 5:1, from 2:1 to 4:1, from 2:1 to 3:1, from 3:1 to 5:1, or from 3:1 to 4:1, etc.

Board prepared with fiber reinforced dense layer as described herein exhibit good strength. For example, in some embodiments, board according to the disclosure meets test protocols according to ASTM Standard C473-10, method B. In this regard, in some embodiments, when the board is cast at a thickness of ½ inch, the board has a nail pull resistance of at least 65 lb. as determined according to ASTM C 473-10, method B (e.g., at least 68 lb., at least 70 lb., at least 72 lb., at least 75 lb., at least 77 lb., in each case with any suitable upper limit, such as 110 lb. or greater, etc.). With respect to flexural strength, in some embodiments, when cast in a board of ½ inch thickness, the board has a flexural strength of at least 36 lb. in a machine direction (e.g., at least 38 lb., at least 40 lb., etc., in each case with any suitable upper limit, such as 80 lb. or greater, etc.) and/or at least 107 lb. (e.g., at least 110 lb., at least 112 lb., etc., in each case with any suitable upper limit, such as 140 lb. or greater, etc.) in a cross-machine direction as determined according to the ASTM standard C473. Due at least in part to the fiber reinforced dense layer in accordance with embodiments of the disclosure, these standards can be met even with respect to lesser density board (e.g., 35 pcf or less) as described herein.

Aspects

The disclosure is further illustrated by the following exemplary aspects. However, the disclosure is not limited by the following aspects.

(1) A gypsum board comprising: a set gypsum core disposed between first and second cover sheets, the gypsum core formed from a core slurry comprising stucco, water, foaming agent, and at least one of the following ingredients: accelerator, retarder, dispersant, and migrating starch; a dense layer disposed between the core and the first cover sheet, the dense layer formed from a dense layer slurry comprising stucco, water, and fibers (e.g., paper fibers) in an amount of at least 0.8% by weight of the stucco, the dense layer having a density of at least 40 pcf; the dense layer slurry preferentially containing a greater concentration of the fibers (e.g., paper fibers) than the core slurry, and the core slurry preferentially containing the same or a greater concentration of the at least one of the accelerator, retarder, dispersant, and migrating starch as compared with the dense layer slurry; and the board having a density of 35 pcf or less and a nail pull resistance of at least 72 lb. according to ASTM 473-10, method B.

(2) The gypsum board of claim 1, wherein the fibers comprise cellulosic fibers, carbon fibers, mineral fibers, glass fibers, polymeric fibers, or any combination thereof.

(3) The gypsum board of claim 1 or 2, wherein the fibers in the dense layer slurry comprise paper fibers and the core slurry further comprises a second fiber that excludes paper fiber (e.g., cellulosic fibers, carbon fibers, mineral fibers, glass fibers, polymeric fibers, or any combination thereof), and is preferentially in an amount that is greater or the same as an amount, if any, in the dense layer slurry.

(4) The gypsum board of any one of claims 1-3, wherein the fibers are wet pulp paper fibers, having an average length of from 0.5 mm to 4.0 mm, e.g., from 2 mm to 3 mm.

(5) The gypsum board of any one of claims 1-4, wherein the fibers are dry shredded paper fibers, having an average length of from 0.5 mm to 4 mm.

(6) The gypsum board of any one of claims 1-5, wherein the fibers comprise chopped glass fibers.

(7) The gypsum board of any one of claims 1-6, wherein the fibers comprise glass fibers having an average diameter of from 3 microns to 20 microns.

(8) The gypsum board of any one of claims 1-7, wherein the fibers comprise polymeric fibers comprise one or more of polyester, polyethylene, polypropylene, nylon, polyacetate, polyacrylic acid, polystyrene, polyvinyl acetate, rayon, polyvinylchloride, copolymers thereof and combinations thereof (e.g., synthetic polymeric fibers comprising polyester, polyethylene, polypropylene, or a combination thereof).

(9) The gypsum board of any one of claims 1-8, wherein the fibers comprise natural pulp fibers such as wood pulp fibers, including softwood and hardwood pulp fibers, straw fibers, plant and grass pulp fibers such as hemp, jute, kenaf, and bamboo pulp fibers, cotton pulp fibers or any combination thereof (e.g., wood pulp fibers used in paper making).

(10) The gypsum board of any one of claims 1-9, wherein the dense layer has a thickness of from 0.02 inches to 0.05 inches (e.g., from 0.02 inches to 0.04 inches, or from 0.025 inches to 0.035 inches).

(11) The gypsum board of any one of claims 1-10, wherein the core slurry is substantially free of glass fibers, paper fibers, and polymeric fibers (e.g., having 0.5% or less, 0.3% or less, or 0.1% or less by weight of the stucco).

(12) The gypsum board of any one of claims 1-11, wherein the core has a density of 35 pcf or less (e.g., 31 pcf or less, or 27 pcf or less).

(13) The gypsum board of any one of claims 1-12, wherein the dense layer has a density of from 40 pcf to 70 pcf (e.g., from 45 pcf to 65 pcf, or from 50 pcf to 60 pcf), and the core has a density of from 15 pcf to 35 pcf (e.g., from 20 pcf to 31 pcf, or from 24 pcf to 27 pcf).

(14) The gypsum board of any one of claims 1-13, wherein the dense layer slurry comprises a polyphosphate (e.g., sodium trimetaphosphate), e.g., in an amount of from 0.01% to 0.5% by weight of the stucco.

(15) The gypsum board of any one of claims 1-14, wherein the dense layer slurry consists of stucco, water, fiber (e.g., paper fiber), and optionally, strength-enhancing starch and/or polyphosphate.

(16) The gypsum board of any one of claims 1-15, wherein the dense layer slurry comprises a strength-enhancing starch (e.g., in an amount of from 0.5% to 5% by weight of the stucco, such as from 2% to 3% by weight of the stucco).

(17) The gypsum board of claim 16, wherein the core slurry is substantially free of a strength-enhancing starch, e.g., having less than 2% by weight of stucco, e.g., less than 1% by weight of the stucco.

(18) The gypsum board of any one of claims 1-17, wherein the board has a nail pull resistance of at least 77 lb. according to ASTM 473-10, method B (e.g., from 77 lb. to 105 lb., from 77 lb. to 98 lb., etc.).

(19) The gypsum board of any of claims 1-18, further comprising a second dense layer disposed between the core and the second cover sheet, the second dense layer formed from a second dense layer slurry that can be the same or different from the dense layer slurry.

(20) A method of making gypsum board comprising: obtaining first and second cover sheets; applying a dense layer in bonding relation to the first cover sheet, the dense layer formed from a slurry comprising stucco, water, and fibers (e.g., paper fibers) in an amount of at least 0.8% by weight of the stucco, the dense layer having a dry density of at least 40 pcf; applying a first surface of a core in bonding relation to the dense layer, the core having a density of 35 pcf or less; and applying the second cover sheet in bonding relation to a second surface of the core; the dense layer slurry preferentially containing a greater concentration of the fibers than the core slurry, and the core slurry preferentially containing the same or a greater concentration the at least one of the accelerator, retarder, dispersant, and migrating starch as compared with the dense layer slurry, and the board having a nail pull resistance of at least 72 lb. according to ASTM 473-10, method B.

(21) The method of claim 20, further comprising disposing a second dense layer between the core and the second cover sheet, the second dense layer formed from a second dense layer slurry that can be the same or different from the dense layer slurry.

(22) The method of claim 20 or 21, wherein the fibers comprise cellulosic fibers, carbon fibers, mineral fibers, glass fibers, polymeric fibers, or any combination thereof.

(23) The method of any one of claims 20-22, wherein the core slurry further comprises a second fiber that excludes paper fiber (e.g., cellulosic fibers, carbon fibers, mineral fibers, glass fibers, polymeric fibers, or any combination thereof) and is preferentially in an amount that is greater or the same as an amount, if any, in the dense layer slurry.

(24) The method of any one of claims 20-23, wherein the fibers comprise wet pulp paper fibers, having an average length of from 0.5 mm to 4.0 mm, e.g., from 2 mm to 3 mm.

(25) The method of any one of claims 20-24, wherein the fibers are dry shredded paper fibers, having an average length of from 0.5 mm to 4 mm.

(26) The method of any one of claims 20-25, wherein the fibers comprise chopped glass fibers.

(27) The method of any one of claims 20-26, wherein the fibers comprise glass fibers having an average diameter of from 3 microns to 20 microns.

(28) The method of any one of claims 20-27, wherein the fibers comprise polymeric fibers comprise one or more of polyester, polyethylene, polypropylene, nylon, polyacetate, polyacrylic acid, polystyrene, polyvinyl acetate, rayon, polyvinylchloride, copolymers thereof and combinations thereof (e.g., synthetic polymeric fibers comprising polyester, polyethylene, polypropylene, or a combination thereof).

(29) The method of any one of claims 20-28, wherein the fibers comprise natural pulp fibers such as wood pulp fibers, including softwood and hardwood pulp fibers, straw fibers, plant and grass pulp fibers such as hemp, jute, kenaf, and bamboo pulp fibers, cotton pulp fibers or any combination thereof (e.g., wood pulp fibers used in paper making).

(30) The method of any one of claims 20-29, wherein the dense layer has a dry thickness of from 0.02 inches to 0.05 inches (e.g., from 0.02 inches to 0.04 inches, or from 0.025 inches to 0.035 inches).

(31) The method of any one of claims 20-30, wherein the core slurry is substantially free of glass fibers, paper fibers, and polymeric fibers (e.g., having 0.5% or less, 0.3% or less, or 0.1% or less by weight of the stucco).

(32) The method of any one of claims 20-31, wherein the core has a dry density of 35 pcf or less (e.g., 31 pcf or less, or 27 pcf or less).

(33) The method of any one of claims 20-32, wherein the dense layer has a dry density of from 40 pcf to 70 pcf (e.g., from 45 pcf to 65 pcf, or from 50 pcf to 60 pcf), and the core has a density of from 15 pcf to 35 pcf (e.g., from 20 pcf to 31 pcf, or from 24 pcf to 27 pcf).

(34) The method of any one of claims 20-33, wherein the dense layer slurry comprises a polyphosphate (e.g., sodium trimetaphosphate), e.g., in an amount of from 0.01% to 0.5% by weight of the stucco.

(35) The method of any one of claims 20-34, wherein the core slurry is substantially free of a polyphosphate (e.g., sodium trimetaphosphate) (e.g., in an amount less than 0.01%, such as an amount of 0.005% or less, or 0.001% or less, by weight of the stucco).

(36) The method of any one of claims 20-35, wherein the dense layer slurry comprises a strength-enhancing starch (e.g., in an amount of from 0.5% to 5% by weight of the stucco, such as from 2% to 3% by weight of the stucco).

(37) The method of claim 36, wherein the core is substantially free of a strength-enhancing starch, e.g., having less than 2% by weight of stucco, e.g., less than 1% by weight of the stucco.

(38) The method of any one of claims 20-37, wherein the board has a nail pull resistance of at least 77 lb. according to ASTM 473-10, method B (e.g., from 77 lb. to 105 lb., from 77 lb. to 98 lb., etc.), and the board has a density of 35 pcf or less, 31 pcf or less, or 27 pcf or less (e.g., from 15 pcf to 35 pcf, from 20 pcf to 35 pcf, from 24 pcf to 35 pcf, from 15 pcf to 31 pcf, from 20 pcf to 31 pcf, from 24 pcf to 31 pcf, from 15 pcf to 27 pcf, from 20 pcf to 27 pcf, from 15 pcf to 24 pcf, etc.).

(39) A method of preparing board, comprising: providing a board mixer comprising a main body, and primary and secondary discharge conduits, respectively; inserting stucco and water in the main body of the mixer to form a base slurry; discharging a majority portion of the base slurry from the main body into the primary discharge conduit to form a core slurry; discharging a minority portion of the base slurry from the main body into the secondary discharge conduit to form a dense layer slurry; preparing a suspension comprising water and paper fiber; inserting the suspension into the dense layer slurry in the secondary discharge conduit while the suspension is in a non-laminar state sufficient to avoid having more than 10% of the fiber by weight form flocs having an average length of 3 mm or more, to form a fiber-reinforced dense layer slurry; providing first and second cover sheets; depositing the fiber-reinforced dense layer slurry over the first cover sheet; depositing the core slurry over the fiber-reinforced dense layer slurry; and applying the second cover sheet over the core slurry.

(40) The method of claim 39, wherein a second dense layer slurry is provided between the core slurry and the second cover sheet, wherein the second dense layer slurry can be the same or different than the fiber-reinforced dense layer slurry.

(41) The method of claim 39 or 40, wherein the non-laminar state is turbulent.

(42) The method of any one of claims 39-41, wherein the suspension is added to the dense layer slurry while at a flow velocity greater than an onset velocity of turbulence of the suspension as determined according to the pulp head friction test.

(43) The method of any one of claims 39-42, wherein, prior to inserting the suspension into the dense layer slurry, the suspension is passed through a passageway having an inner diameter sufficient to subject the suspension to turbulent flow.

(44) The method of claim 43, wherein the passageway has an inner diameter of from 0.125 inch to 0.625 inch.

(45) The method of claim 44, wherein the passageway has an inner diameter of from 0.2 inch to 0.5 inch.

(46) The method of claim 45, wherein the passageway has an inner diameter of from 0.2 inch to 0.375 inch.

(47) The method of any one of claims 39-46, wherein the suspension has a Reynolds number of at least 2300 upon addition to the dense layer slurry.

(48) The method of claim 47, wherein the suspension has a Reynolds number of at least 3500 upon addition to the dense layer slurry.

(49) The method of any one of claims 39-48, wherein the suspension contains 1% to 4% of the fiber.

(50) The method of any one of claims 39-49, the suspension further comprising strength-enhancing starch.

(51) The method of any one of claims 39-50, the suspension further comprising polyphosphate.

(52) The method of any one of claims 39-51, wherein the secondary discharge conduit is upstream of the primary discharge conduit.

(53) The method of any one of claims 39-52, wherein the dense layer slurry is deposited upstream of the mixer.

(54) The method of any one of claims 39-53, wherein the core slurry is deposited downstream of the mixer.

(55) The method of any one claims 39-54, wherein at least one of the following ingredients: accelerator, retarder, dispersant, migrating starch, and polyphosphate, is inserted in the main mixer body or primary discharge conduit but not the secondary mixer.

(56) The method of claim 55, wherein the dense layer slurry preferentially has a greater concentration of the fiber, and optionally, the strength-enhancing starch than the core slurry, and the core slurry preferentially has the same or a greater concentration of at least one of the accelerator, retarder, dispersant, migrating starch than the fiber-reinforced dense layer slurry.

(57) The method of claim 56, wherein the core slurry preferentially has the same or a greater concentration of at least three additives other than paper fiber as compared with the fiber-reinforced dense slurry.

(58) The method of claim 56 or 57, wherein the core slurry preferentially has the same or a greater concentration of at least four additives other than paper fiber as compared with the fiber-reinforced dense slurry.

(59) A system for manufacturing a gypsum board comprising: a mixer, the mixer including a housing and an agitator disposed within the housing, the housing has a first outlet and a second outlet, the agitator is configured to agitate water and a cementitious material to form an aqueous cementitious slurry; a main discharge conduit, the main discharge conduit is in fluid communication with the first outlet; a secondary discharge conduit, the secondary discharge conduit is in fluid communication with the second outlet; and an additive injection system having an injection body and a port member, the injection body defining a slurry passageway and a port passageway, the slurry passageway comprising a portion of the secondary discharge conduit such that the slurry passageway is in fluid communication with the second outlet of the mixer, the port passageway in fluid communication with the slurry passageway, the port member defining an additive passageway, the port member removably connected to the injection body such that the additive passageway is in fluid communication with the port passageway.

(60) The system of claim 59, wherein the injection port member includes a port insert body extending along a longitudinal axis between an additive supply end and a mounting end, the additive supply end defining an additive inlet opening, the mounting end defining an additive outlet opening, the additive passageway extending between, and in fluid communication with, the additive inlet opening and the additive outlet opening.

(61) The system of claim 60, wherein the mounting end of the injection port member is removably mounted to the injection body, the system further comprising: an additive supply conduit, the additive supply conduit being connected to the additive supply end of the injection port member such that the additive supply conduit is in fluid communication with the additive passageway.

(62) The system of any one of claims 59-61, wherein the additive passageway has a tapered entry portion and a main portion, the tapered entry portion includes the additive inlet opening, the entry portion having a variable transition to the main portion of the additive passageway, the main portion having an orifice with an orifice size that is smaller than the additive inlet opening.

(63) The system of claim 62, wherein the entry portion is frusto-conical in longitudinal cross-section, and the main portion has a cross-sectional size corresponding to the orifice size of the outlet opening.

(64) The system of any one of claims 59-63, wherein the port member comprises a first port member, the system further comprising: a second port member, the second port member defining an additive passageway that is different from the additive passageway of the first port member, the second port member removably connected to the injection body in place of the first port member such that the additive passageway of the second port member is in fluid communication with the port passageway.

(65) The system of claim 64, wherein the additive passageway of the first port member has a first orifice size, and the additive passageway of the second port member has a second orifice size, the first orifice size being larger than the second orifice size.

(66) The system of claim 64 or claim 65, wherein the port passageway of the injection body comprises a first port passageway, the injection body defining a second port passageway in spaced relationship to the first port passageway, the second port passageway in fluid communication with the slurry passageway, and the port member comprises a first port member, the system further comprising: a second port member, the second port member defining a second additive passageway, the second port member removably connected to the injection body such that the second additive passageway is in fluid communication with the second port passageway.

(67) The system of any one of claims 59-66, wherein the injection body includes a slurry inlet end defining a slurry inlet opening and a slurry discharge end defining a slurry discharge opening, and the slurry passageway being in fluid communication with the slurry inlet opening and the slurry discharge opening.

(68) The system of claim 67, wherein the secondary discharge conduit includes an upstream portion and a downstream portion, the slurry inlet opening of the injection body in fluid communication with the upstream portion of the secondary discharge conduit, and the slurry discharge opening of the injection body in fluid communication with the downstream portion of the secondary discharge conduit.

(69) The system of claim 67 or claim 68, wherein the slurry inlet end and the slurry discharge end of the injection body each has an external barbed surface.

(70) The system of any one of claims 67-69, wherein the slurry discharge opening is larger than the slurry inlet opening.

(71) The system of any one of claims 59-70, wherein the injection body defines a valve passageway in communication with the port passageway, and the port passageway includes a port opening, the system further comprising: a valve, the valve mounted to the injection body such that at least a portion of the valve is disposed in the valve passageway of the injection body, the valve adapted to selectively occlude the port opening.

(72) The system of claim 71, wherein the valve comprises a pneumatic valve including a reciprocally movable piston, the pneumatic valve adapted to be arranged with an air supply and to selectively reciprocally move the piston between an open position in which port opening is at least partially unobstructed to permit a flow of additive to move through the port passageway into the slurry passageway and a closed position in which the port opening is occluded by the piston.

(73) The system of any one of claims 59-72, wherein the injection body includes a slurry inlet member, a slurry discharge member, and an injection block, the slurry inlet member and the slurry discharge member being removably connected to opposing ends of the injection block.

(74) A gypsum board or method of preparing gypsum board, as described herein.

(75) A system for manufacturing a gypsum board, substantially as shown and described.

(76) An additive injection system, substantially as shown and described.

(77) A method of manufacturing a gypsum board, substantially as shown and described.

(78) A gypsum board, substantially as shown and described.

It shall be noted that the preceding aspects are illustrative and not limiting. Other exemplary combinations are apparent from the entirety of the description herein. It will also be understood by one of ordinary skill in the art that various embodiments may be used in various combinations with the other embodiments provided herein.

The following examples further illustrate the disclosure but, of course, should not be construed as in any way limiting its scope.

Example 1

This example demonstrates exemplary benefits of including fibers in gypsum compositions according to principles of embodiments of the disclosure. The inclusion of fiber in the gypsum composition can increase nail pull resistance when compared to gypsum composition without the fibers.

Particularly, paper fibers were included as reinforcing additives in a gypsum slurry. The paper fibers were introduced into the slurry in the form of wet pulp or dry shredded paper fibers. In general, paper fibers can be added to a mix of wet additives or as a dry material mixed with stucco as will be understood in the art and in manufacture. In order to record the benefits of including fibers in gypsum compositions, ten types of disks (1A-1I) were prepared with a diameter of 4 inches and a thickness of 7/16 inch (0.44 inch). The disks were prepared from a slurry containing stucco in an amount of 100%, and also included heat resistant accelerator (1.0%), highly hydrolyzed acid modified migrating starch having a cold water solubility of 10% and having a hot water viscosity of less than 10 BU in the form of LC-211, commercially available from Archer-Daniels-Midland, Chicago, Illinois (1%), an uncooked acid-modified corn starch having a hot water viscosity of 180 BU (as exemplary of uncooked medium hydrolyzed acid modified starch) (1%), retarder (0.06%), and dispersant (0.3%), where all amounts are by weight of the stucco. The slurry forming disk types 1A-1G, contained sodium trimetaphosphate (STMP) (0.1%), while the slurry forming disk type 1I did not contain STMP.

The uncooked acid-modified corn starch having a hot water viscosity of 180 BU (as exemplary of uncooked medium hydrolyzed acid modified starch) is provided to enhance strength (e.g., nail pull strength or core hardness) in the board, while the acid-modified migrating starch (e.g., LC-211) is not provided to enhance strength but rather to improve the bond between the gypsum and the face material.

The disks were prepared by using a Waring Blender, commercially available from Conair LLC, Stamford, Connecticut, and the set disks were heated at 350° F. for 30 minutes, followed by drying at 110° F. overnight. Each type of disk was made into samples prepared at 35 pcf and/or 50 pcf with shredded paper fiber or pulp paper fiber, and/or no STMP as seen in Table 1. The nail pull resistance was measured for each sample in accordance with ASTM 473-10, Method B. Table 1 sets forth the nail pull resistance ("NP") of each sample.

TABLE 1

| Disk | Fiber Content (%) | NP (Pulped, 35 pcf) | NP (Shredded, 35 pcf) | NP (Pulped, 50 pcf) | NP (Shredded, 50 pcf) | NP (Shredded, 50 pcf, without STMP) |
|---|---|---|---|---|---|---|
| 1A | 0.17 | 19.3 | — | — | — | — |
| 1B | 0.33 | 17.9 | — | — | — | — |
| 1C | 0.67 | 21.5 | 22.0 | — | — | — |
| 1D | 1 | 27.4 | 25.8 | 46.8 | 44.9 | — |
| 1E | 1.5 | — | 29.5 | — | — | — |
| 1F | 2 | — | 35.8 | 74.8 | 67.4 | — |
| 1G | 1 | — | — | — | 46.67 | — |
| 1I | 1 | — | — | — | — | 48.16 |

As seen in Table 1, an increase of paper fiber (wet pulp or dry shredded paper) content in gypsum increased NP strength of the gypsum disks. The density of the gypsum had a significant impact on the NP strength improvement. Table 1 shows a much greater NP percentage increase for a 50 pcf sample (a 158% increase by 1% paper fiber addition) than for a 35 pcf sample (104% increase). In accordance with the present disclosure, since the density of a dense layer of wallboard can be at a density at or within a range of around 50 pcf, adding paper fiber into the dense layer is expected to significantly improve NP strength of wallboard. As seen in comparing disks 1G and 1I, the disks had similar NP strength with and without, respectively, the presence of STMP.

Example 2

This example illustrates the benefit on nail pull strength on boards prepared with dense layers formed from slurries containing paper fibers.

In particular, five boards (2A-2E) were made in a laboratory with a gypsum core having a density of 29 pcf sandwiched between face and back cover sheets. A dense gypsum layer having a density of 50 pcf was deposited between the face paper and the gypsum core. The back side did not include any dense layer. Both sides used the same type of (i.e., Manila) paper.

The gypsum core and the gypsum dense layer were formed from separate slurries to account for the differences in density. Paper fiber was included in the slurry for forming the dense layer in an amount of 1% or 2% by weight of the stucco. The dense gypsum layer had a thickness of 0.025 inch or 0.035 inch. The gypsum core was made without paper fiber and included other additives in the form of stucco, heat resistant accelerator (1%), sodium trimetaphosphate (0.2%), dispersant (0.5%), and retarder (0.027%), wherein the amounts are by weight of the stucco.

Optional additives in the form of modified starch (2% by weight of the stucco) and polyphosphate (0.2% by weight of the stucco) were also included in the slurry for forming the dense layer. The modified starch was in the form of an uncooked medium hydrolyzed acid modified starch, and particularly an uncooked acid-modified corn starch having a hot water viscosity of 180 BU. However, other strength-enhancing starches can be used alternatively or in addition to the aforesaid type of uncooked starch, including a medium viscosity and medium molecular weight pregelatinized starch, and/or a highly hydrolyzed acid modified migrating starch. For example, the medium viscosity and medium molecular weight pregelatinized starch can be in the form of pregelatinized corn flour starch with a cold water viscosity of 90 centipoise. The highly hydrolyzed acid modified migrating starch can be in the form of a highly hydrolyzed acid modified migrating starch having a cold water solubility of 10%. The polyphosphate, in the form of sodium trimetaphosphate, another optional ingredient, was used further in the dense layer to enhance dimensional stability.

Table 2A sets forth the characteristics of the dense layers.

TABLE 2A

| Board | Dense layer uncooked starch (%) | Dense layer density (pcf) | Dense layer dry paper fiber (%) | Dense layer thickness (inches) |
|---|---|---|---|---|
| 2A | 2 | 50 | 1 | 0.025 |
| 2B | 2 | 50 | 1 | 0.025 |
| 2C | 2 | 50 | 1 | 0.035 |
| 2D | 2 | 50 | 2 | 0.035 |
| 2E | 2 | 50 | 2 | 0.035 |

Table 2B sets forth the nail pull of laboratory boards 2A-2E in accordance with ASTM 473-10, Method B. "Nail pull δ" refers to the nail pull strength difference between the face side and the backside (representing the nail pull strength increase due to the paper fiber included in the dense layer).

TABLE 2B

| Board | | Nail Pull (lbs) | | | | NP Average (lbs) | Nail pull δ (lbs) |
|---|---|---|---|---|---|---|---|
| 2A | Face | 72.3 | 78.6 | 79.3 | 73.9 | 76 | 19.6 |
| | Back | 58.3 | 55.9 | 59 | 52.6 | 56.5 | |
| 2B | Face | 80.8 | 74.4 | 81.4 | 86.1 | 80.7 | 21.5 |
| | Back | 65.3 | 51.8 | 60.5 | | 59.2 | |
| 2C | Face | 95.8 | 120 | 108 | 118 | 110.5 | 26.1 |
| | Back | 83.7 | 78 | 81.6 | 94 | 84.3 | |
| 2D | Face | 91.7 | 98.8 | 93.2 | 101 | 96.2 | 34 |
| | Back | 71.9 | 56 | 62.6 | 58.1 | 62.2 | |
| 2E | Face | 91.3 | 84.4 | 84.1 | 100 | 90 | 32.1 |
| | Back | 60.2 | 54.6 | 58 | 58.8 | 57.9 | |

As seen from the results, a greater nail pull was imparted due to the inclusion of the paper fiber in the dense layer. For example, the nail pull increased by 19.6 lbs between the face side, which included a 0.025 inch thick dense layer with 1% paper fiber, and the back side with the same core but no dense layer.

In addition, a comparison of a board with a dense layer without fiber and a board with a dense layer with fiber was conducted. Boards 2F and 2G were prepared according to the same method of preparing Boards 2A and 2B, except that Board 2G was for comparative purposes as it did not include paper fiber in its dense layer.

TABLE 2C

| Board | Paper fiber (%) | Thickness of dense layer (inch) | Density of dense layer (pcf) | Nail pull (lb.) |
|---|---|---|---|---|
| 2F | 1 | 0.025 | 50 | 87.6 |
| 2G (comparative) | 0 | 0.025 | 50 | 80.1 |

As seen in Table 2C, a wallboard sample with a dense layer absent paper fiber reinforcement had a nail pull of 80.1 lbs, while a wallboard sample with 1% paper fiber in the dense layer had a nail pull of 87.6 lbs. Therefore, the dense layer with 1% paper fiber increased nail pull strength a significant amount, particularly by 7.5 lbs.

Example 3

This example demonstrates the results of plant production of board wherein the board is formed with a dense layer formed from a stucco slurry comprising cellulosic fiber. Specifically, plant trials to record the benefit of using pulp in combination with uncooked acid-modified corn starch having a hot water viscosity of 180 BU (as exemplary of uncooked medium hydrolyzed acid modified starch) and its impact on nail pull resistance ("NP"). As indicated in Example 1, the inclusion of fiber in the gypsum composition can increase NP when compared to gypsum composition without the fibers.

In particular, boards were prepared on a gypsum board manufacturing line. The boards were prepared to include a board core sandwiched between face and back cover sheets formed from paper. A dense layer ("skim coat") was applied between the board core and the face cover sheet. The dense layer was prepared from a dense layer slurry that contained stucco, water, paper fiber in a pulp suspension (sometimes referred to as simply "pulp," hereinafter), and uncooked acid-modified corn starch having a hot water viscosity of 180 BU.

The board core and dense layer were formed from slurries, respectively, according to the formulations set forth in Table 3. The board was prepared using a single main board mixer (as opposed to a dual mixer system). The wet and dry ingredients for the core slurry were added into the body of the board mixer. Foaming agent was injected into a discharge conduit of the mixer to allow for the board core to contain air voids and thus a lesser density. A dense slurry was released through an extractor apparatus from the mixer upstream of the discharge conduit such that the dense slurry contained a minimal amount of, or no, foaming agent. Paper fiber and uncooked acid-modified corn starch having a hot water viscosity of 180 BU were injected into the extractor so that the board core did not contain those additives.

The board was formed upside down. The dense slurry was applied to a ribbon of paper used as the face cover sheet. The board core slurry exited the discharge conduit and was applied over the face cover sheet bearing the dense slurry. A back cover sheet was applied over the core slurry to form the sandwich structure of the board. The board was allowed to set and it was cut, dried, and processed to form a board having the dimensions of a thickness of ½ inch, a width of 48 inches, and a length of 96 inches.

Table 3 describes the respective compositions of the core slurry and the dense layer slurry. The water/stucco ratio for the dense layer slurry was between 1.05 to 1.1, and the water/stucco ratio for the core slurry was between 0.83 to 0.88.

TABLE 3

| | Core | | Dense Layer | | |
|---|---|---|---|---|---|
| Additive | lbs/ MSF | % to Core Stucco | lbs/ MSF | % to Dense Layer Stucco | % to Core Stucco |
| Stucco | 985.30 | 100.00% | 88.68 | 100.00% | 9.00% |
| Medium Viscosity and Medium | 12.00 | 1.22% | 1.08 | 1.22% | 0.11% |

TABLE 3-continued

| | Core | | Dense Layer | | |
|---|---|---|---|---|---|
| Additive | lbs/ MSF | % to Core Stucco | lbs/ MSF | % to Dense Layer Stucco | % to Core Stucco |
| Molecular Weight Pregelatinized Starch With a Cold Water Viscosity of 90 Centipoise | | | | | |
| Uncooked Acid-Modified Corn Starch Having a Hot Water Viscosity of 180 BU | 0 | 0.00% | 1.00 | 1.13% | 0.10% |
| STMP | 1.07 | 0.11% | 0.10 | 0.11% | 0.01% |
| Dispersant | 4.00 | 0.41% | 0.36 | 0.41% | 0.04% |
| Retarder | 0.30 | 0.03% | 0.03 | 0.03% | 0.00% |
| Paper Fiber | 0.00 | 0.00% | 0.90 | 1.01% | 0.09% |
| Heat Resistant Additive | 10.00 | 1.01% | 0.90 | 1.01% | 0.09% |

As seen in Table 3, the amount of additives was the same in the dense layer slurry and the core slurry, except for the paper fiber and the uncooked acid-modified corn starch having a hot water viscosity of 180 BU, which were in larger amounts in the dense layer slurry in accordance with the embodiments of the disclosure. The extracted dense layer slurry was reinforced with paper fiber and uncooked acid-modified corn starch having a hot water viscosity of 180 BU.

In order to record the benefit of using pulp in combination with uncooked acid-modified corn starch having a hot water viscosity of 180 BU on NP strength, three board types (3A-3C) were produced for the plant trial. A comparative board type (3A) which contained neither pulp nor uncooked acid-modified corn starch having a hot water viscosity of 180 BU was used as a control. A second board type (3B) was produced containing pulp, but without the further addition of uncooked acid-modified corn starch having a hot water viscosity of 180 BU. A third board type (3C) was produced which contained both paper fiber and uncooked acid-modified corn starch having a hot water viscosity of 180 BU as described below.

The paper fiber originated from scrap production paper. The desired trial pulp consistency target was calculated by dividing the weight of the gathered paper fiber by the desired target percentage of pulp consistency. The result indicated how many pounds of water to add in order to achieve the desired percentage of pulp. In order to reach, for example, 2.7% concentration with a starting weight of 23 pounds of paper fiber, 852 pounds of water would be added.

For the purposes of the plant trials as described in this example, the trial pulp consistency target was nominally 3% dry fiber. In order to prepare the pulp, water was first gathered in a holding tank able to hold approximately 300 gallons using a fixed volume 200 gallon tote. Paper fiber was added to the tank and mixed throughout to reach the target consistency. Once the target consistency was reached, uncooked acid-modified corn starch having a hot water viscosity of 180 BU was added to produce the slurry forming the third board type.

Once batch procedure was complete, each slurry was pumped to a process skid. This skid included an agitated tank and a progressive cavity tank that pumped the pump mixture into the dense layer injection component.

Once produced, the board types were tested for NP strength in accordance with ASTM 473-10, Method B. Table 4 sets forth the NP strength of each board type.

TABLE 4

| Board | Additives in Dense Layer | NP | Difference from Previous Condition |
|---|---|---|---|
| 3A | Control | 84.84 | — |
| 3B | With Pulp | 88.59 | +3.75 |
| 3C | With Pulp + Uncooked Acid-Modified Corn Starch having a Hot Water Viscosity of 180 BU | 90.35 | +1.76 (+5.51) |

As seen in Table 4, the "Difference from Previous Condition" refers to the NP relative to the board type directly above. The use of pulp in addition with uncooked acid-modified corn starch having a hot water viscosity of 180 BU had a significant impact on NP strength improvement as seen in board type 3B. In addition, the inclusion of uncooked acid-modified corn starch having a hot water viscosity of 180 BU to the pulp further boosted the NP strength of board type 3C to 90.35, while the control produced a NP strength of 84.84.

Thus, this example illustrates that the addition of pulp in combination with uncooked acid-modified corn starch having a hot water viscosity of 180 BU in accordance with the present disclosure enhances NP strength.

Example 4

This example demonstrates the insertion of paper fiber into a dense layer slurry using injection ports of differing inner diameter size, particularly with respect to flow characteristics of the paper fiber in water.

Experiments were carried out using the formulations of the dense layer slurry set forth in Table 3. In particular, tests were performed using injection ports with differing inner diameters ("ID," hereinafter) in order to record the impact on pulp flowrate consistency and density. For the purposes of the tests, four different injection port inner diameters were studied: 1" ID, 0.5" ID, 0.375" ID, and 0.25" ID.

In order to test the different injection ports, drop tests were performed using pulp skids and 40 gallons of the 3% pulp formulation. Drop tests refer to a method of checking the accuracy of the flowrate over a set period of time and are carried out with the following steps. To achieve a measurable flowrate, the pump is turned on and the discharge hose allowed to freely pump for 15 seconds. After 15 seconds have elapsed, the discharge hose is placed into a 5 gallon bucket. After 30 seconds, the discharge hose is removed and the bucket is then weighed. To measure the flowrate (pounds per minute), the weight of the bucket and its contents, minus the weight of the bucket itself, is multiplied by two. This process is repeated three times in order to achieve an average flowrate and a standard deviation. This process was repeated for each of the above-identified nozzles.

Pulp skids refer to a progressive cavity metering pump. Specifically, the progressive cavity metering pump comprises an 150 gallon tank with a level sensor, a flowmeter to measure the discharge flow from the metering pump, and an air diaphragm pump to refill the 150 gallon tank. For the purposes of these tests, the pump SP was set at 21.8 pounds per minute. The resulting impact on pulp density (as measured in lbs/cuft) is recorded in FIG. 16. The impact ID has on flow velocity (ft/min and m/s) is recorded in Table 5 below. Three separate drops per injection port inner diameter size were recorded.

TABLE 5

| Experiment | Port Size (in) | Port Area (ft^2) | Port Area (m^2) | Flow Velocity (ft/min) | Flow Velocity (m/s) |
|---|---|---|---|---|---|
| 4A | 1.000 | 0.822 | 0.076 | 24.581 | 2.0 |
| 4B | 0.500 | 0.411 | 0.038 | 49.321 | 4.0 |
| 4C | 0.375 | 0.308 | 0.029 | 70.793 | 5.8 |
| 4D | 0.250 | 0.206 | 0.019 | 106.416 | 8.7 |

Figure 16:
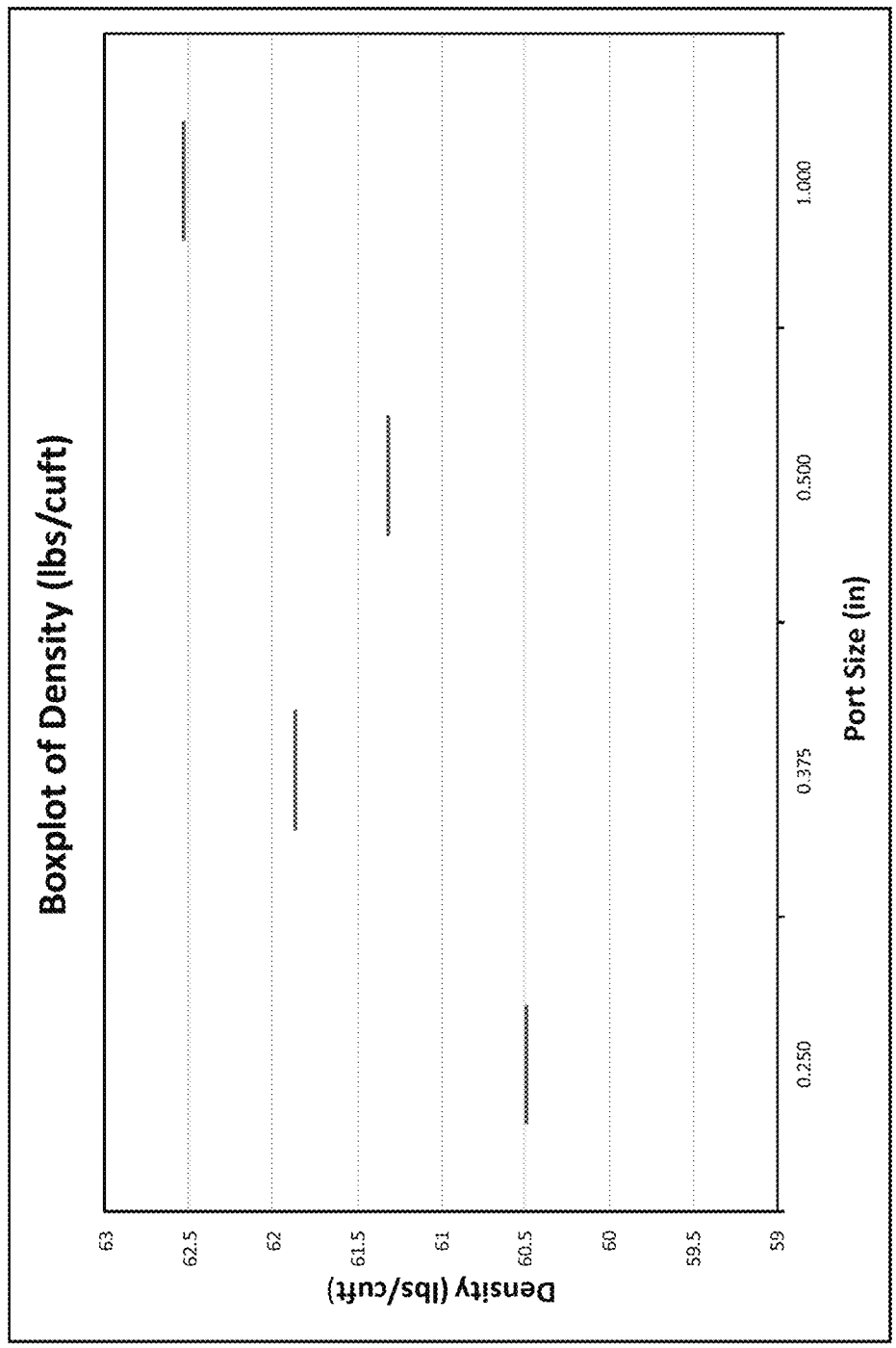
FIG. 16 is a graph of pulp density (Y-axis) versus port size (X-axis) measured in the experiments involving the insertion of paper fiber into a dense layer slurry using injection ports of different inner diameter size as described in Example 4.
Figure 17:
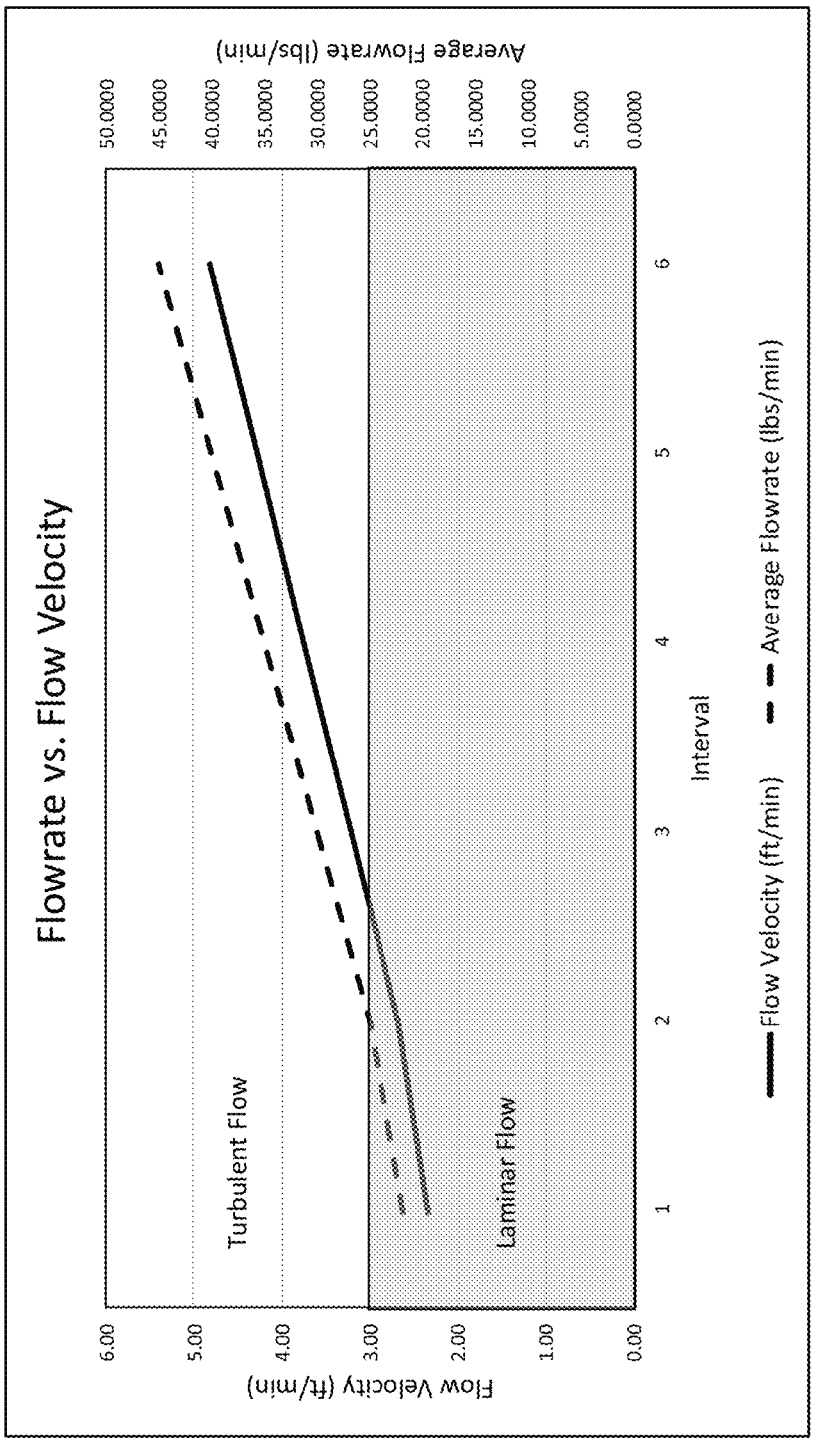
FIG. 17 is a graph of flow velocity (left Y-axis) versus average flowrate (right Y-axis) measured in the experiments involving the insertion of paper fiber into a dense layer slurry using the injection port of 0.375" inner diameter size as described in Example 4.

As seen in Table 5, the use of a smaller injection port inner diameter had a significant impact on flow velocity. The reduction in inner diameter results in greater flow velocity, which is advantageous because this reduces the amount of pulp "floc" and deviations in mass flowrate. FIG. 16 is a boxplot of density versus port size. As seen in FIG. 16, pulp density decreased as the port size was reduced. This indicates a more consistent flowrate.

Further tests were conducted utilizing the four different injection port IDs as identified above in order to record the impact of turbulent flow and laminar flow had on flowrate accuracy and the potential of plugging, the results of which are shown in Table 6A and 6B. Using the drop test as described above, 4E and 4F injection ports were studied using a laminar flow (e.g., a flow velocity lesser than 3.0 m/s), while the 4G and 4H injection ports were studied using a turbulent flow (e.g., a flow velocity greater than 3.0 m/s).

TABLE 6A

| Experiment | Port Size (in) | Port Area (in^2) | Port Area (ft^2) | Port Area (m^2) | Avg Flowrate (lbs/min) | Avg Flowrate (kg/s) |
|---|---|---|---|---|---|---|
| 4E | 1.000 | 0.785 | 0.0055 | 0.0005 | 21.3680 | 0.1620 |
| 4F | 0.500 | 0.196 | 0.0014 | 0.0001 | 20.9300 | 0.1580 |
| 4G | 0.375 | 0.110 | 0.0008 | 0.0001 | 21.8760 | 0.1650 |
| 4H | 0.250 | 0.049 | 0.0003 | 0.0000 | 21.8530 | 0.1650 |

TABLE 6B

| Experiment | Port Size (in) | Pulp Density (lbs/cuft) | Pulp Density (g/mL) | Flow Velocity (ft/min) | Flow Velocity (m/s) |
|---|---|---|---|---|---|
| 4E | 1.000 | 62.5330 | 1.0020 | 62.65 | 0.32 |
| 4F | 0.500 | 61.3160 | 0.9820 | 250.34 | 1.27 |
| 4G | 0.375 | 61.8690 | 0.9910 | 461.00 | 2.34 |
| 4H | 0.250 | 60.4950 | 0.9690 | 1059.70 | 5.38 |

As seen in Tables 6A and 6B above, density varied subsequently with each injection port size, corresponding with a respective overall decrease in pulp density. In addition, Tables 6A and 6B show flowrate accuracy and flow velocity. These results indicate which injection port size is needed to achieve consistent and accurate flowrate as well as exceed turbulent flow velocity.

Using an injection port ID of 0.375", further trials are recorded in Tables 7A and 7B, using the methods of 6A and 6B. The injection port size was tested to record the correlation between flowrate and flow velocity. 4I and 4J injection ports were studied using a laminar flow, while the 4K-4N injection ports were studied using a turbulent flow.

TABLE 7A

| Experiment | Port Size (in) | Port Area (in^2) | Port Area (ft^2) | Port Area (m^2) | Avg Flowrate (lbs/min) | Avg Flowrate (kg/s) |
|---|---|---|---|---|---|---|
| 4I | 0.375 | 0.110 | 0.0008 | 0.0001 | 21.8760 | 0.1650 |
| 4J | 0.375 | 0.110 | 0.0008 | 0.0001 | 25.0000 | 0.189 |
| 4K | 0.375 | 0.110 | 0.0008 | 0.0001 | 30.0000 | 0.227 |
| 4L | 0.375 | 0.110 | 0.0008 | 0.0001 | 35.0000 | 0.265 |
| 4M | 0.375 | 0.110 | 0.0008 | 0.0001 | 40.0000 | 0.302 |
| 4N | 0.375 | 0.110 | 0.0008 | 0.0001 | 45.0000 | 0.340 |

TABLE 7B

| Experiment | Port Size (m) | Pulp Density (lbs/cuft) | Pulp Density (g/mL) | Flow Velocity (ft/min) | Flow Velocity (m/s) |
|---|---|---|---|---|---|
| 4I | 0.375 | 61.8690 | 0.9910 | 461.00 | 2.34 |
| 4J | 0.375 | 61.8690 | 0.9910 | 526.84 | 2.68 |
| 4K | 0.375 | 61.8690 | 0.9910 | 632.21 | 3.21 |
| 4L | 0.375 | 61.8690 | 0.9910 | 737.57 | 3.75 |
| 4M | 0.375 | 61.8690 | 0.9910 | 842.94 | 4.28 |
| 4N | 0.375 | 61.8690 | 0.9910 | 948.31 | 4.82 |

As seen in Tables 7A and 7B above, as the average flowrate increases, so does the flow velocity when using a 0.375" ID injection port which is advantageous because a minimum flowrate can be targeted while maintaining turbulent flow.

Example 5

Experiments were conducted in accordance with the rheology test as described in Ventura, C., "Modeling Pulp Fiber Suspension Rheology," TAPPI Journal, Vol. 6, No. 7, pages 17-23 (2007) using a pulp suspension containing paper pulp at a consistency of 2.7%.

In order to measure the relationship between shear stress and shear rate of the pulp suspension, a Discovery Hybrid Rheometer 20 ("DHR 20" as used herein, commercially available from TA Instruments, New Castle, Delaware) was used with a vane geometry at room temperature (approximately 75° F.). The DHR 20 was used to change the shear rate, which refers to the rotation speed of the vane, and the shear stress was measured with a shear rate ramp from 0.001 $s^{-1}$ to 3500 $s^{-1}$. Room temperature was chosen to mimic the temperature the pulp suspension will be used in the production line.

A rheogram (i.e., a plot of shear stress versus shear rate) recorded by the DHR 20 of the 2.7% pulp suspension indicated an onset velocity of turbulence flow of 2.3 m/s. An onset velocity of turbulence flow at 2.3 m/s indicates that the pulp suspension is homogeneous when it is transported at a velocity above 2.3 m/s, which is advantageous because the fiber can be uniformly added into the gypsum slurry of the dense layer.

Example 6

Experiments were conducted in accordance with the pulp head friction test as described Ventura, C., "Flow Dynamics of Pulp Fiber Suspensions," TAPPI Journal, Vol. 7, No. 8, pages 20-26 (2008) using a pulp suspension containing paper pulp at a consistency of 3%.

In order to record the impact of flow velocity on friction loss, the pulp suspension was pumped through a ball valve at various flowrates into either a 10 foot hose or a 40 foot hose with a pipe diameter of either ⅜ or ½ inch. The flowrates used were 1.21, 3.14, 3.37, 4.84, 5.65, 6.10, 7.75, and 8.3 gallons/minute which were changed by adjusting the ball valve. The range of flowrates was chosen in order to cover the expected onset velocity of turbulence.

Figure 18:
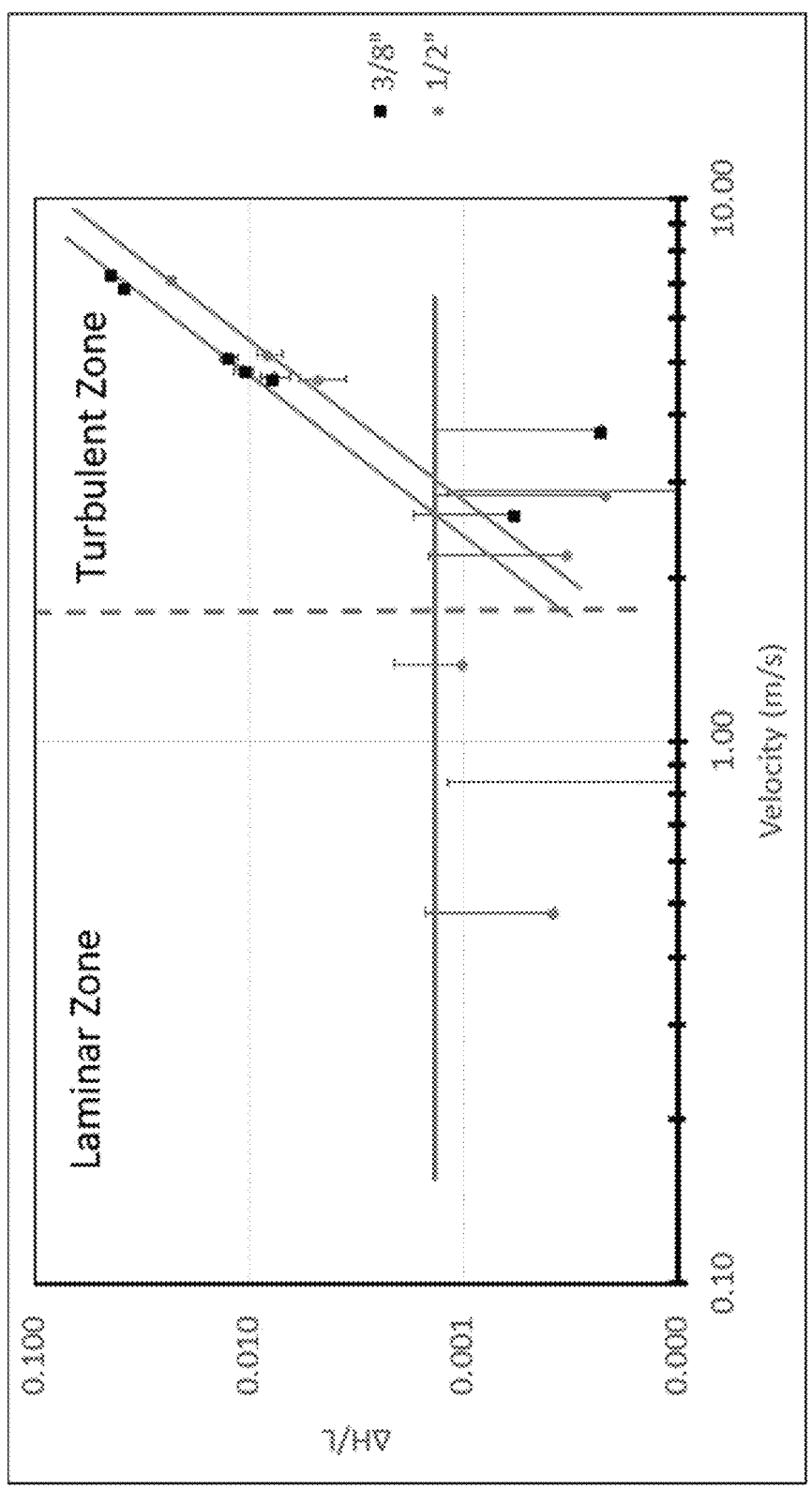
FIG. 18 is a graph of friction head loss (Y-axis) versus bulk flow velocity (X-axis) measured in the experiments involving a pulp suspension moving through a hose at various flowrates as described in Example 6.

The results, particularly the change in velocity, were measured using the drop test. Friction head loss was calculated by comparing the change in velocity between the 10 foot and the 40 foot hose, the results of which are recorded in FIG. 18. As seen in FIG. 18, the onset velocity of turbulent flow is approximately 3 m/s. When the pulp suspension is pumped above 3 m/s, the pulp suspension is in a turbulent state, which is advantageous because the pulp suspension is transported in a uniform state.

Example 7

This example demonstrates boards prepared from dense layer slurries with or without sodium trimetaphosphate (STMP) have similar values of nail pull ("NP") strength.

Laboratory boards were produced according to the core and dense layer slurry formulations as set forth in Table 8. A control board with dense layer sample was prepared, formed from a slurry containing 0.1% STMP but without paper fiber. A second board was prepared having a dense layer prepared from a slurry containing 1% paper fiber and 0.1% STMP while a third board was prepared having a dense layer prepared from a slurry containing 1% paper fiber but without STMP.

TABLE 8

| | Control with No Fiber | | STMP + Fiber | | No STMP + Fiber | |
|---|---|---|---|---|---|---|
| | Dense layer | Core | Dense layer | Core | Dense layer | Core |
| Stucco (g) | 150 | 300 | 150 | 300 | 150 | 300 |
| Accelerator (g) | 1.5 | 3 | 1.5 | 3 | 1.5 | 3 |
| Acid modified starch (Clinton 260) (g) | 1.5 | 3 | 3 | 3 | 3 | 3 |
| Paper fiber (g) | 0 | 0 | 1.5 | 0 | 1.5 | 0 |
| Sodium tri-metaphosphate (STMP) (g) | 0.15 | 0.3 | 0.15 | 0.3 | 0 | 0.3 |
| Dispersant (g) | 0.8 | 0.4 | 0.8 | 0.4 | 0.8 | 0.4 |
| Retarder (g) | 0.08 | 0.08 | 0.08 | 0.08 | 0.08 | 0.08 |
| Water (g) | 165 | 660 | 165 | 660 | 165 | 660 |

The slurries were prepared using a Waring Blender, commercially available from Conair LLC, Stamford, Connecticut. The respective dense layer slurries were poured on the top of Manila face paper cover sheet with a thickness of 0.025 inch. A core slurry was then poured on top of the dense layer slurry. A Newsline paper cover sheet was added to the top of the core slurry. The set samples were then heated to 440° F. for 9 minutes, followed by 280° F. for an additional 21 minutes. The heated sample was then dried at 110° F. overnight.

Table 9 shows the nail pull resistance ("NP") of each sample. The NP resistance was measured for each sample in accordance with ASTM 473-10, Method B.

TABLE 9

|  | Nail Pull (NP) Strength (lbs) |
| --- | --- |
| Control with No Fiber | 70.9 |
| STMP + Fiber | 78.1 |
| No STMP + Fiber | 80.3 |

As seen in Table 9, the control board had a NP value of 70.9 lbs, which is 7 to 9 lbs lower than samples with a fiber fortified dense layer. The NP value of the boards having the dense layer containing STMP was not significantly different from the boards containing the dense layer without STMP. Therefore, the results demonstrate that a dense layer fortified by paper fiber improved nail pull strength with or without the inclusion of STMP.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Stucco and water are fundamental ingredients in a slurry and are thus not considered additives. When amounts are compared between the core and dense layer slurries, it will be understood that it is in relation to a relative comparison, i.e., concentration. To the extent that some portions of the description may refer to the primary and secondary discharge conduits as integral to the board mixer and other portions may refer to them as separate pieces, it will be understood that any such difference in description does not suggest or imply different arrangements unless otherwise indicated. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. All amounts are by weight and not by volume, unless otherwise indicated. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing board, comprising:
   providing a board mixer comprising a main body, and primary and secondary discharge conduits, respectively;
   inserting stucco and water in the main body of the mixer to form a base slurry;
   discharging a majority portion of the base slurry from the main body into the primary discharge conduit to form a core slurry;
   discharging a minority portion of the base slurry from the main body into the secondary discharge conduit to form a dense layer slurry;
   preparing a suspension comprising water and paper fiber having an average length from 0.5 mm to 4 mm and a diameter from 1 micron to 40 microns;
   inserting the suspension into the dense layer slurry in the secondary discharge conduit while the suspension is in a non-laminar state to form a fiber-reinforced dense slurry, wherein the suspension is pumped at a flow velocity of at least 2.3 m/s such that turbulent flow is attained, wherein the dense layer slurry preferentially has a greater concentration of the paper fiber than the core slurry;
   providing first and second cover sheets;
   depositing the fiber-reinforced dense layer slurry over the first cover sheet;
   depositing the core slurry over the fiber-reinforced dense layer slurry;
   applying the second cover sheet over the core slurry to form a board precursor; and
   allowing the precursor to set to form the board, the paper fiber present in an amount of at least 0.8% by weight of the stucco in the dense layer, the board having a nail pull resistance of at least 77 lb. according to ASTM 473-10, method B, and a density of 35 pcf or less.

2. The method of claim 1, wherein a second dense layer slurry is provided between the core slurry and the second cover sheet, wherein the second dense layer slurry can be the same or different than the fiber-reinforced dense layer slurry.

3. The method of claim 1, wherein the non-laminar state is turbulent.

4. The method of claim 1, wherein, prior to inserting the suspension into the dense layer slurry, the suspension is passed through a passageway having an inner diameter sufficient to subject the suspension to turbulent flow.

5. The method of claim 4, wherein the passageway has an inner diameter of from 0.125 inch to 0.625 inch.

6. The method of claim 5, wherein the passageway has an inner diameter of from 0.2 inch to 0.5 inch.

7. The method of claim 6, wherein the passageway has an inner diameter of from 0.2 inch to 0.375 inch.

8. The method of claim 1, wherein the suspension has a Reynolds number of at least 2300 upon addition to the dense layer slurry.

9. The method of claim 8, wherein the suspension has a Reynolds number of at least 3500 upon addition to the dense layer slurry.

10. The method of claim 1, wherein the suspension contains 1% to 8% of the paper fiber by weight.

11. The method of claim 1, the suspension further comprising strength-enhancing starch.

12. The method of claim 1, the suspension further comprising polyphosphate.

13. The method of claim 1, wherein the secondary discharge conduit is upstream of the primary discharge conduit.

14. The method of claim 13, wherein the dense layer slurry is deposited upstream of the mixer.

15. The method of claim 14, wherein the core slurry is deposited downstream of the mixer.

16. The method of claim 1, wherein at least one of the following additives: accelerator, retarder, dispersant, migrating starch, and polyphosphate, is inserted in the main body or primary discharge conduit but not the secondary discharge conduit.

17. The method of claim 16, wherein the dense layer slurry has a greater concentration of the paper fiber, and optionally, the strength-enhancing starch, than the core slurry, and wherein the core slurry preferentially has the same or a greater concentration of at least three of the additives other than paper fiber as compared with the fiber-reinforced dense slurry.

18. The method of claim 17, wherein the core slurry preferentially has the same or a greater concentration of at least four additives other than paper fiber as compared with the fiber-reinforced dense slurry.

19. The method of claim 16, wherein the core slurry is free of a strength-enhancing starch.

20. The method of claim 1, wherein the suspension is pumped at a flow velocity of at least 3.0 m/s.

* * * * *